US009809168B2

(12) United States Patent
Taylor et al.

(10) Patent No.: US 9,809,168 B2
(45) **Date of Patent: *Nov. 7, 2017**

(54) DRIVER ASSIST SYSTEM FOR VEHICLE

(71) Applicant: MAGNA ELECTRONICS INC., Auburn Hills, MI (US)

(72) Inventors: David W. Taylor, Fenton, MI (US); Kevin C. McCarthy, Tucson, AZ (US); Niall R. Lynam, Holland, MI (US); Kenneth Schofield, Holland, MI (US)

(73) Assignee: MAGNA ELECTRONICS INC., Auburn Hills, MI (US)

(*) Notice: Subject to any disclaimer, the term of this patent is extended or adjusted under 35 U.S.C. 154(b) by 17 days.

This patent is subject to a terminal disclaimer.

(21) Appl. No.: 15/131,592

(22) Filed: Apr. 18, 2016

(65) Prior Publication Data

US 2016/0229342 A1 Aug. 11, 2016

Related U.S. Application Data

(63) Continuation of application No. 14/678,145, filed on Apr. 3, 2015, now Pat. No. 9,315,151, which is a (Continued)

(51) Int. Cl.
*G01C 21/00* (2006.01)
*B60R 1/00* (2006.01)
(Continued)

(52) U.S. Cl.
CPC ............ *B60R 1/00* (2013.01); *B60C 23/0408* (2013.01); *B60N 2/448* (2013.01); *B60Q 1/2665* (2013.01);
(Continued)

(58) Field of Classification Search
CPC .. B60R 1/00; B60R 1/088; B60R 1/12; B60R 11/04; B60C 23/0408; B60N 2/448;
(Continued)

(56) References Cited

U.S. PATENT DOCUMENTS 1,096,452 A 5/1914 Perrin
1,563,258 A 11/1925 Cunningham
(Continued)

FOREIGN PATENT DOCUMENTS

AU A-40317/95 2/1995
CN 1189224 7/1998
(Continued)

OTHER PUBLICATIONS

Brown, Lisa Gottesfeld, A Survey of Image Registration Techniques, vol. 24, ACM Computing Surveys, pp. 325-376, 1992.
(Continued)

*Primary Examiner* — Gertrude Arthur Jeanglaude
(74) *Attorney, Agent, or Firm* — Gardner, Linn, Burkhart & Flory, LLP

(57) ABSTRACT

A driver assist system for a vehicle includes at least one non-visual sensor and a forward-viewing camera disposed that is part of a multi-camera vision system of the vehicle that includes at least two side cameras and a rear backup camera. A video display screen is viewable by a driver of the vehicle when the driver is normally operating the vehicle. During a driving or parking maneuver of the vehicle, images derived, at least in part, from image data captured by at least some of the cameras are displayed by the video display screen, and at least one indication is provided to the driver of the vehicle during the driving maneuver. A unitary image is synthesized from image data captured by the multi-camera vision system and approximates a view as would be seen by a virtual camera at a single location exterior of the vehicle.

32 Claims, 2 Drawing Sheets

12
22
10
18
28
14

Related U.S. Application Data continuation of application No. 14/211,256, filed on Mar. 14, 2014, now Pat. No. 9,014,966, which is a continuation of application No. 14/033,963, filed on Sep. 23, 2013, now Pat. No. 8,676,491, which is a continuation of application No. 13/621,382, filed on Sep. 17, 2012, now Pat. No. 8,543,330, which is a continuation of application No. 13/399,347, filed on Feb. 17, 2012, now Pat. No. 8,271,187, which is a continuation of application No. 13/209,645, filed on Aug. 15, 2011, now Pat. No. 8,121,787, which is a continuation of application No. 12/908,481, filed on Oct. 20, 2010, now Pat. No. 8,000,894, which is a continuation of application No. 12/724,895, filed on Mar. 16, 2010, now Pat. No. 7,822,543, which is a continuation of application No. 12/405,614, filed on Mar. 17, 2009, now Pat. No. 7,711,479, which is a continuation of application No. 11/935,800, filed on Nov. 6, 2007, now Pat. No. 7,571,042, which is a continuation of application No. 11/624,381, filed on Jan. 18, 2007, now Pat. No. 7,490,007, which is a continuation of application No. 10/645,762, filed on Aug. 20, 2003, now Pat. No. 7,167,796, which is a continuation-in-part of application No. 10/456,599, filed on Jun. 6, 2003, now Pat. No. 7,004,593, and a continuation-in-part of application No. 10/287,178, filed on Nov. 4, 2002, now Pat. No. 6,678,614, which is a continuation of application No. 09/799,414, filed on Mar. 5, 2001, now Pat. No. 6,477,464, said application No. 11/624,381 is a continuation-in-part of application No. 10/755,915, filed on Jan. 13, 2004, now Pat. No. 7,446,650, which is a continuation of application No. 09/793,002, filed on Feb. 26, 2001, now Pat. No. 6,690,268, said application No. 11/624,381 is a continuation-in-part of application No. 10/054,633, filed on Jan. 22, 2002, now Pat. No. 7,195,381, which is a continuation-in-part of application No. 09/793,002, filed on Feb. 26, 2001, now Pat. No. 6,690,268.

(60) Provisional application No. 60/406,166, filed on Aug. 27, 2002, provisional application No. 60/405,392, filed on Aug. 23, 2002, provisional application No. 60/404,906, filed on Aug. 21, 2002, provisional application No. 60/187,960, filed on Mar. 9, 2000, provisional application No. 60/263,680, filed on Jan. 23, 2001, provisional application No. 60/243,986, filed on Oct. 27, 2000, provisional application No. 60/238,483, filed on Oct. 6, 2000, provisional application No. 60/237,077, filed on Sep. 30, 2000, provisional application No. 60/234,412, filed on Sep. 21, 2000, provisional application No. 60/218,336, filed on Jul. 14, 2000, provisional application No. 60/186,520, filed on Mar. 2, 2000, provisional application No. 60/346,733, filed on Jan. 7, 2002, provisional application No. 60/271,466, filed on Feb. 26, 2001, provisional application No. 60/315,384, filed on Aug. 28, 2001.

(51) Int. Cl.

| | |
|---|---|
| ***B60C 23/04*** | (2006.01) |
| ***B60N 2/44*** | (2006.01) |
| ***B60Q 1/26*** | (2006.01) |
| ***B60Q 9/00*** | (2006.01) |
| ***B60R 1/08*** | (2006.01) |
| ***B60R 1/12*** | (2006.01) |
| ***G01C 21/36*** | (2006.01) |
| ***H04N 7/18*** | (2006.01) |
| ***B60R 11/04*** | (2006.01) |
| ***G06K 9/00*** | (2006.01) |
| ***B60Q 5/00*** | (2006.01) |
| ***G01S 13/86*** | (2006.01) |
| ***G06T 5/00*** | (2006.01) |
| ***H04N 5/232*** | (2006.01) |
| ***H04N 5/247*** | (2006.01) |
| ***H04N 5/265*** | (2006.01) |
| *G01C 21/20* | (2006.01) |
| *G01C 21/26* | (2006.01) |

(52) U.S. Cl.

CPC ............... *B60Q 5/006* (2013.01); *B60Q 9/00* (2013.01); *B60R 1/088* (2013.01); *B60R 1/12* (2013.01); *B60R 11/04* (2013.01); *G01C 21/00* (2013.01); *G01C 21/36* (2013.01); *G01C 21/365* (2013.01); *G01S 13/862* (2013.01); *G01S 13/865* (2013.01); *G01S 13/867* (2013.01); *G06K 9/00805* (2013.01); *G06T 5/006* (2013.01); *H04N 5/23293* (2013.01); *H04N 5/247* (2013.01); *H04N 5/265* (2013.01); *H04N 7/181* (2013.01); *H04N 7/183* (2013.01); *B60R 2001/1215* (2013.01); *B60R 2001/1253* (2013.01); *B60R 2300/105* (2013.01); *B60R 2300/207* (2013.01); *B60R 2300/301* (2013.01); *B60R 2300/406* (2013.01); *B60R 2300/806* (2013.01); *B60R 2300/8066* (2013.01); *B60R 2300/8093* (2013.01); *G01C 21/20* (2013.01); *G01C 21/26* (2013.01); *G06T 2207/30252* (2013.01)

(58) Field of Classification Search

CPC ...... G01C 21/00; G01C 21/36; G01C 21/365; G01S 13/865; B60Q 1/2665; B60Q 5/006; B60Q 9/00

USPC .................................................... 701/36, 408

See application file for complete search history.

(56) References Cited

U.S. PATENT DOCUMENTS

| | | | |
|---|---|---|---|
| 2,069,368 | A | 2/1937 | Horinstein |
| 2,166,303 | A | 7/1939 | Hodny et al. |
| 2,263,382 | A | 11/1941 | Gotzinger |
| 2,414,223 | A | 1/1947 | DeVirgilis |
| 2,457,348 | A | 12/1948 | Chambers |
| 2,561,582 | A | 7/1951 | Marbel |
| 2,580,014 | A | 12/1951 | Gazda |
| 3,004,473 | A | 10/1961 | Arthur et al. |
| 3,075,430 | A | 1/1963 | Woodward et al. |
| 3,141,393 | A | 7/1964 | Platt |
| 3,152,216 | A | 10/1964 | Woodward |
| 3,162,008 | A | 12/1964 | Berger et al. |
| 3,185,020 | A | 5/1965 | Thelen |
| 3,266,016 | A | 8/1966 | Maruyama et al. |
| 3,280,701 | A | 10/1966 | Donnelly et al. |
| 3,432,225 | A | 3/1969 | Rock |
| 3,451,741 | A | 6/1969 | Manos |
| 3,453,038 | A | 7/1969 | Kissa et al. |
| 3,467,465 | A | 9/1969 | Van Noord |
| 3,473,867 | A | 10/1969 | Byrnes |
| 3,480,781 | A | 11/1969 | Mandalakas |
| 3,499,112 | A | 3/1970 | Heilmeier et al. |
| 3,499,702 | A | 3/1970 | Goldmacher et al. |
| 3,521,941 | A | 7/1970 | Deb et al. |
| 3,543,018 | A | 11/1970 | Barcus et al. |
| 3,557,265 | A | 1/1971 | Chisholm et al. |
| 3,565,985 | A | 2/1971 | Schrenk et al. |
| 3,612,654 | A | 10/1971 | Klein |

(56) References Cited

U.S. PATENT DOCUMENTS 3,614,210 A 10/1971 Caplan
3,628,851 A 12/1971 Robertson
3,676,668 A 7/1972 Collins et al.
3,680,951 A 8/1972 Jordan et al.
3,689,695 A 9/1972 Rosenfield et al.
3,711,176 A 1/1973 Alfrey, Jr. et al.
3,712,710 A 1/1973 Castellion et al.
3,748,017 A 7/1973 Yamamura et al.
3,781,090 A 12/1973 Sumita
3,806,229 A 4/1974 Schoot et al.
3,807,832 A 4/1974 Castellion
3,807,833 A 4/1974 Graham et al.
3,821,590 A 6/1974 Kosman et al.
3,837,129 A 9/1974 Losell
3,860,847 A 1/1975 Carley
3,862,798 A 1/1975 Hopkins
3,870,404 A 3/1975 Wilson et al.
3,876,287 A 4/1975 Sprokel
3,932,024 A 1/1976 Yaguchi et al.
3,940,822 A 3/1976 Emerick et al.
3,956,017 A 5/1976 Shigemasa
3,978,190 A 8/1976 Kurz, Jr. et al.
3,985,424 A 10/1976 Steinacher
4,006,546 A 2/1977 Anderson et al.
4,035,681 A 7/1977 Savage
4,040,727 A 8/1977 Ketchpel
4,052,712 A 10/1977 Ohama et al.
4,075,468 A 2/1978 Marcus
4,088,400 A 5/1978 Assouline et al.
4,093,364 A 6/1978 Miller
4,097,131 A 6/1978 Nishiyama
4,109,235 A 8/1978 Bouthors
4,139,234 A 2/1979 Morgan
4,159,866 A 7/1979 Wunsch et al.
4,161,653 A 7/1979 Bedini et al.
4,171,875 A 10/1979 Taylor et al.
4,174,152 A 11/1979 Gilia et al.
4,200,361 A 4/1980 Malvano et al.
4,202,607 A 5/1980 Washizuka et al.
4,211,955 A 7/1980 Ray
4,214,266 A 7/1980 Myers
4,219,760 A 8/1980 Ferro
4,221,955 A 9/1980 Joslyn
4,228,490 A 10/1980 Thillays
4,247,870 A 1/1981 Gabel et al.
4,257,703 A 3/1981 Goodrich
4,274,078 A 6/1981 Isobe et al.
4,277,804 A 7/1981 Robison
4,281,899 A 8/1981 Oskam
4,288,814 A 9/1981 Talley et al.
4,297,401 A 10/1981 Chern et al.
RE30,835 E 12/1981 Giglia
4,306,768 A 12/1981 Egging
4,310,851 A 1/1982 Pierrat
4,331,382 A 5/1982 Graff
4,338,000 A 7/1982 Kamimori et al.
4,377,613 A 3/1983 Gordon
4,390,895 A 6/1983 Sato et al.
4,398,805 A 8/1983 Cole
4,419,386 A 12/1983 Gordon
4,420,238 A 12/1983 Felix
4,425,717 A 1/1984 Marcus
4,435,042 A 3/1984 Wood et al.
4,435,048 A 3/1984 Kamimori et al.
4,436,371 A 3/1984 Wood et al.
4,438,348 A 3/1984 Casper et al.
4,443,057 A 4/1984 Bauer et al.
4,446,171 A 5/1984 Thomas
4,465,339 A 8/1984 Baucke et al.
4,473,695 A 9/1984 Wrighton et al.
4,490,227 A 12/1984 Bitter
4,491,390 A 1/1985 Tong-Shen
4,499,451 A 2/1985 Suzuki et al.
4,521,079 A 6/1985 Leenhouts et al.
4,524,941 A 6/1985 Wood et al.
4,538,063 A 8/1985 Bulat
4,546,551 A 10/1985 Franks
4,555,694 A 11/1985 Yanagishima et al.
4,561,625 A 12/1985 Weaver
4,572,619 A 2/1986 Reininger et al.
4,580,196 A 4/1986 Task
4,580,875 A 4/1986 Bechtel et al.
4,581,827 A 4/1986 Higashi
4,588,267 A 5/1986 Pastore
4,603,946 A 8/1986 Kato et al.
4,623,222 A 11/1986 Itoh et al.
4,625,210 A 11/1986 Sagl
4,626,850 A 12/1986 Chey
4,630,040 A 12/1986 Haertling
4,630,109 A 12/1986 Barton
4,630,904 A 12/1986 Pastore
4,634,835 A 1/1987 Suzuki
4,635,033 A 1/1987 Inukai et al.
4,636,782 A 1/1987 Nakamura et al.
4,638,287 A 1/1987 Umebayashi et al.
4,646,210 A 2/1987 Skogler et al.
4,652,090 A 3/1987 Uchikawa et al.
4,655,549 A 4/1987 Suzuki et al.
4,664,479 A 5/1987 Hiroshi
4,665,311 A 5/1987 Cole
4,665,430 A 5/1987 Hiroyasu
4,669,827 A 6/1987 Fukada et al.
4,671,615 A 6/1987 Fukada et al.
4,671,619 A 6/1987 Kamimori et al.
4,678,281 A 7/1987 Bauer
4,679,906 A 7/1987 Brandenburg
4,682,083 A 7/1987 Alley
4,692,798 A 9/1987 Seko et al.
4,693,788 A 9/1987 King et al.
4,694,295 A 9/1987 Miller et al.
4,697,883 A 10/1987 Suzuki et al.
4,701,022 A 10/1987 Jacob
4,702,566 A 10/1987 Tukude
4,704,740 A 11/1987 McKee et al.
4,711,544 A 12/1987 Iino et al.
4,712,879 A 12/1987 Lynam et al.
4,713,685 A 12/1987 Nishimura et al.
RE32,576 E 1/1988 Pastore
4,718,756 A 1/1988 Lancaster
4,721,364 A 1/1988 Itoh et al.
4,729,068 A 3/1988 Ohe
4,729,076 A 3/1988 Masami et al.
4,731,669 A 3/1988 Hayashi et al.
4,731,769 A 3/1988 Schaefer et al.
4,733,335 A 3/1988 Serizawa et al.
4,733,336 A 3/1988 Skogler et al.
4,740,838 A 4/1988 Mase et al.
4,758,040 A 7/1988 Kingsley et al.
4,761,061 A 8/1988 Nishiyama et al.
4,773,740 A 9/1988 Kawakami et al.
4,780,752 A 10/1988 Angerstein et al.
4,781,436 A 11/1988 Armbruster
4,789,774 A 12/1988 Koch et al.
4,789,904 A 12/1988 Peterson
4,793,690 A 12/1988 Gahan et al.
4,793,695 A 12/1988 Wada et al.
4,794,261 A 12/1988 Rosen
D299,491 S 1/1989 Masuda
4,799,768 A 1/1989 Gahan
4,803,599 A 2/1989 Trine et al.
4,807,096 A 2/1989 Skogler et al.
4,820,933 A 4/1989 Hong et al.
4,825,232 A 4/1989 Howdle
4,826,289 A 5/1989 Vandenbrink et al.
4,827,086 A 5/1989 Rockwell
4,833,534 A 5/1989 Paff et al.
4,837,551 A 6/1989 Iino
4,842,378 A 6/1989 Flasck et al.
4,845,402 A 7/1989 Smith
4,847,772 A 7/1989 Michalopoulos et al.
4,855,161 A 8/1989 Moser et al.
4,855,550 A 8/1989 Schultz, Jr.
4,859,813 A 8/1989 Rockwell
4,859,867 A 8/1989 Larson et al.

(56) References Cited

U.S. PATENT DOCUMENTS 4,860,171 A 8/1989 Kojima
4,862,594 A 9/1989 Schierbeek et al.
4,871,917 A 10/1989 O'Farrell et al.
4,872,051 A 10/1989 Dye
4,882,466 A 11/1989 Friel
4,882,565 A 11/1989 Gallmeyer
4,883,349 A 11/1989 Mittelhäuser
4,884,135 A 11/1989 Schiffman
4,886,960 A 12/1989 Molyneux et al.
4,889,412 A 12/1989 Clerc et al.
4,891,828 A 1/1990 Kawazoe
4,892,345 A 1/1990 Rachael, III
4,902,103 A 2/1990 Miyake et al.
4,902,108 A 2/1990 Byker
4,906,085 A 3/1990 Sugihara et al.
4,909,606 A 3/1990 Wada et al.
4,910,591 A 3/1990 Petrossian et al.
4,916,374 A 4/1990 Schierbeek et al.
4,917,477 A 4/1990 Bechtel et al.
4,926,170 A 5/1990 Beggs et al.
4,930,742 A 6/1990 Schofield et al.
4,933,814 A 6/1990 Sanai
4,935,665 A 6/1990 Murata
4,936,533 A 6/1990 Adams et al.
4,937,796 A 6/1990 Tendler
4,937,945 A 7/1990 Schofield et al.
4,943,796 A 7/1990 Lee
4,948,242 A 8/1990 Desmond et al.
4,953,305 A 9/1990 Van Lente et al.
4,956,591 A 9/1990 Schierbeek et al.
4,957,349 A 9/1990 Clerc et al.
4,959,247 A 9/1990 Moser et al.
4,959,865 A 9/1990 Stettiner et al.
4,966,441 A 10/1990 Conner
4,970,653 A 11/1990 Kenue
4,973,844 A 11/1990 O'Farrell et al.
4,974,122 A 11/1990 Shaw
4,978,196 A 12/1990 Suzuki et al.
4,983,951 A 1/1991 Igarashi et al.
4,985,809 A 1/1991 Matsui et al.
4,987,357 A 1/1991 Masaki
4,989,956 A 2/1991 Wu et al.
4,996,083 A 2/1991 Moser et al.
5,001,386 A 3/1991 Sullivan et al.
5,001,558 A 3/1991 Burley et al.
5,005,213 A 4/1991 Hanson et al.
5,006,971 A 4/1991 Jerkins
5,014,167 A 5/1991 Roberts
5,016,988 A 5/1991 Iimura
5,016,996 A 5/1991 Ueno
5,017,903 A 5/1991 Krippelz, Sr.
5,018,839 A 5/1991 Yamamoto et al.
5,027,200 A 6/1991 Petrossian et al.
5,037,182 A 8/1991 Groves et al.
5,038,255 A 8/1991 Nashihashi et al.
5,052,163 A 10/1991 Czekala
5,056,899 A 10/1991 Warszawski
5,057,974 A 10/1991 Mizobe
5,058,851 A 10/1991 Lawlor et al.
5,059,015 A 10/1991 Tran
5,066,108 A 11/1991 McDonald
5,066,112 A 11/1991 Lynam et al.
5,069,535 A 12/1991 Baucke et al.
5,070,323 A 12/1991 Iino et al.
5,073,012 A 12/1991 Lynam
5,076,673 A 12/1991 Lynam et al.
5,076,674 A 12/1991 Lynam
5,078,480 A 1/1992 Warszawski
5,096,287 A 3/1992 Kakinami et al.
5,100,095 A 3/1992 Haan et al.
5,101,139 A 3/1992 Lechter
5,105,127 A 4/1992 Lavaud et al.
5,115,346 A 5/1992 Lynam
5,119,220 A 6/1992 Narita et al.
5,121,200 A 6/1992 Choi
5,122,619 A 6/1992 Dlubak
5,123,077 A 6/1992 Endo et al.
5,124,845 A 6/1992 Shimojo
5,124,890 A 6/1992 Choi et al.
5,128,799 A 7/1992 Byker
5,130,898 A 7/1992 Akahane
5,131,154 A 7/1992 Schierbeek et al.
5,134,507 A 7/1992 Ishii
5,134,549 A 7/1992 Yokoyama
5,135,298 A 8/1992 Feltman
5,136,483 A 8/1992 Schöniger et al.
5,140,455 A 8/1992 Varaprasad et al.
5,140,465 A 8/1992 Yasui et al.
5,142,407 A 8/1992 Varaprasad et al.
5,145,609 A 9/1992 Varaprasad et al.
5,148,306 A 9/1992 Yamada et al.
5,150,232 A 9/1992 Gunkima et al.
5,151,816 A 9/1992 Varaprasad et al.
5,151,824 A 9/1992 O'Farrell
5,154,617 A 10/1992 Suman et al.
5,158,638 A 10/1992 Osanami et al.
5,160,200 A 11/1992 Cheselske
5,160,201 A 11/1992 Wrobel
5,166,815 A 11/1992 Elderfield
5,168,378 A 12/1992 Black et al.
5,173,881 A 12/1992 Sindle
5,177,031 A 1/1993 Buchmann et al.
5,178,448 A 1/1993 Adams et al.
5,179,471 A 1/1993 Caskey et al.
5,183,099 A 2/1993 Bechu
5,184,956 A 2/1993 Langlais et al.
5,189,537 A 2/1993 O'Farrell
5,193,029 A 3/1993 Schofield et al.
5,197,562 A 3/1993 Kakinama et al.
5,202,950 A 4/1993 Arego et al.
5,207,492 A 5/1993 Roberts
5,210,967 A 5/1993 Brown
5,212,819 A 5/1993 Wada
5,214,408 A 5/1993 Asayama
5,217,794 A 6/1993 Schrenk
5,223,814 A 6/1993 Suman
5,223,844 A 6/1993 Mansell et al.
5,229,975 A 7/1993 Truesdell et al.
5,230,400 A 7/1993 Kakinami et al.
5,233,461 A 8/1993 Dornan et al.
5,235,316 A 8/1993 Qualizza
5,239,405 A 8/1993 Varaprasad et al.
5,239,406 A 8/1993 Lynam
5,243,417 A 9/1993 Pollard
5,245,422 A 9/1993 Borcherts et al.
5,252,354 A 10/1993 Cronin et al.
5,253,109 A 10/1993 O'Farrell et al.
5,255,442 A 10/1993 Schierbeek et al.
5,260,626 A 11/1993 Takase et al.
5,277,986 A 1/1994 Cronin et al.
5,280,555 A 1/1994 Ainsburg
5,285,060 A 2/1994 Larson et al.
5,289,321 A 2/1994 Secor
5,296,924 A 3/1994 de Saint Blancard et al.
5,303,075 A 4/1994 Wada et al.
5,303,205 A 4/1994 Gauthier et al.
5,304,980 A 4/1994 Maekawa
5,305,012 A 4/1994 Faris
5,307,136 A 4/1994 Saneyoshi
5,313,335 A 5/1994 Gray et al.
5,325,096 A 6/1994 Pakett
5,325,386 A 6/1994 Jewell et al.
5,327,288 A 7/1994 Wellington et al.
5,330,149 A 7/1994 Haan et al.
5,331,312 A 7/1994 Kudoh
5,331,358 A 7/1994 Schurle et al.
5,339,075 A 8/1994 Abst et al.
5,339,529 A 8/1994 Lindberg
5,341,437 A 8/1994 Nakayama
D351,370 S 10/1994 Lawlor et al.
5,354,965 A 10/1994 Lee
5,355,118 A 10/1994 Fukuhara
5,355,245 A 10/1994 Lynam
5,355,284 A 10/1994 Roberts

(56) References Cited

U.S. PATENT DOCUMENTS 5,361,190 A 11/1994 Roberts et al.
5,363,294 A 11/1994 Yamamoto et al.
5,371,659 A 12/1994 Pastrick et al.
5,373,482 A 12/1994 Gauthier
5,379,146 A 1/1995 Defendini
5,386,285 A 1/1995 Asayama
5,386,306 A 1/1995 Gunjima et al.
5,400,158 A 3/1995 Ohnishi et al.
5,402,103 A 3/1995 Tashiro
5,406,395 A 4/1995 Wilson et al.
5,406,414 A 4/1995 O'Farrell et al.
5,408,353 A 4/1995 Nichols et al.
5,408,357 A 4/1995 Beukema
5,410,346 A 4/1995 Saneyoshi et al.
5,414,439 A 5/1995 Groves et al.
5,414,461 A 5/1995 Kishi et al.
5,416,313 A 5/1995 Larson et al.
5,416,478 A 5/1995 Morinaga
5,418,610 A 5/1995 Fischer
5,422,756 A 6/1995 Weber
5,424,726 A 6/1995 Beymer
5,424,865 A 6/1995 Lynam
5,424,952 A 6/1995 Asayama
5,426,524 A 6/1995 Wada et al.
5,426,723 A 6/1995 Horsley
5,430,431 A 7/1995 Nelson
5,432,496 A 7/1995 Lin
5,432,626 A 7/1995 Sasuga et al.
5,436,741 A 7/1995 Crandall
5,437,931 A 8/1995 Tsai et al.
5,439,305 A 8/1995 Santo
5,444,478 A 8/1995 Lelong et al.
5,446,576 A 8/1995 Lynam et al.
5,455,716 A 10/1995 Suman et al.
5,461,361 A 10/1995 Moore
D363,920 S 11/1995 Roberts et al.
5,469,187 A 11/1995 Yaniv
5,469,298 A 11/1995 Suman et al.
5,475,366 A 12/1995 Van Lente et al.
5,475,494 A 12/1995 Nishida et al.
5,481,409 A 1/1996 Roberts
5,483,453 A 1/1996 Uemura et al.
5,485,161 A 1/1996 Vaughn
5,485,378 A 1/1996 Franke et al.
5,487,522 A 1/1996 Hook
5,488,496 A 1/1996 Pine
5,497,305 A 3/1996 Pastrick et al.
5,497,306 A 3/1996 Pastrick
5,500,760 A 3/1996 Varaprasad et al.
5,506,701 A 4/1996 Ichikawa
5,509,606 A 4/1996 Breithaupt et al.
5,510,983 A 4/1996 Iino
5,515,448 A 5/1996 Nishitani
5,517,853 A 5/1996 Chamussy
5,519,621 A 5/1996 Wortham
5,521,744 A 5/1996 Mazurek
5,521,760 A 5/1996 DeYoung et al.
5,523,811 A 6/1996 Wada et al.
5,523,877 A 6/1996 Lynam
5,525,264 A 6/1996 Cronin et al.
5,525,977 A 6/1996 Suman
5,528,422 A 6/1996 Roberts
5,528,474 A 6/1996 Roney et al.
5,529,138 A 6/1996 Shaw et al.
5,530,240 A 6/1996 Larson et al.
5,530,420 A 6/1996 Tsuchiya et al.
5,530,421 A 6/1996 Marshall et al.
5,535,056 A 7/1996 Caskey et al.
5,535,144 A 7/1996 Kise
5,539,397 A 7/1996 Asanuma et al.
5,541,590 A 7/1996 Nishio
5,550,677 A 8/1996 Schofield et al.
5,555,172 A 9/1996 Potter
5,561,333 A 10/1996 Darius
5,566,224 A 10/1996 ul Azam et al.
5,567,360 A 10/1996 Varaprasad et al.
5,568,316 A 10/1996 Schrenck et al.
5,570,127 A 10/1996 Schmidt
5,572,354 A 11/1996 Desmond et al.
5,574,426 A 11/1996 Shisgal et al.
5,574,443 A 11/1996 Hsieh
5,575,552 A 11/1996 Faloon et al.
5,576,687 A 11/1996 Blank et al.
5,576,854 A 11/1996 Schmidt et al.
5,576,975 A 11/1996 Sasaki et al.
5,578,404 A 11/1996 Kliem
5,587,236 A 12/1996 Agrawal et al.
5,587,699 A 12/1996 Faloon et al.
5,593,221 A 1/1997 Evanicky et al.
5,594,222 A 1/1997 Caldwell
5,594,560 A 1/1997 Jelley et al.
5,594,615 A 1/1997 Spijkerman et al.
5,602,542 A 2/1997 Widmann
5,602,670 A 2/1997 Keegan
5,603,104 A 2/1997 Phelps, III et al.
5,608,550 A 3/1997 Epstein et al.
5,609,652 A 3/1997 Yamada et al.
5,610,380 A 3/1997 Nicolaisen
5,610,756 A 3/1997 Lynam et al.
5,611,966 A 3/1997 Varaprasad et al.
5,614,885 A 3/1997 Van Lente et al.
5,615,023 A 3/1997 Yang
5,615,857 A 4/1997 Hook
5,617,085 A 4/1997 Tsutsumi et al.
5,619,374 A 4/1997 Roberts
5,619,375 A 4/1997 Roberts
5,621,571 A 4/1997 Bantli et al.
5,626,800 A 5/1997 Williams et al.
5,631,089 A 5/1997 Center, Jr. et al.
5,631,638 A 5/1997 Kaspar et al.
5,631,639 A 5/1997 Hibino et al.
5,632,092 A 5/1997 Blank et al.
5,632,551 A 5/1997 Roney et al.
5,634,709 A 6/1997 Iwama
5,640,216 A 6/1997 Hasegawa et al.
5,642,238 A 6/1997 Sala
5,644,851 A 7/1997 Blank et al.
5,646,614 A 7/1997 Abersfelder et al.
5,649,756 A 7/1997 Adams et al.
5,649,758 A 7/1997 Dion
5,650,765 A 7/1997 Park
5,650,929 A 7/1997 Potter et al.
5,661,455 A 8/1997 Van Lente et al.
5,661,651 A 8/1997 Geschke et al.
5,661,804 A 8/1997 Dykema et al.
5,662,375 A 9/1997 Adams et al.
5,666,157 A 9/1997 Aviv
5,667,289 A 9/1997 Akahane et al.
5,668,663 A 9/1997 Varaprasad et al.
5,668,675 A 9/1997 Fredricks
5,669,698 A 9/1997 Veldman et al.
5,669,699 A 9/1997 Pastrick et al.
5,669,704 A 9/1997 Pastrick
5,669,705 A 9/1997 Pastrick et al.
5,670,935 A 9/1997 Schofield et al.
5,671,996 A 9/1997 Bos et al.
5,673,994 A 10/1997 Fant, Jr. et al.
5,673,999 A 10/1997 Koenck
5,677,598 A 10/1997 De Hair et al.
5,679,283 A 10/1997 Tonar et al.
5,680,123 A 10/1997 Lee
5,680,245 A 10/1997 Lynam
5,680,263 A 10/1997 Zimmermann et al.
5,686,975 A 11/1997 Lipton
5,686,979 A 11/1997 Weber et al.
5,689,241 A 11/1997 Clarke, Sr. et al.
5,689,370 A 11/1997 Tonar et al.
5,691,848 A 11/1997 Van Lente et al.
5,692,819 A 12/1997 Mitsutake et al.
5,696,529 A 12/1997 Evanicky et al.
5,696,567 A 12/1997 Wada et al.
5,699,044 A 12/1997 Van Lente et al.
5,699,188 A 12/1997 Gilbert et al.
5,703,568 A 12/1997 Hegyi

(56) References Cited

U.S. PATENT DOCUMENTS 5,708,410 A 1/1998 Blank et al.
5,708,415 A 1/1998 Van Lente et al.
5,708,857 A 1/1998 Ishibashi
5,715,093 A 2/1998 Schierbeek et al.
5,724,187 A 3/1998 Varaprasad et al.
5,724,316 A 3/1998 Brunts
5,729,194 A 3/1998 Spears et al.
5,737,226 A 4/1998 Olson et al.
5,741,966 A 4/1998 Handfield et al.
5,744,227 A 4/1998 Bright et al.
5,745,050 A 4/1998 Nakagawa
5,745,266 A 4/1998 Smith
5,748,172 A 5/1998 Song et al.
5,748,287 A 5/1998 Takahashi et al.
5,751,211 A 5/1998 Shirai et al.
5,751,246 A 5/1998 Hertel
5,751,390 A 5/1998 Crawford et al.
5,751,489 A 5/1998 Caskey et al.
5,754,099 A 5/1998 Nishimura et al.
D394,833 S 6/1998 Muth
5,760,242 A 6/1998 Igarashi et al.
5,760,828 A 6/1998 Cortes
5,760,931 A 6/1998 Saburi et al.
5,760,962 A 6/1998 Schofield et al.
5,761,094 A 6/1998 Olson et al.
5,762,823 A 6/1998 Hikmet
5,764,139 A 6/1998 Nojima et al.
5,765,940 A 6/1998 Levy et al.
5,767,793 A 6/1998 Agravante et al.
5,768,020 A 6/1998 Nagao
5,775,762 A 7/1998 Vitito
5,777,779 A 7/1998 Hashimoto et al.
5,780,160 A 7/1998 Allemand et al.
5,786,772 A 7/1998 Schofield et al.
5,788,357 A 8/1998 Muth et al.
5,790,298 A 8/1998 Tonar
5,790,502 A 8/1998 Horinouchi et al.
5,790,973 A 8/1998 Blaker et al.
5,793,308 A 8/1998 Rosinski et al.
5,793,420 A 8/1998 Schmidt
5,796,094 A 8/1998 Schofield et al.
5,796,176 A 8/1998 Kramer et al.
5,798,057 A 8/1998 Hikmet
5,798,575 A 8/1998 O'Farrell et al.
5,798,688 A 8/1998 Schofield
5,800,918 A 9/1998 Chartier et al.
5,802,727 A 9/1998 Blank et al.
5,803,579 A 9/1998 Turnbull et al.
5,805,330 A 9/1998 Byker et al.
5,805,367 A 9/1998 Kanazawa
5,806,879 A 9/1998 Hamada et al.
5,806,965 A 9/1998 Deese
5,808,197 A 9/1998 Dao
5,808,566 A 9/1998 Behr et al.
5,808,589 A 9/1998 Fergason
5,808,713 A 9/1998 Broer et al.
5,808,777 A 9/1998 Lynam et al.
5,808,778 A 9/1998 Bauer et al.
5,812,321 A 9/1998 Schierbeek et al.
5,813,745 A 9/1998 Fant, Jr. et al.
5,818,625 A 10/1998 Forgette et al.
5,820,097 A 10/1998 Spooner
5,820,245 A 10/1998 Desmond et al.
5,822,023 A 10/1998 Suman et al.
5,823,654 A 10/1998 Pastrick et al.
5,825,527 A 10/1998 Forgette et al.
5,835,166 A 11/1998 Hall et al.
5,837,994 A 11/1998 Stam et al.
5,844,505 A 12/1998 Van Ryzin
5,848,373 A 12/1998 DeLorme et al.
5,850,176 A 12/1998 Kinoshita et al.
5,850,205 A 12/1998 Blouin
5,863,116 A 1/1999 Pastrick et al.
5,864,419 A 1/1999 Lynam
5,867,801 A 2/1999 Denny
5,871,275 A 2/1999 O'Farrell et al.
5,871,843 A 2/1999 Yoneda et al.
5,877,707 A 3/1999 Kowalick
5,877,897 A 3/1999 Schofield et al.
5,878,353 A 3/1999 ul Azam et al.
5,878,370 A 3/1999 Olson
5,879,074 A 3/1999 Pastrick
5,883,605 A 3/1999 Knapp
5,883,684 A 3/1999 Millikan et al.
5,883,739 A 3/1999 Ashihara et al.
5,888,431 A 3/1999 Tonar et al.
5,894,196 A 4/1999 McDermott
D409,540 S 5/1999 Muth
5,899,551 A 5/1999 Neijzen et al.
5,899,956 A 5/1999 Chan
5,904,729 A 5/1999 Ruzicka
5,910,854 A 6/1999 Varaprasad et al.
5,914,815 A 6/1999 Bos
5,917,664 A 6/1999 O'Neill et al.
5,918,180 A 6/1999 Dimino
5,920,367 A 7/1999 Kajimoto et al.
5,922,176 A 7/1999 Caskey
5,923,027 A 7/1999 Stam et al.
5,923,457 A 7/1999 Byker et al.
5,924,212 A 7/1999 Domanski
5,926,087 A 7/1999 Busch et al.
5,927,792 A 7/1999 Welling et al.
5,928,572 A 7/1999 Tonar et al.
5,929,786 A 7/1999 Schofield et al.
5,935,702 A 8/1999 Macquart et al.
5,936,774 A 8/1999 Street
5,938,320 A 8/1999 Crandall
5,938,321 A 8/1999 Bos et al.
5,938,721 A 8/1999 Dussell et al.
5,940,011 A 8/1999 Agravante et al.
5,940,120 A 8/1999 Frankhouse et al.
5,940,201 A 8/1999 Ash et al.
5,942,895 A 8/1999 Popovic et al.
5,947,586 A 9/1999 Weber
5,949,331 A 9/1999 Schofield et al.
5,949,345 A 9/1999 Beckert et al.
5,949,506 A 9/1999 Jones et al.
5,956,079 A 9/1999 Ridgley
5,956,181 A 9/1999 Lin
5,959,367 A 9/1999 O'Farrell et al.
5,959,555 A 9/1999 Furuta
5,959,577 A 9/1999 Fan et al.
5,963,247 A 10/1999 Banitt
5,963,284 A 10/1999 Jones et al.
5,965,247 A 10/1999 Jonza et al.
5,968,538 A 10/1999 Snyder, Jr.
5,971,552 A 10/1999 O'Farrell et al.
5,973,760 A 10/1999 Dehmlow
5,975,715 A 11/1999 Bauder
5,984,482 A 11/1999 Rumsey et al.
5,986,730 A 11/1999 Hansen et al.
5,990,469 A 11/1999 Bechtel et al.
5,990,625 A 11/1999 Meissner et al.
5,995,180 A 11/1999 Moriwaki et al.
5,998,617 A 12/1999 Srinivasa et al.
5,998,929 A 12/1999 Bechtel et al.
6,000,823 A 12/1999 Desmond et al.
6,001,486 A 12/1999 Varaprasad et al.
6,002,511 A 12/1999 Varaprasad et al.
6,002,983 A 12/1999 Alland et al.
6,005,724 A 12/1999 Todd
6,007,222 A 12/1999 Thau
6,008,486 A 12/1999 Stam et al.
6,008,871 A 12/1999 Okumura
6,009,359 A 12/1999 El-Hakim et al.
6,016,035 A 1/2000 Eberspächer et al.
6,016,215 A 1/2000 Byker
6,019,411 A 2/2000 Carter et al.
6,019,475 A 2/2000 Lynam et al.
6,020,987 A 2/2000 Baumann et al.
6,021,371 A 2/2000 Fultz
6,023,229 A 2/2000 Bugno et al.
6,025,872 A 2/2000 Ozaki et al.
6,028,537 A 2/2000 Suman et al.

(56) References Cited

U.S. PATENT DOCUMENTS 6,037,689 A 3/2000 Bingle et al.
6,040,939 A 3/2000 Demiryont et al.
6,042,253 A 3/2000 Fant, Jr. et al.
6,042,934 A 3/2000 Guiselin et al.
6,045,243 A 4/2000 Muth et al.
6,045,643 A 4/2000 Byker et al.
6,046,766 A 4/2000 Sakata
6,046,837 A 4/2000 Yamamoto
6,049,171 A 4/2000 Stam et al.
D425,466 S 5/2000 Todd et al.
6,060,989 A 5/2000 Gehlot
6,061,002 A 5/2000 Weber et al.
6,062,920 A 5/2000 Jordan et al.
6,064,508 A 5/2000 Forgette et al.
6,065,840 A 5/2000 Caskey et al.
6,066,920 A 5/2000 Torihara et al.
6,067,111 A 5/2000 Hahn et al.
6,067,500 A 5/2000 Morimoto et al.
6,068,380 A 5/2000 Lynn et al.
D426,506 S 6/2000 Todd et al.
D426,507 S 6/2000 Todd et al.
D427,128 S 6/2000 Mathieu
6,072,391 A 6/2000 Suzuki et al.
6,074,077 A 6/2000 Pastrick et al.
6,074,777 A 6/2000 Reimers et al.
6,076,948 A 6/2000 Bukosky et al.
6,078,355 A 6/2000 Zengel
6,078,865 A 6/2000 Koyanagi
D428,372 S 7/2000 Todd et al.
D428,373 S 7/2000 Todd et al.
6,082,881 A 7/2000 Hicks
6,084,700 A 7/2000 Knapp et al.
6,086,131 A 7/2000 Bingle et al.
6,086,229 A 7/2000 Pastrick
6,087,012 A 7/2000 Varaprasad et al.
6,087,953 A 7/2000 DeLine et al.
6,091,343 A 7/2000 Dykema et al.
6,093,976 A 7/2000 Kramer et al.
6,094,618 A 7/2000 Harada
D428,842 S 8/2000 Todd et al.
D429,202 S 8/2000 Todd et al.
D430,088 S 8/2000 Todd et al.
6,097,023 A 8/2000 Schofield et al.
6,097,316 A 8/2000 Liaw et al.
6,099,131 A 8/2000 Fletcher et al.
6,099,155 A 8/2000 Pastrick et al.
6,100,811 A 8/2000 Hsu et al.
6,102,546 A 8/2000 Carter
6,102,559 A 8/2000 Nold et al.
6,104,552 A 8/2000 Thau et al.
6,106,121 A 8/2000 Buckley et al.
6,111,498 A 8/2000 Jobes, et al.
6,111,683 A 8/2000 Cammenga et al.
6,111,684 A 8/2000 Forgette et al.
6,111,685 A 8/2000 Tench et al.
6,111,696 A 8/2000 Allen et al.
6,115,086 A 9/2000 Rosen
6,115,651 A 9/2000 Cruz
6,116,743 A 9/2000 Hoek
6,118,219 A 9/2000 Okigami et al.
6,122,597 A 9/2000 Saneyoshi et al.
6,122,921 A 9/2000 Brezoczky et al.
6,124,647 A 9/2000 Marcus et al.
6,124,886 A 9/2000 DeLine et al.
6,127,919 A 10/2000 Wylin
6,127,945 A 10/2000 Mura-Smith
6,128,576 A 10/2000 Nishimoto et al.
6,130,421 A 10/2000 Bechtel et al.
6,130,448 A 10/2000 Bauer et al.
6,132,072 A 10/2000 Turnbull et al.
6,137,620 A 10/2000 Guarr et al.
6,139,171 A 10/2000 Waldmann
6,139,172 A 10/2000 Bos et al.
6,140,933 A 10/2000 Bugno et al.
6,142,656 A 11/2000 Kurth
6,146,003 A 11/2000 Thau
6,147,934 A 11/2000 Arikawa et al.
6,148,261 A 11/2000 Obradovich et al.
6,149,287 A 11/2000 Pastrick et al.
6,150,014 A 11/2000 Chu et al.
6,151,065 A 11/2000 Steed et al.
6,151,539 A 11/2000 Bergholz et al.
6,152,551 A 11/2000 Annas
6,152,590 A 11/2000 Fürst et al.
6,154,149 A 11/2000 Tyckowski et al.
6,154,306 A 11/2000 Varaprasad et al.
6,157,294 A 12/2000 Urai et al.
6,157,418 A 12/2000 Rosen
6,157,424 A 12/2000 Eichenlaub
6,157,480 A 12/2000 Anderson et al.
6,158,655 A 12/2000 DeVries, Jr. et al.
6,161,071 A 12/2000 Shuman et al.
6,161,865 A 12/2000 Rose et al.
6,164,564 A 12/2000 Franco et al.
6,166,625 A 12/2000 Teowee et al.
6,166,629 A 12/2000 Hamma et al.
6,166,834 A 12/2000 Taketomi et al.
6,166,847 A 12/2000 Tench et al.
6,166,848 A 12/2000 Cammenga et al.
6,167,255 A 12/2000 Kennedy, III et al.
6,167,755 B1 1/2001 Damson et al.
6,169,955 B1 1/2001 Fultz
6,170,956 B1 1/2001 Rumsey et al.
6,172,600 B1 1/2001 Kakinama et al.
6,172,601 B1 1/2001 Wada et al.
6,172,613 B1 1/2001 DeLine et al.
6,173,501 B1 1/2001 Blank et al.
6,175,164 B1 1/2001 O'Farrell et al.
6,175,300 B1 1/2001 Kendrick
6,176,602 B1 1/2001 Pastrick et al.
6,178,034 B1 1/2001 Allemand et al.
6,178,377 B1 1/2001 Ishihara et al.
6,181,387 B1 1/2001 Rosen
6,182,006 B1 1/2001 Meek
6,183,119 B1 2/2001 Desmond et al.
6,184,679 B1 2/2001 Popovic et al.
6,184,781 B1 2/2001 Ramakesavan
6,185,492 B1 2/2001 Kagawa et al.
6,185,501 B1 2/2001 Smith et al.
6,188,505 B1 2/2001 Lomprey et al.
6,191,704 B1 2/2001 Takenaga et al.
6,193,379 B1 2/2001 Tonar et al.
6,193,912 B1 2/2001 Thieste et al.
6,195,194 B1 2/2001 Roberts et al.
6,196,688 B1 3/2001 Caskey et al.
6,198,409 B1 3/2001 Schofield et al.
6,199,014 B1 3/2001 Walker et al.
6,199,810 B1 3/2001 Wu et al.
6,200,010 B1 3/2001 Anders
6,201,642 B1 3/2001 Bos
6,206,553 B1 3/2001 Boddy et al.
6,207,083 B1 3/2001 Varaprasad et al.
6,210,008 B1 4/2001 Hoekstra et al.
6,210,012 B1 4/2001 Broer
6,212,470 B1 4/2001 Seymour et al.
6,217,181 B1 4/2001 Lynam et al.
6,218,934 B1 4/2001 Regan
6,222,447 B1 4/2001 Schofield et al.
6,222,460 B1 4/2001 DeLine et al.
6,222,689 B1 4/2001 Higuchi et al.
6,226,061 B1 5/2001 Tagusa
6,227,689 B1 5/2001 Miller
6,232,937 B1 5/2001 Jacobsen et al.
6,236,514 B1 5/2001 Sato
6,239,851 B1 5/2001 Hatazawa et al.
6,239,898 B1 5/2001 Byker et al.
6,239,899 B1 5/2001 DeVries et al.
6,243,003 B1 6/2001 DeLine et al.
6,244,716 B1 6/2001 Steenwyk et al.
6,245,262 B1 6/2001 Varaprasad et al.
6,246,933 B1 6/2001 Bague
6,247,820 B1 6/2001 Van Order
6,249,214 B1 6/2001 Kashiwazaki
6,249,310 B1 6/2001 Lefkowitz

(56) References Cited

U.S. PATENT DOCUMENTS 6,249,369 B1 6/2001 Theiste et al.
6,250,148 B1 6/2001 Lynam
6,250,766 B1 6/2001 Strumolo et al.
6,250,783 B1 6/2001 Stidham et al.
6,255,639 B1 7/2001 Stam et al.
6,257,746 B1 7/2001 Todd et al.
6,259,412 B1 7/2001 Duroux
6,259,423 B1 7/2001 Tokito et al.
6,259,475 B1 7/2001 Ramachandran et al.
6,260,608 B1 7/2001 Kim
6,262,842 B1 7/2001 Ouderkirk et al.
6,264,353 B1 7/2001 Caraher et al.
6,265,968 B1 7/2001 Betzitza et al.
6,268,803 B1 7/2001 Gunderson et al.
6,268,837 B1 7/2001 Kobayashi et al.
6,269,308 B1 7/2001 Kodaka et al.
6,271,901 B1 8/2001 Ide et al.
6,274,221 B2 8/2001 Smith et al.
6,275,231 B1 8/2001 Obradovich
6,276,821 B1 8/2001 Pastrick et al.
6,276,822 B1 8/2001 Bedrosian et al.
6,277,471 B1 8/2001 Tang
6,278,271 B1 8/2001 Schott
6,278,377 B1 8/2001 DeLine et al.
6,278,941 B1 8/2001 Yokoyama
6,280,068 B1 8/2001 Mertens et al.
6,280,069 B1 8/2001 Pastrick et al.
6,281,804 B1 8/2001 Haller et al.
6,286,965 B1 9/2001 Caskey et al.
6,286,984 B1 9/2001 Berg
6,289,332 B2 9/2001 Menig et al.
6,290,378 B1 9/2001 Buchalla et al.
6,291,905 B1 9/2001 Drummond et al.
6,291,906 B1 9/2001 Marcus et al.
6,294,989 B1 9/2001 Schofield et al.
6,296,379 B1 10/2001 Pastrick
6,297,781 B1 10/2001 Turnbull et al.
6,299,333 B1 10/2001 Pastrick et al.
6,300,879 B1 10/2001 Ragan et al.
6,301,039 B1 10/2001 Tench
6,304,173 B2 10/2001 Pala et al.
6,305,807 B1 10/2001 Schierbeek
6,310,611 B1 10/2001 Caldwell
6,310,714 B1 10/2001 Lomprey et al.
6,310,738 B1 10/2001 Chu
6,313,454 B1 11/2001 Bos et al.
6,314,295 B1 11/2001 Kawamoto
6,315,440 B1 11/2001 Satoh
6,317,057 B1 11/2001 Lee
6,317,180 B1 11/2001 Kuroiwa et al.
6,317,248 B1 11/2001 Agrawal et al.
6,318,870 B1 11/2001 Spooner et al.
6,320,176 B1 11/2001 Schofield et al.
6,320,282 B1 11/2001 Caldwell
6,320,612 B1 11/2001 Young
6,324,295 B1 11/2001 Valery et al.
6,326,613 B1 12/2001 Heslin et al.
6,326,900 B2 12/2001 DeLine et al.
6,327,925 B1 12/2001 Gombert et al.
6,329,925 B1 12/2001 Skiver et al.
6,330,511 B2 12/2001 Ogura et al.
6,331,066 B1 12/2001 Desmond et al.
6,333,759 B1 12/2001 Mazzilli
6,335,680 B1 1/2002 Matsuoka
6,336,737 B1 1/2002 Thau
6,340,850 B2 1/2002 O'Farrell et al.
6,341,523 B2 1/2002 Lynam
6,344,805 B1 2/2002 Yasui et al.
6,346,698 B1 2/2002 Turnbull
6,347,880 B1 2/2002 Fürst et al.
6,348,858 B2 2/2002 Weis et al.
6,351,708 B1 2/2002 Takagi et al.
6,353,392 B1 3/2002 Schofield et al.
6,356,206 B1 3/2002 Takenaga et al.
6,356,376 B1 3/2002 Tonar et al.
6,356,389 B1 3/2002 Nilsen et al.
6,357,883 B1 3/2002 Strumolo et al.
6,359,392 B1 3/2002 He
6,362,121 B1 3/2002 Chopin et al.
6,362,548 B1 3/2002 Bingle et al.
6,363,326 B1 3/2002 Scully
6,366,013 B1 4/2002 Leenders et al.
6,366,213 B2 4/2002 DeLine et al.
6,369,701 B1 4/2002 Yoshida et al.
6,370,329 B1 4/2002 Teuchert
6,371,636 B1 4/2002 Wesson
6,379,013 B1 4/2002 Bechtel et al.
6,379,788 B2 4/2002 Choi et al.
6,382,805 B1 5/2002 Miyabukuro
6,385,139 B1 5/2002 Arikawa et al.
6,386,742 B1 5/2002 DeLine et al.
6,390,529 B1 5/2002 Bingle et al.
6,390,626 B2 5/2002 Knox
6,390,635 B2 5/2002 Whitehead et al.
6,396,397 B1 5/2002 Bos et al.
6,396,408 B2 5/2002 Drummond et al.
6,396,637 B2 5/2002 Roest et al.
6,407,468 B1 6/2002 LeVesque et al.
6,407,847 B1 6/2002 Poll et al.
6,408,247 B1 6/2002 Ichikawa et al.
6,411,204 B1 6/2002 Bloomfield et al.
6,412,959 B1 7/2002 Tseng
6,412,973 B1 7/2002 Bos et al.
6,414,910 B1 7/2002 Kaneko et al.
6,415,230 B1 7/2002 Maruko et al.
6,416,208 B2 7/2002 Pastrick et al.
6,417,786 B2 7/2002 Learman et al.
6,418,376 B1 7/2002 Olson
6,419,300 B1 7/2002 Pavao et al.
6,420,036 B1 7/2002 Varaprasad et al.
6,420,800 B1 7/2002 LeVesque et al.
6,420,975 B1 7/2002 DeLine et al.
6,421,081 B1 7/2002 Markus
6,424,272 B1 7/2002 Gutta et al.
6,424,273 B1 7/2002 Gutta et al.
6,424,786 B1 7/2002 Beeson et al.
6,424,892 B1 7/2002 Matsuoka
6,426,492 B1 7/2002 Bos et al.
6,426,568 B2 7/2002 Turnbull et al.
6,427,349 B1 8/2002 Blank et al.
6,428,172 B1 8/2002 Hutzel et al.
6,433,676 B2 8/2002 DeLine et al.
6,433,680 B1 8/2002 Ho
6,433,914 B1 8/2002 Lomprey et al.
6,437,688 B1 8/2002 Kobayashi
6,438,491 B1 8/2002 Farmer
6,439,755 B1 8/2002 Fant, Jr. et al.
6,441,872 B1 8/2002 Ho
6,441,943 B1 8/2002 Roberts et al.
6,441,963 B2 8/2002 Murakami et al.
6,441,964 B1 8/2002 Chu et al.
6,445,287 B1 9/2002 Schofield et al.
6,447,128 B1 9/2002 Lang et al.
6,449,082 B1 9/2002 Agrawal et al.
6,452,533 B1 9/2002 Yamabuchi et al.
6,452,572 B1 9/2002 Fan et al.
6,456,438 B1 9/2002 Lee et al.
6,462,795 B1 10/2002 Clarke
6,463,369 B2 10/2002 Sadano et al.
6,466,701 B1 10/2002 Ejiri et al.
6,471,362 B1 10/2002 Carter et al.
6,472,977 B1 10/2002 Pöchmuller
6,472,979 B2 10/2002 Schofield et al.
6,473,001 B1 10/2002 Blum
6,474,853 B2 11/2002 Pastrick et al.
6,476,731 B1 11/2002 Miki et al.
6,476,855 B1 11/2002 Yamamoto
6,477,460 B2 11/2002 Kepler
6,477,464 B2 11/2002 McCarthy et al.
6,483,429 B1 11/2002 Yasui et al.
6,483,438 B2 11/2002 DeLine et al.
6,483,613 B1 11/2002 Woodgate et al.
6,487,500 B2 11/2002 Lemelson et al.
6,494,602 B2 12/2002 Pastrick et al.

(56) References Cited

U.S. PATENT DOCUMENTS 6,498,620 B2 12/2002 Schofield et al.
6,501,387 B2 12/2002 Skiver et al.
6,512,203 B2 1/2003 Jones et al.
6,512,624 B2 1/2003 Tonar et al.
6,513,252 B1 2/2003 Schierbeek et al.
6,515,378 B2 2/2003 Drummond et al.
6,515,581 B1 2/2003 Ho
6,515,582 B1 2/2003 Teowee
6,515,597 B1 2/2003 Wada et al.
6,516,664 B2 2/2003 Lynam
6,518,691 B1 2/2003 Baba
6,519,209 B1 2/2003 Arikawa et al.
6,520,667 B1 2/2003 Mousseau
6,522,451 B1 2/2003 Lynam
6,522,969 B2 2/2003 Kannonji
6,525,707 B1 2/2003 Kaneko et al.
6,534,884 B2 3/2003 Marcus et al.
6,538,709 B1 3/2003 Kurihara et al.
6,539,306 B2 3/2003 Turnbull et al.
6,542,085 B1 4/2003 Yang
6,542,182 B1 4/2003 Chautorash
6,543,163 B1 4/2003 Ginsberg
6,545,598 B1 4/2003 de Villeroche
6,549,253 B1 4/2003 Robbie et al.
6,549,335 B1 4/2003 Trapani et al.
6,550,949 B1 4/2003 Bauer et al.
6,552,326 B2 4/2003 Turnbull
6,552,653 B2 4/2003 Nakaho et al.
6,553,130 B1 4/2003 Lemelson et al.
6,553,308 B1 4/2003 Uhlmann et al.
6,559,761 B1 5/2003 Miller et al.
6,559,902 B1 5/2003 Kusuda et al.
6,560,004 B2 5/2003 Theiste et al.
6,560,027 B2 5/2003 Meine
6,566,821 B2 5/2003 Nakatsuka et al.
6,567,060 B1 5/2003 Sekiguchi
6,567,708 B1 5/2003 Bechtel et al.
6,568,839 B1 5/2003 Pastrick et al.
6,572,233 B1 6/2003 Northman et al.
6,573,957 B1 6/2003 Suzuki
6,573,963 B2 6/2003 Ouderkirk et al.
6,575,582 B2 6/2003 Tenmyo
6,575,643 B2 6/2003 Takashashi
6,578,989 B2 6/2003 Osumi et al.
6,580,373 B1 6/2003 Ohashi
6,580,479 B1 6/2003 Sekiguchi et al.
6,580,562 B2 6/2003 Aoki et al.
6,581,007 B2 6/2003 Hasegawa et al.
6,583,730 B2 6/2003 Lang et al.
6,591,192 B2 7/2003 Okamura et al.
6,592,230 B2 7/2003 Dupay
6,593,011 B2 7/2003 Liu et al.
6,593,565 B2 7/2003 Heslin et al.
6,593,984 B2 7/2003 Arakawa et al.
6,594,065 B2 7/2003 Byker et al.
6,594,067 B2 7/2003 Poll et al.
6,594,090 B2 7/2003 Kruschwitz et al.
6,594,583 B2 7/2003 Ogura et al.
6,594,614 B2 7/2003 Studt et al.
6,595,649 B2 7/2003 Hoekstra et al.
6,597,489 B1 7/2003 Guarr et al.
6,606,183 B2 8/2003 Ikai et al.
6,611,202 B2 8/2003 Schofield et al.
6,611,227 B1 8/2003 Nebiyeloul-Kifle et al.
6,611,759 B2 8/2003 Brosche
6,612,723 B2 9/2003 Futhey et al.
6,614,387 B1 9/2003 Deadman
6,614,419 B1 9/2003 May
6,614,579 B2 9/2003 Roberts et al.
6,615,438 B1 9/2003 Franco et al.
6,616,313 B2 9/2003 Fürst et al.
6,616,764 B2 9/2003 Krämer et al.
6,618,672 B2 9/2003 Sasaki et al.
6,621,616 B1 9/2003 Bauer et al.
6,624,936 B2 9/2003 Kotchick et al.
6,627,918 B2 9/2003 Getz et al.
6,630,888 B2 10/2003 Lang et al.
6,636,190 B2 10/2003 Hirakata et al.
6,636,258 B2 10/2003 Strumolo
6,638,582 B1 10/2003 Uchiyama et al.
6,639,360 B2 10/2003 Roberts et al.
6,642,840 B2 11/2003 Lang et al.
6,642,851 B2 11/2003 DeLine et al.
6,646,697 B1 11/2003 Sekiguchi et al.
6,648,477 B2 11/2003 Hutzel et al.
6,650,457 B2 11/2003 Busscher et al.
6,657,607 B1 12/2003 Evanicky et al.
6,661,482 B2 12/2003 Hara
6,661,830 B1 12/2003 Reed et al.
6,663,262 B2 12/2003 Boyd et al.
6,665,592 B2 12/2003 Kodama
6,667,726 B1 12/2003 Damiani et al.
6,669,109 B2 12/2003 Ivanov et al.
6,669,285 B1 12/2003 Park et al.
6,670,207 B1 12/2003 Roberts
6,670,910 B2 12/2003 Delcheccolo et al.
6,670,935 B2 12/2003 Yeon et al.
6,670,941 B2 12/2003 Albu et al.
6,671,080 B2 12/2003 Poll et al.
6,672,731 B2 1/2004 Schnell et al.
6,672,734 B2 1/2004 Lammers
6,672,744 B2 1/2004 DeLine et al.
6,672,745 B1 1/2004 Bauer et al.
6,674,370 B2 1/2004 Rodewald et al.
6,675,075 B1 1/2004 Engelsberg et al.
6,678,083 B1 1/2004 Anstee
6,678,614 B2 1/2004 McCarthy et al.
6,679,608 B2 1/2004 Bechtel et al.
6,683,539 B2 1/2004 Trajkovic et al.
6,683,969 B1 1/2004 Nishigaki et al.
6,685,348 B2 2/2004 Pastrick et al.
6,690,262 B1 2/2004 Winnett
6,690,268 B2 2/2004 Schofield et al.
6,690,413 B1 2/2004 Moore
6,690,438 B2 2/2004 Sekiguchi
6,691,464 B2 2/2004 Nestell et al.
6,693,517 B2 2/2004 McCarthy et al.
6,693,518 B2 2/2004 Kumata et al.
6,693,519 B2 2/2004 Keirstead
6,693,524 B1 2/2004 Payne
6,700,692 B2 3/2004 Tonar et al.
6,704,434 B1 3/2004 Sakoh et al.
6,709,136 B2 3/2004 Pastrick et al.
6,713,783 B1 3/2004 Mase et al.
6,717,109 B1 4/2004 Macher et al.
6,717,610 B1 4/2004 Bos et al.
6,717,712 B2 4/2004 Lynam et al.
6,719,215 B2 4/2004 Droulliard
6,724,446 B2 4/2004 Motomura et al.
6,726,337 B2 4/2004 Whitehead et al.
6,727,807 B2 4/2004 Trajkovic et al.
6,727,808 B1 4/2004 Uselmann et al.
6,727,844 B1 4/2004 Zimmermann et al.
6,731,332 B1 5/2004 Yasui et al.
6,734,807 B2 5/2004 King
6,736,526 B2 5/2004 Matsuba et al.
6,737,629 B2 5/2004 Nixon et al.
6,737,630 B2 5/2004 Turnbull
6,737,964 B2 5/2004 Samman et al.
6,738,088 B1 5/2004 Uskolovsky et al.
6,742,904 B2 6/2004 Bechtel et al.
6,744,353 B2 6/2004 Sjönell
6,746,775 B1 6/2004 Boire et al.
6,747,716 B2 6/2004 Kuroiwa et al.
6,748,211 B1 6/2004 Isaac et al.
6,749,308 B1 6/2004 Niendorf et al.
6,755,542 B2 6/2004 Bechtel et al.
6,756,912 B2 6/2004 Skiver et al.
6,757,039 B2 6/2004 Ma
6,757,109 B2 6/2004 Bos
D493,131 S 7/2004 Lawlor et al.
D493,394 S 7/2004 Lawlor et al.
6,759,113 B1 7/2004 Tang
6,759,945 B2 7/2004 Richard

(56) References Cited

U.S. PATENT DOCUMENTS 6,760,157 B1 7/2004 Stover et al.
6,765,480 B2 7/2004 Tseng
6,773,116 B2 8/2004 De Vaan et al.
6,774,356 B2 8/2004 Heslin et al.
6,774,810 B2 8/2004 DeLine et al.
6,778,904 B2 8/2004 Iwami et al.
6,779,900 B1 8/2004 Nolan-Brown
6,781,738 B2 8/2004 Kikuchi et al.
6,782,718 B2 8/2004 Lingle et al.
6,784,129 B2 8/2004 Seto et al.
6,797,396 B1 9/2004 Liu et al.
6,800,871 B2 10/2004 Matsuda et al.
6,801,127 B2 10/2004 Mizusawa et al.
6,801,244 B2 10/2004 Takeda et al.
6,801,283 B2 10/2004 Koyama et al.
6,805,474 B2 10/2004 Walser et al.
6,806,452 B2 10/2004 Bos et al.
6,806,922 B2 10/2004 Ishitaka
6,810,323 B1 10/2004 Bullock et al.
6,812,463 B2 11/2004 Okada
6,812,907 B1 11/2004 Gennetten et al.
6,819,231 B2 11/2004 Berberich et al.
6,823,261 B2 11/2004 Sekiguchi
6,824,281 B2 11/2004 Schofield et al.
6,831,268 B2 12/2004 Bechtel et al.
6,832,848 B2 12/2004 Pastrick
6,834,969 B2 12/2004 Bade et al.
6,836,725 B2 12/2004 Millington et al.
6,838,980 B2 1/2005 Gloger et al.
6,842,189 B2 1/2005 Park
6,842,276 B2 1/2005 Poll et al.
6,845,805 B1 1/2005 Köster
6,846,098 B2 1/2005 Bourdelais et al.
6,847,424 B2 1/2005 Gotoh et al.
6,847,487 B2 1/2005 Burgner
6,848,817 B2 2/2005 Bos et al.
6,849,165 B2 2/2005 Klöppel et al.
6,853,491 B1 2/2005 Ruhle et al.
6,859,148 B2 2/2005 Miller et al.
6,861,789 B2 3/2005 Wei
6,864,930 B2 3/2005 Matsushita et al.
6,870,655 B1 3/2005 Northman et al.
6,870,656 B2 3/2005 Tonar et al.
6,871,982 B2 3/2005 Holman et al.
6,877,888 B2 4/2005 DeLine et al.
6,882,287 B2 4/2005 Schofield
6,889,064 B2 5/2005 Baratono et al.
6,891,563 B2 5/2005 Schofield et al.
6,891,677 B2 5/2005 Nilsen et al.
6,898,518 B2 5/2005 Padmanabhan
6,902,284 B2 6/2005 Hutzel et al.
6,904,348 B2 6/2005 Drummond et al.
6,906,620 B2 6/2005 Nakai et al.
6,906,632 B2 6/2005 DeLine et al.
6,909,486 B2 6/2005 Wang et al.
6,910,779 B2 6/2005 Abel et al.
6,912,001 B2 6/2005 Okamoto et al.
6,912,396 B2 6/2005 Sziraki et al.
6,914,521 B2 7/2005 Rothkop
6,916,099 B2 7/2005 Su et al.
6,917,404 B2 7/2005 Baek
6,918,674 B2 7/2005 Drummond et al.
6,922,902 B2 8/2005 Schierbeek et al.
6,923,080 B1 8/2005 Dobler et al.
6,928,180 B2 8/2005 Stam et al.
6,928,366 B2 8/2005 Ockerse et al.
6,930,737 B2 8/2005 Weindorf et al.
6,933,837 B2 8/2005 Gunderson et al.
6,934,067 B2 8/2005 Ash et al.
6,940,423 B2 9/2005 Takagi et al.
6,946,978 B2 9/2005 Schofield
6,947,576 B2 9/2005 Stam et al.
6,947,577 B2 9/2005 Stam et al.
6,949,772 B2 9/2005 Shimizu et al.
6,950,035 B2 9/2005 Tanaka et al.
6,951,410 B2 10/2005 Parsons
6,951,681 B2 10/2005 Hartley et al.
6,952,312 B2 10/2005 Weber et al.
6,958,495 B2 10/2005 Nishijima et al.
6,958,683 B2 10/2005 Mills et al.
6,959,994 B2 11/2005 Fujikawa et al.
6,961,178 B2 11/2005 Sugino et al.
6,961,661 B2 11/2005 Sekiguchi
6,963,438 B2 11/2005 Busscher et al.
6,968,273 B2 11/2005 Ockerse et al.
6,971,181 B2 12/2005 Ohm et al.
6,972,888 B2 12/2005 Poll et al.
6,974,236 B2 12/2005 Tenmyo
6,975,215 B2 12/2005 Schofield et al.
6,977,702 B2 12/2005 Wu
6,980,092 B2 12/2005 Turnbull et al.
6,985,291 B2 1/2006 Watson et al.
6,989,736 B2 1/2006 Berberich et al.
6,992,573 B2 1/2006 Blank et al.
6,992,718 B1 1/2006 Takahara
6,992,826 B2 1/2006 Wang
6,995,687 B2 2/2006 Lang et al.
6,997,571 B2 2/2006 Tenmyo
7,001,058 B2 2/2006 Inditsky
7,004,592 B2 2/2006 Varaprasad et al.
7,004,593 B2 2/2006 Weller et al.
7,005,974 B2 2/2006 McMahon et al.
7,006,173 B1 2/2006 Hiyama et al.
7,008,090 B2 3/2006 Blank
7,009,751 B2 3/2006 Tonar et al.
7,012,543 B2 3/2006 DeLine et al.
7,012,727 B2 3/2006 Hutzel et al.
7,023,331 B2 4/2006 Kodama
7,029,156 B2 4/2006 Suehiro et al.
7,030,738 B2 4/2006 Ishii
7,030,775 B2 4/2006 Sekiguchi
7,038,577 B2 5/2006 Pawlicki et al.
7,041,965 B2 5/2006 Heslin et al.
7,042,616 B2 5/2006 Tonar et al.
7,046,418 B2 5/2006 Lin et al.
7,046,448 B2 5/2006 Burgner
7,050,908 B1 5/2006 Schwartz et al.
7,057,505 B2 6/2006 Iwamoto
7,057,681 B2 6/2006 Hinata et al.
7,063,893 B2 6/2006 Hoffman
7,064,882 B2 6/2006 Tonar et al.
7,068,289 B2 6/2006 Satoh et al.
7,074,486 B2 7/2006 Boire et al.
7,081,810 B2 7/2006 Henderson et al.
7,085,633 B2 8/2006 Nishira et al.
7,092,052 B2 8/2006 Okamoto et al.
7,095,432 B2 8/2006 Nakayama et al.
7,095,567 B2 8/2006 Troxell et al.
7,106,213 B2 9/2006 White
7,106,392 B2 9/2006 You
7,108,409 B2 9/2006 DeLine et al.
7,110,021 B2 9/2006 Nobori et al.
7,114,554 B2 10/2006 Bergman et al.
7,121,028 B2 10/2006 Shoen et al.
7,125,131 B2 10/2006 Olczak
7,130,727 B2 10/2006 Liu et al.
7,132,064 B2 11/2006 Li et al.
7,136,091 B2 11/2006 Ichikawa et al.
7,138,974 B2 11/2006 Hirakata et al.
7,149,613 B2 12/2006 Stam et al.
7,150,552 B2 12/2006 Weidel
7,151,515 B2 12/2006 Kim et al.
7,151,997 B2 12/2006 Uhlmann et al.
7,153,588 B2 12/2006 McMan et al.
7,154,657 B2 12/2006 Poll et al.
7,158,881 B2 1/2007 McCarthy et al.
7,160,017 B2 1/2007 Lee et al.
7,161,567 B2 1/2007 Homma et al.
7,167,796 B2 1/2007 Taylor et al.
7,168,830 B2 1/2007 Pastrick et al.
7,175,291 B1 2/2007 Li
7,176,790 B2 2/2007 Yamazaki
7,184,190 B2 2/2007 McCabe et al.
7,185,995 B2 3/2007 Hatanaka et al.

(56) References Cited

U.S. PATENT DOCUMENTS 7,187,498 B2 3/2007 Bengoechea et al.
7,188,963 B2 3/2007 Schofield et al.
7,193,764 B2 3/2007 Lin et al.
7,195,381 B2 3/2007 Lynam et al.
7,199,767 B2 4/2007 Spero
7,202,987 B2 4/2007 Varaprasad et al.
7,206,697 B2 4/2007 Olney et al.
7,209,277 B2 4/2007 Tonar et al.
7,215,238 B2 5/2007 Buck et al.
7,215,473 B2 5/2007 Fleming
7,221,363 B2 5/2007 Roberts et al.
7,221,365 B1 5/2007 Lévesque et al.
7,224,324 B2 5/2007 Quist et al.
7,227,472 B1 6/2007 Roe
7,230,523 B2 6/2007 Harter, Jr. et al.
7,232,231 B2 6/2007 Shih
7,232,594 B2 6/2007 Miroshin et al.
7,233,304 B1 6/2007 Aratani et al.
7,235,918 B2 6/2007 McCullough et al.
7,241,030 B2 7/2007 Mok et al.
7,241,037 B2 7/2007 Mathieu et al.
7,245,207 B1 7/2007 Dayan et al.
7,245,231 B2 7/2007 Kiefer et al.
7,245,336 B2 7/2007 Hiyama et al.
7,248,283 B2 7/2007 Takagi et al.
7,248,305 B2 7/2007 Ootsuta et al.
7,249,860 B2 7/2007 Kulas et al.
7,251,079 B2 7/2007 Capaldo et al.
7,253,723 B2 8/2007 Lindahl et al.
7,255,451 B2 8/2007 McCabe et al.
7,255,465 B2 8/2007 DeLine et al.
7,259,036 B2 8/2007 Borland et al.
7,262,406 B2 8/2007 Heslin et al.
7,262,916 B2 8/2007 Kao et al.
7,265,342 B2 9/2007 Heslin et al.
7,268,841 B2 9/2007 Kasajima et al.
7,269,327 B2 9/2007 Tang
7,269,328 B2 9/2007 Tang
7,271,951 B2 9/2007 Weber et al.
7,274,501 B2 9/2007 McCabe et al.
7,281,491 B2 10/2007 Iwamaru
7,286,280 B2 10/2007 Whitehead et al.
7,287,868 B2 10/2007 Carter et al.
7,289,037 B2 10/2007 Uken et al.
7,290,919 B2 11/2007 Pan et al.
7,292,208 B1 11/2007 Park et al.
7,292,918 B2 11/2007 Silvester
7,300,183 B2 11/2007 Kiyomoto et al.
7,302,344 B2 11/2007 Olney et al.
7,304,661 B2 12/2007 Ishikura
7,308,341 B2 12/2007 Schofield et al.
7,310,177 B2 12/2007 McCabe et al.
7,311,428 B2 12/2007 DeLine et al.
7,316,485 B2 1/2008 Roose
7,317,386 B2 1/2008 Lengning et al.
7,318,664 B2 1/2008 Hatanaka et al.
7,323,819 B2 1/2008 Hong et al.
7,324,043 B2 1/2008 Purden et al.
7,324,172 B2 1/2008 Yamazaki
7,324,174 B2 1/2008 Hafuka et al.
7,324,261 B2 1/2008 Tonar et al.
7,327,225 B2 2/2008 Nicholas et al.
7,327,226 B2 2/2008 Turnbull et al.
7,327,855 B1 2/2008 Chen
7,328,103 B2 2/2008 McCarthy et al.
7,329,013 B2 2/2008 Blank et al.
7,329,850 B2 2/2008 Drummond et al.
7,331,415 B2 2/2008 Hawes et al.
7,338,177 B2 3/2008 Lynam
7,342,707 B2 3/2008 Roberts et al.
7,344,284 B2 3/2008 Lynam et al.
7,349,143 B2 3/2008 Tonar et al.
7,349,144 B2 3/2008 Varaprasad et al.
7,349,582 B2 3/2008 Takeda et al.
7,355,524 B2 4/2008 Schofield
7,360,932 B2 4/2008 Uken et al.
7,362,505 B2 4/2008 Hikmet et al.
7,368,714 B2 5/2008 Remillard et al.
7,370,983 B2 5/2008 DeWind et al.
7,372,611 B2 5/2008 Tonar et al.
7,375,895 B2 5/2008 Brynielsson
7,379,224 B2 5/2008 Tonar et al.
7,379,225 B2 5/2008 Tonar et al.
7,379,243 B2 5/2008 Horsten et al.
7,379,814 B2 5/2008 Ockerse et al.
7,379,817 B1 5/2008 Tyson et al.
7,380,633 B2 6/2008 Shen et al.
7,389,171 B2 6/2008 Rupp
7,391,563 B2 6/2008 McCabe et al.
7,396,147 B2 7/2008 Munro
7,411,637 B2 8/2008 Weiss
7,411,732 B2 8/2008 Kao et al.
7,412,328 B2 8/2008 Uhlmann et al.
7,417,781 B2 8/2008 Tonar et al.
7,420,159 B2 9/2008 Heslin et al.
7,420,756 B2 9/2008 Lynam
7,429,998 B2 9/2008 Kawauchi et al.
7,446,462 B2 11/2008 Lim et al.
7,446,650 B2 11/2008 Schofield et al.
7,446,924 B2 11/2008 Schofield et al.
7,448,776 B2 11/2008 Tang
7,452,090 B2 11/2008 Weller et al.
7,453,057 B2 11/2008 Drummond et al.
7,455,412 B2 11/2008 Rottcher
7,460,007 B2 12/2008 Schofield et al.
7,467,883 B2 12/2008 DeLine et al.
7,468,651 B2 12/2008 DeLine et al.
7,471,438 B2 12/2008 McCabe et al.
7,474,963 B2 1/2009 Taylor et al.
7,477,439 B2 1/2009 Tonar et al.
7,480,149 B2 1/2009 DeWard et al.
7,488,080 B2 2/2009 Skiver et al.
7,488,099 B2 2/2009 Fogg et al.
7,489,374 B2 2/2009 Utsumi et al.
7,490,007 B2 2/2009 Taylor et al.
7,490,943 B2 2/2009 Kikuchi et al.
7,490,944 B2 2/2009 Blank et al.
7,494,231 B2 2/2009 Varaprasad et al.
7,495,719 B2 2/2009 Adachi et al.
7,496,439 B2 2/2009 McCormick
7,502,156 B2 3/2009 Tonar et al.
7,505,047 B2 3/2009 Yoshimura
7,505,188 B2 3/2009 Niiyama et al.
7,511,607 B2 3/2009 Hubbard et al.
7,511,872 B2 3/2009 Tonar et al.
7,525,604 B2 4/2009 Xue
7,525,715 B2 4/2009 McCabe et al.
7,526,103 B2 4/2009 Schofield et al.
7,533,998 B2 5/2009 Schofield et al.
7,538,316 B2 5/2009 Heslin et al.
7,540,620 B2 6/2009 Weller et al.
7,541,570 B2 6/2009 Drummond et al.
7,542,193 B2 6/2009 McCabe et al.
7,543,946 B2 6/2009 Ockerse et al.
7,543,947 B2 6/2009 Varaprasad et al.
7,545,429 B2 6/2009 Travis
7,547,467 B2 6/2009 Olson et al.
7,548,291 B2 6/2009 Lee et al.
7,551,354 B2 6/2009 Horsten et al.
7,561,181 B2 7/2009 Schofield et al.
7,562,985 B2 7/2009 Cortenraad et al.
7,567,291 B2 7/2009 Bechtel et al.
7,571,038 B2 8/2009 Butler et al.
7,571,042 B2 8/2009 Taylor et al.
7,572,017 B2 8/2009 Varaprasad et al.
7,572,490 B2 8/2009 Park et al.
7,579,939 B2 8/2009 Schofield et al.
7,579,940 B2 8/2009 Schofield et al.
7,580,795 B2 8/2009 McCarthy et al.
7,581,859 B2 9/2009 Lynam
7,581,867 B2 9/2009 Lee et al.
7,583,184 B2 9/2009 Schofield et al.
7,586,566 B2 9/2009 Nelson et al.
7,586,666 B2 9/2009 McCabe et al.

(56) References Cited

U.S. PATENT DOCUMENTS 7,589,883 B2 9/2009 Varaprasad et al.
7,589,893 B2 9/2009 Rottcher
7,600,878 B2 10/2009 Blank et al.
7,605,883 B2 10/2009 Yamaki et al.
7,619,508 B2 11/2009 Lynam et al.
7,623,202 B2 11/2009 Araki et al.
7,626,749 B2 12/2009 Baur et al.
7,629,996 B2 12/2009 Rademacher et al.
7,633,567 B2 12/2009 Yamada et al.
7,636,188 B2 12/2009 Baur et al.
7,636,195 B2 12/2009 Nieuwkerk et al.
7,636,930 B2 12/2009 Chang
7,643,200 B2 1/2010 Varaprasad et al.
7,643,927 B2 1/2010 Hils
7,651,228 B2 1/2010 Skiver et al.
7,658,521 B2 2/2010 DeLine et al.
7,663,798 B2 2/2010 Tonar et al.
7,667,579 B2 2/2010 DeLine et al.
7,670,016 B2 3/2010 Weller et al.
7,688,495 B2 3/2010 Tonar et al.
7,695,174 B2 4/2010 Takayanagi et al.
7,696,964 B2 4/2010 Lankhorst et al.
7,706,046 B2 4/2010 Bauer et al.
7,710,631 B2 5/2010 McCabe et al.
7,711,479 B2 5/2010 Taylor et al.
7,724,434 B2 5/2010 Cross et al.
7,726,822 B2 6/2010 Blank et al.
7,728,276 B2 6/2010 Drummond et al.
7,728,721 B2 6/2010 Schofield et al.
7,728,927 B2 6/2010 Nieuwkerk et al.
7,731,403 B2 6/2010 Lynam et al.
7,734,392 B2 6/2010 Schofield et al.
7,742,864 B2 6/2010 Sekiguchi
7,746,534 B2 6/2010 Tonar et al.
7,771,061 B2 8/2010 Varaprasad et al.
7,787,077 B2 8/2010 Kondoh et al.
7,791,694 B2 9/2010 Molsen et al.
7,795,675 B2 9/2010 Darwish et al.
7,815,326 B2 10/2010 Blank et al.
7,821,697 B2 10/2010 Varaprasad et al.
7,822,543 B2 10/2010 Taylor et al.
7,826,123 B2 11/2010 McCabe et al.
7,830,583 B2 11/2010 Neuman et al.
7,832,882 B2 11/2010 Weller et al.
7,842,154 B2 11/2010 Lynam
7,854,514 B2 12/2010 Conner et al.
7,855,755 B2 12/2010 Weller et al.
7,859,565 B2 12/2010 Schofield et al.
7,859,737 B2 12/2010 McCabe et al.
7,864,398 B2 1/2011 Dozeman et al.
7,864,399 B2 1/2011 McCabe et al.
7,871,169 B2 1/2011 Varaprasad et al.
7,873,593 B2 1/2011 Schofield et al.
7,888,629 B2 2/2011 Heslin et al.
7,898,398 B2 3/2011 DeLine et al.
7,898,719 B2 3/2011 Schofield et al.
7,903,324 B2 3/2011 Kobayashi et al.
7,903,335 B2 3/2011 Nieuwkerk et al.
7,906,756 B2 3/2011 Drummond et al.
7,911,547 B2 3/2011 Brott et al.
7,914,188 B2 3/2011 DeLine et al.
7,916,009 B2 3/2011 Schofield et al.
7,916,380 B2 3/2011 Tonar et al.
7,918,570 B2 4/2011 Weller et al.
7,926,960 B2 4/2011 Skiver et al.
7,937,667 B2 5/2011 Kramer et al.
7,965,336 B2 6/2011 Bingle et al.
7,965,357 B2 6/2011 Van De Witte et al.
7,980,711 B2 7/2011 Takayanagi et al.
7,994,471 B2 8/2011 Heslin et al.
8,000,894 B2 8/2011 Taylor et al.
8,004,768 B2 8/2011 Takayanagi et al.
8,019,505 B2 9/2011 Schofield et al.
8,027,691 B2 9/2011 Bernas et al.
8,031,225 B2 10/2011 Watanabe et al.
8,040,376 B2 10/2011 Yamada et al.
8,044,776 B2 10/2011 Schofield et al.
8,047,667 B2 11/2011 Weller et al.
8,049,640 B2 11/2011 Uken et al.
8,063,753 B2 11/2011 DeLine et al.
8,072,318 B2 12/2011 Lynam et al.
8,083,386 B2 12/2011 Lynam
8,094,002 B2 1/2012 Schofield et al.
8,095,260 B1 1/2012 Schofield et al.
8,095,310 B2 1/2012 Taylor et al.
8,100,568 B2 1/2012 DeLine et al.
8,106,347 B2 1/2012 Drummond et al.
8,121,787 B2 2/2012 Taylor et al.
8,134,117 B2 3/2012 Heslin et al.
8,144,033 B2 3/2012 Chinomi et al.
8,154,418 B2 4/2012 Hook et al.
8,162,493 B2 4/2012 Skiver et al.
8,164,817 B2 4/2012 Varaprasad et al.
8,169,307 B2 5/2012 Nakamura et al.
8,170,748 B1 5/2012 Schofield et al.
8,177,376 B2 5/2012 Weller et al.
8,179,236 B2 5/2012 Weller et al.
8,179,437 B2 5/2012 Schofield et al.
8,179,586 B2 5/2012 Schofield et al.
8,194,132 B2 6/2012 Dayan et al.
8,194,133 B2 6/2012 De Wind et al.
8,217,887 B2 7/2012 Sangam et al.
8,228,588 B2 7/2012 McCabe et al.
8,237,909 B2 8/2012 Ostreko et al.
8,267,559 B2 9/2012 DeLine et al.
8,271,187 B2 9/2012 Taylor et al.
8,277,059 B2 10/2012 McCabe et al.
8,282,224 B2 10/2012 Anderson et al.
8,282,226 B2 10/2012 Blank et al.
8,282,253 B2 10/2012 Lynam
8,288,711 B2 10/2012 Heslin et al.
8,294,975 B2 10/2012 Varaprasad et al.
8,304,711 B2 11/2012 Drummond et al.
8,308,325 B2 11/2012 Takayanagi et al.
8,309,907 B2 11/2012 Heslin et al.
8,325,028 B2 12/2012 Schofield et al.
8,335,032 B2 12/2012 McCabe et al.
8,339,526 B2 12/2012 Minikey, Jr. et al.
8,355,853 B2 1/2013 Schofield et al.
8,358,262 B2 1/2013 Degwekar et al.
8,379,289 B2 2/2013 Schofield et al.
8,400,704 B2 3/2013 McCabe et al.
8,427,288 B2 4/2013 Schofield et al.
8,543,330 B2 9/2013 Taylor et al.
8,643,724 B2 2/2014 Schofield et al.
8,676,491 B2 3/2014 Taylor et al.
9,014,966 B2 4/2015 Taylor et al.
9,315,151 B2 4/2016 Taylor et al.
2001/0002451 A1 5/2001 Breed
2001/0020202 A1 9/2001 Obradovich
2001/0026316 A1 10/2001 Senatore
2001/0035853 A1 11/2001 Hoelen et al.
2002/0011611 A1 1/2002 Huang et al.
2002/0049535 A1 4/2002 Rigo et al.
2002/0085155 A1 7/2002 Arikawa
2002/0092958 A1 7/2002 Lusk
2002/0118321 A1 8/2002 Ge
2002/0133144 A1 9/2002 Chan et al.
2002/0149727 A1 10/2002 Wang
2002/0154007 A1 10/2002 Yang
2003/0002165 A1 1/2003 Mathias et al.
2003/0007261 A1 1/2003 Hutzel et al.
2003/0030724 A1 2/2003 Okamoto
2003/0069690 A1 4/2003 Correia et al.
2003/0090568 A1 5/2003 Pico
2003/0090569 A1 5/2003 Poechmueller
2003/0098908 A1 5/2003 Misaiji et al.
2003/0103142 A1 6/2003 Hitomi et al.
2003/0122929 A1 7/2003 Minaudo et al.
2003/0133014 A1 7/2003 Mendoza
2003/0137586 A1 7/2003 Lewellen
2003/0156193 A1 8/2003 Nakamura
2003/0169158 A1 9/2003 Paul, Jr.
2003/0179293 A1 9/2003 Oizumi

(56) References Cited

U.S. PATENT DOCUMENTS

2003/0202096 A1 10/2003 Kim
2003/0206256 A1 11/2003 Drain et al.
2003/0214576 A1 11/2003 Koga
2003/0214584 A1 11/2003 Ross, Jr.
2003/0227546 A1 12/2003 Hilborn et al.
2004/0004541 A1 1/2004 Hong
2004/0027695 A1 2/2004 Lin
2004/0036768 A1 2/2004 Green
2004/0080404 A1 4/2004 White
2004/0239243 A1 12/2004 Roberts et al.
2004/0239849 A1 12/2004 Wang
2005/0018738 A1 1/2005 Duan et al.
2005/0024591 A1 2/2005 Lian et al.
2005/0117095 A1 6/2005 Ma
2005/0168995 A1 8/2005 Kittelmann et al.
2005/0237440 A1 10/2005 Sugimura et al.
2005/0270766 A1 12/2005 Kung et al.
2006/0050018 A1 3/2006 Hutzel et al.
2006/0061008 A1 3/2006 Karner et al.
2006/0076860 A1 4/2006 Hoss
2006/0139953 A1 6/2006 Chou et al.
2006/0187378 A1 8/2006 Bong et al.
2006/0279522 A1 12/2006 Kurihara
2007/0064108 A1 3/2007 Haler
2007/0080585 A1 4/2007 Lyu
2007/0086097 A1 4/2007 Motomiya et al.
2007/0183037 A1 8/2007 De Boer et al.
2007/0262732 A1 11/2007 Shen
2008/0042938 A1 2/2008 Cok
2009/0002491 A1 1/2009 Haler
2009/0052003 A1 2/2009 Schofield et al.
2009/0096937 A1 4/2009 Bauer et al.
2009/0201137 A1 8/2009 Weller et al.
2009/0258221 A1 10/2009 Diehl et al.
2009/0262192 A1 10/2009 Schofield et al.
2009/0296190 A1 12/2009 Anderson et al.
2010/0045899 A1 2/2010 Ockerse
2010/0245701 A1 9/2010 Sato et al.
2010/0246017 A1 9/2010 Tonar et al.
2010/0277786 A1 11/2010 Anderson et al.
2010/0289995 A1 11/2010 Hwang et al.
2011/0128137 A1 6/2011 Varaprasad et al.
2011/0166779 A1 7/2011 McCarthy et al.
2011/0166785 A1 7/2011 McCarthy et al.
2012/0050068 A1 3/2012 DeLine et al.
2012/0062744 A1 3/2012 Schofield et al.
2012/0086808 A1 4/2012 Lynam et al.
2012/0182141 A1 7/2012 Peterson et al.
2012/0203550 A1 8/2012 Skiver et al.
2012/0206790 A1 8/2012 Varaprasad et al.
2012/0224066 A1 9/2012 Weller et al.
2012/0224248 A1 9/2012 Schofield et al.
2012/0236152 A1 9/2012 De Wind et al.

FOREIGN PATENT DOCUMENTS

DE 941408 4/1956
DE 944531 7/1956
DE 7323996 11/1973
DE 2808260 8/1979
DE 3248511 A1 7/1984
DE 3301945 7/1984
DE 3614882 11/1987
DE 3720848 1/1989
DE 9306989.8 U1 7/1993
DE 4329983 8/1995
DE 4444443 A1 6/1996
DE 29703084 U1 6/1997
DE 29805142 U1 5/1998
DE 19741896 4/1999
DE 19755008 7/1999
DE 29902344 U1 7/1999
DE 19934999 2/2001
DE 19943355 3/2001
DE 20118868 3/2002
DE 10131459 1/2003
DE 102005000650 7/2006
EP 0299509 A2 1/1989
EP 0513476 A1 11/1992
EP 0524766 1/1993
EP 0729864 A1 12/1995
EP 0728618 A2 8/1996
EP 0825477 2/1998
EP 0830985 3/1998
EP 0928723 A2 7/1999
EP 937601 A2 8/1999
EP 1022903 7/2000
EP 1075986 2/2001
EP 1097848 A 5/2001
EP 1152285 A2 11/2001
EP 1193773 3/2002
EP 1256833 11/2002
EP 0899157 10/2004
EP 1315639 2/2006
FR 1021987 A 2/1953
FR 1461419 12/1966
FR 2585991 2/1987
FR 2672857 A1 8/1992
FR 2673499 A1 9/1992
FR 2759045 8/1998
GB 810010 3/1959
GB 934037 8/1963
GB 1008411 10/1965
GB 1136134 12/1968
GB 1553376 9/1979
GB 2137573 A 10/1984
GB 2161440 1/1986
GB 2192370 1/1988
GB 2222991 3/1990
GB 2233530 9/1991
GB 2255539 A 11/1992
GB 2351055 A 12/2000
GB 2362494 11/2001
JP 50-000638 A 1/1975
JP 52-146988 11/1977
JP 55-039843 3/1980
JP 57-30639 2/1982
JP 57-102602 6/1982
JP 57-208530 12/1982
JP 58-020954 2/1983
JP 58-030729 2/1983
JP 58-110334 6/1983
JP 58-180347 10/1983
JP 58-209635 12/1983
JP 59-114139 7/1984
JP 60-212730 10/1985
JP 60-261275 12/1985
JP 61-127186 6/1986
JP 61-260217 11/1986
JP 62-043543 2/1987
JP 62-075619 4/1987
JP 6216073 4/1987
JP 62-122487 6/1987
JP 62-131232 6/1987
JP 63-02753 1/1988
JP 63-085525 4/1988
JP 63-106730 5/1988
JP 63-106731 5/1988
JP 63-274286 11/1988
JP 64-14700 1/1989
JP 01-123587 5/1989
JP 01-130578 5/1989
JP H236417 8/1990
JP 02-122844 10/1990
JP 03-28947 3/1991
JP 03-028947 3/1991
JP 03-052097 3/1991
JP 30-061192 3/1991
JP 3099952 4/1991
JP 03-110855 5/1991
JP 03-198026 8/1991
JP 03-243914 10/1991
JP 04-114587 4/1992
JP 04-245886 9/1992

(56) References Cited

FOREIGN PATENT DOCUMENTS

| | | |
|---|---|---|
| JP | 05-080716 | 4/1993 |
| JP | 05-183194 | 7/1993 |
| JP | 05-213113 | 8/1993 |
| JP | 05-257142 | 10/1993 |
| JP | 60-80953 A | 3/1994 |
| JP | 61-07035 A | 4/1994 |
| JP | 62-27318 A | 8/1994 |
| JP | 06-318734 | 11/1994 |
| JP | 07-146467 | 6/1995 |
| JP | 07-175035 | 7/1995 |
| JP | 07-191311 | 7/1995 |
| JP | 07-266928 | 10/1995 |
| JP | 07-267002 | 10/1995 |
| JP | 07-277072 | 10/1995 |
| JP | 07-281150 | 10/1995 |
| JP | 07-281185 | 10/1995 |
| JP | 08-008083 | 1/1996 |
| JP | 08-083581 | 3/1996 |
| JP | 08-216789 | 8/1996 |
| JP | 08-227769 | 9/1996 |
| JP | 09-033886 | 2/1997 |
| JP | 09-260074 | 3/1997 |
| JP | 05-077657 | 7/1997 |
| JP | 09-220976 | 8/1997 |
| JP | 09-230827 | 9/1997 |
| JP | 09-266078 | 10/1997 |
| JP | 09-288262 | 11/1997 |
| JP | 10-076880 | 3/1998 |
| JP | 10-190960 | 7/1998 |
| JP | 10-199480 | 7/1998 |
| JP | 10-206643 | 8/1998 |
| JP | 10-221692 | 8/1998 |
| JP | 10-239659 | 9/1998 |
| JP | 10-276298 | 10/1998 |
| JP | 11-038381 | 2/1999 |
| JP | 11-067485 | 3/1999 |
| JP | 11-078693 | 3/1999 |
| JP | 11-109337 | 4/1999 |
| JP | 11-160539 | 6/1999 |
| JP | 11-212073 | 8/1999 |
| JP | 11-283759 | 10/1999 |
| JP | 11-298058 | 10/1999 |
| JP | 11-305197 | 11/1999 |
| JP | 2000-131681 | 5/2000 |
| JP | 2000-153736 | 6/2000 |
| JP | 2000-159014 | 6/2000 |
| JP | 2000-255321 | 9/2000 |
| JP | 2000-330107 | 11/2000 |
| JP | 2001-083509 | 3/2001 |
| JP | 2001-097116 | 4/2001 |
| JP | 2001-222005 | 8/2001 |
| JP | 2002-072901 | 3/2002 |
| JP | 2002-120649 | 4/2002 |
| JP | 2002-122860 | 4/2002 |
| JP | 2002-162626 | 6/2002 |
| JP | 2002-352611 | 12/2002 |
| JP | 2003-182454 | 3/2003 |
| JP | 2003-267129 | 9/2003 |
| JP | 2004-182156 | 7/2004 |
| JP | 2005-148119 | 6/2005 |
| JP | 2005-280526 | 10/2005 |
| JP | 2005-327600 | 11/2005 |
| JP | 38-46073 | 11/2006 |
| JP | 2008-083657 | 4/2008 |
| KR | 20060038856 | 5/2006 |
| KR | 100663930 | 1/2007 |
| KR | 20090031998 | 3/2009 |
| WO | WO 82/02448 | 7/1982 |
| WO | WO 86/06179 | 10/1986 |
| WO | WO 94/19212 | 9/1994 |
| WO | WO 96/21581 | 7/1996 |
| WO | WO 98/14974 | 4/1998 |
| WO | WO 98/38547 | 9/1998 |
| WO | WO 99/15360 | 4/1999 |
| WO | WO 00/23826 | 4/2000 |
| WO | WO 00/52661 | 9/2000 |
| WO | WO 00/55685 | 9/2000 |
| WO | WO 01/01192 | 1/2001 |
| WO | WO 02/18174 | 3/2002 |
| WO | WO 02/49881 | 6/2002 |
| WO | WO 03/021343 | 3/2003 |
| WO | WO 03/078941 | 9/2003 |

OTHER PUBLICATIONS

Burt et al., A Multiresolution Spline with Application to Image Mosaics, ACM Transactions on Graphics, vol. 2. No. 4, pp. 217-236, Oct. 1983.

Dana H. Ballard and Christopher M. Brown, Computer Vision, Prentice-Hall, Englewood Cliffs, New Jersey, 5 pages, 1982.

Edgar, Julian; Goodbye 12 Volts . . . Hello 42 Volts!; Oct. 5, 1999; Autospeed 50; Issue 50; www.autospeed.co.nz/cros/A_0319/article.html.

G. Wang, D. Renshaw, P.B. Denyer and M. Lu, CMOS Video Cameras, article, 1991, 4 pages, University of Edinburgh, UK.

Greene et al., Creating Raster Omnimax Images from Multiple Perspective Views Using the Elliptical Weighted Average Filter, IEEE Computer Graphics and Applications, vol. 6, No. 6, pp. 21-27, Jun. 1986.

Inter Partes Reexamination Proceeding IPR2015-00250 regarding U.S. Pat. No. 8,543,330, issued to Taylor et al.

Inter Partes Reexamination Proceeding IPR2015-00251 regarding U.S. Pat. No. 8,676,491, issued to Taylor et al.

Irani, M. et al., “Video compression using mosaic representations,” Signal Processing: *Image Communication* 7 (1995), pp. 529-552.

Japanese Article “Television Image Engineering Handbook, The Institute of Television Engineers of Japan” (“JP Handbook”).

Jewett, Dale; Aug. 2000; Automotive Industries; Cahners Publising Company; www.findarticles.com/p/articles/mi_m3012/is_8_180ai_64341779.

Kobe, Gerry; 42 Volts Goes Underhood; Mar. 2000; Automotive Industries; Cahners Publishing Company; www.findarticles.com/p/articles/mi_m3012/is_3_180/ai_61361677.

McMillan, L. et al., “Plenoptic Modeling: An Image-Based Rendering System.” Proceedings of SIGGRAPH 95, Los Angeles, CA, Aug. 6-11, 1995, pp. 39-46.

Nathan, Robert, Digital Video Data Handling, NASA JPL Tech Report 32-877, Pasadena, CA, Jan. 5, 1966.

National Semiconductor, LM78S40, Universal Switching Regulator Subsystem, National Semiconductor Corporation, Apr. 1996, p. 6.

Okabayashi, S., et al. “Driver's Ability to Recognize the Forward View and Head-Up Display Images in Automobiles,” J. Light & Vis. Env. vol. 16, No. 2 (1992), pp. 61-69.

Parenti, R.R., “Application of Fourier-Space Image-Restoration techniques to Turbulence Compensation and Sparse-Aperture Imaging.” Massachusetts Institute of Technology—Lincoln Laboratory (Jun. 1994).

Porter et al., “Compositing Digital Images,” Computer Graphics (Proc. Siggraph), vol. 18, No. 3, pp. 253-259, Jul. 1984.

SAE Paper No. 750364 to Nolan, published Feb. 1, 1975.

SAE Paper No. 770274 to Smith, published Feb. 1, 1977.

SAE Paper No. 860173 to Ortega, published Mar. 1, 1986.

SAE Paper No. 871288 to Otsuka, published Nov. 8, 1987.

SAE Paper No. 890282 to Corsi, published Feb. 1, 1989.

SAE Paper No. 890283 to Brandt, published Feb. 1, 1989.

SAE Paper No. 890288 to Weihrauch, published Feb. 1, 1989.

SAE Paper No. 920741 to Sugita, “Head-up Display Using a Hologram as an Optical Element”.

SAE Paper No. 930456 to Gumkowski, published Mar. 1, 1993.

Stewart, James W.; HP SnapLED: LED Assemblies for Automotive Signal Applications; Nov. 1, 1998; Hewlett-Packard Journal; vol. 50, No. 1, www.hpl.hp.com/hpjournal/98nov/nov98al.pdf.

Szeliski, Richard, Image Mosaicing for Tele-Reality Applications, DEC Cambridge Research Laboratory, CRL 94/2, May 1994.

Wolberg, “A Two-Pass Mesh Warping Implementation of Morphing,” Dr. Dobb's Journal, No. 202, Jul. 1993.

Wolberg, George, Digital Image Warping, IEEE Computer Society Press, 1990.

DRIVER ASSIST SYSTEM FOR VEHICLE

CROSS REFERENCE TO RELATED APPLICATIONS

The present application is a continuation of U.S. patent application Ser. No. 14/678,145, filed Apr. 3, 2015, now U.S. Pat. No. 9,315,151, which is a continuation of U.S. patent application Ser. No. 14/211,256, filed Mar. 14, 2014, now U.S. Pat. No. 9,014,966, which is a continuation of U.S. patent application Ser. No. 14/033,963, filed Sep. 23, 2013, now U.S. Pat. No. 8,676,491, which is a continuation of U.S. patent application Ser. No. 13/621,382, filed Sep. 17, 2012, now U.S. Pat. No. 8,543,330, which is a continuation of U.S. patent application Ser. No. 13/399,347, filed Feb. 17, 2012, now U.S. Pat. No. 8,271,187, which is a continuation of U.S. patent application Ser. No. 13/209,645, filed Aug. 15, 2011, now U.S. Pat. No. 8,121,787, which is a continuation of U.S. patent application Ser. No. 12/908,481, filed Oct. 20, 2010, now U.S. Pat. No. 8,000,894, which is a continuation of U.S. patent application Ser. No. 12/724,895, filed Mar. 16, 2010, now U.S. Pat. No. 7,822,543, which is a continuation of U.S. patent application Ser. No. 12/405,614, filed Mar. 17, 2009, now U.S. Pat. No. 7,711,479, which is a continuation of U.S. patent application Ser. No. 11/935,800, filed Nov. 6, 2007, now U.S. Pat. No. 7,571,042, which is a continuation of U.S. patent application Ser. No. 11/624,381, filed Jan. 18, 2007, now U.S. Pat. No. 7,490,007, which is a continuation of U.S. patent application Ser. No. 10/645,762, filed Aug. 20, 2003, now U.S. Pat. No. 7,167,796, which claims priority of U.S. provisional applications, Ser. No. 60/406,166, filed Aug. 27, 2002; Ser. No. 60/405,392, filed Aug. 23, 2002; and Ser. No. 60/404,906, filed Aug. 21, 2002, and U.S. patent application Ser. No. 10/645,762 is a continuation-in-part of U.S. patent application Ser. No. 10/456,599, filed Jun. 6, 2003, now U.S. Pat. No. 7,004,593, and U.S. patent application Ser. No. 10/645,762 is a continuation-in-part of U.S. patent application Ser. No. 10/287,178, filed Nov. 4, 2002, now U.S. Pat. No. 6,678,614, which is a continuation of U.S. patent application Ser. No. 09/799,414, filed Mar. 5, 2001, now U.S. Pat. No. 6,477,464, which claims priority of U.S. provisional application Ser. No. 60/187,960, filed Mar. 9, 2000, all of which are hereby incorporated herein by reference in their entireties, and U.S. patent application Ser. No. 11/624,381 is a continuation-in-part of U.S. patent application Ser. No. 10/755,915, filed Jan. 13, 2004, now U.S. Pat. No. 7,446,650, which is a continuation of U.S. patent application Ser. No. 09/793,002, filed Feb. 26, 2001, now U.S. Pat. No. 6,690,268, which claims benefit of U.S. provisional applications, Ser. No. 60/263,680, filed Jan. 23, 2001; Ser. No. 60/243,986, filed Oct. 27, 2000; Ser. No. 60/238,483, filed Oct. 6, 2000; Ser. No. 60/237,077, filed Sep. 30, 2000; Ser. No. 60/234,412, filed Sep. 21, 2000; Ser. No. 60/218,336, filed Jul. 14, 2000; and Ser. No. 60/186,520, filed Mar. 2, 2000, and U.S. patent application Ser. No. 11/624,381 is a continuation-in-part of U.S. patent application Ser. No. 10/054,633, filed Jan. 22, 2002, now U.S. Pat. No. 7,195,381, which claims priority from and incorporates by reference in their entireties U.S. provisional applications, Ser. No. 60/346,733, filed Jan. 7, 2002; Ser. No. 60/263,680, filed Jan. 23, 2001; Ser. No. 60/271,466, filed Feb. 26, 2001; and Ser. No. 60/315,384, filed Aug. 28, 2001, and which is a continuation-in-part of U.S. patent application Ser. No. 09/793,002, filed Feb. 26, 2001, now U.S. Pat. No. 6,690,268.

FIELD OF THE INVENTION

The present invention relates generally to telematics systems for vehicles and, more particularly, to telematics systems which may provide driving instructions or directions to a driver of a vehicle or which may provide other controls to an accessory or system of the vehicle. The present invention also relates generally to vehicle seating adjustment systems and, more particularly, to vehicle seating adjustment systems with memory adjustment.

BACKGROUND OF THE INVENTION

In-vehicle telematics systems or vehicle-based telematics systems, such as General Motor's ONSTAR®, Daimler's TELEAID™, Ford's RESCU® or the like, are common in vehicles today. Such telematics systems involve a telecommunication link from the vehicle to an operator or a voice input system at a service center or the like external to the vehicle. The driver of the vehicle may connect or communicate with an operator at the service center to request directions to a targeted location. The service center may provide directions to the targeted location based on the known position of the vehicle, which may be given to the service center operator by the driver, or which may be known by the operator via a link to a global positioning system (GPS) of the vehicle.

However, in such concierge-type systems, typically all of the road names, exits to take, and directional headings/directions are given verbally by the service center operator to the driver all together while the driver is driving the vehicle. The driver is then typically expected to remember several directional driving instructions and often has difficulty in remembering the full directions. Although the driver may optionally remain on the line with the service center operator until the driver reaches the intended destination, which may take many minutes, such as ten, fifteen, twenty minutes or more, and/or the driver may call back to the service center for updated directions, these actions increase the cost of the service, since the service center typically charges for such calls.

Therefore, there is a need in the art for a navigation system that overcomes the shortcomings of the prior art.

SUMMARY OF THE INVENTION

The present invention is intended to provide instructions or directions to a driver of a vehicle which are keyed or coded or linked to respective geographic locations, such that the particular instructions are provided in response to the geographic position of the vehicle at least generally corresponding to the particular geographic location associated with the particular instruction. The particular instructions are thus provided to the driver of the vehicle only when the geographic position of the vehicle is at or near the predetermined or preset waypoints or geographic locations corresponding to the respective particular instructions.

According to an aspect of the present invention, a navigation system for a vehicle includes a vehicle-based telematics system, a vehicle-based global positioning system and a control. The telematics system is operable to receive a user input and to download directional information from a remote source to the control of the vehicle in response to the user input (often, for instance, in ONSTAR®, the user input may be a request from the driver to the remote source or service center operator for directions to a particular destination) and an initial geographic position of the vehicle, such as typically determined by the vehicle-based global positioning system. The directional information comprises at least two instructions, with each instruction being coded to or associated with or linked to a respective geographic location or waypoint. The control is operable to provide an output corresponding to each of the at least two instructions in response to a then current geographic position of the vehicle. The control is operable to provide each instruction only when the then current geographic position of the vehicle at least generally matches or corresponds to the particular respective geographic location associated with the particular instruction.

For instance, a first instruction is typically downloaded that comprises information as to the initial geographic position and heading of the vehicle (e.g., "You are now heading East on Maple Street. Continue until you reach Oak Road."). A second instruction may then provide information as the vehicle approaches the appropriate turn or intersection or the like to take (e.g., "You are now within two blocks of Oak Road. Prepare to turn Right at Oak Road."). A subsequent instruction may then provide information as to the geographic position of the vehicle after the previous step has been completed (e.g., "You are now heading South on Oak Road. Continue until you reach Elm Street."). The output thus provides separate instructions or steps of the directional information, with each instruction coded to a particular geographic location and provided in response to the then current geographic position of the vehicle.

Also, if the driver of the vehicle does not correctly turn or passes an appropriate turn or the like, the control of the present invention knows this via an input from the in-vehicle or vehicle-based global positioning system. As a consequence, a warning instruction may be communicated to the driver indicating that the directions are not being appropriately followed (e.g., "You have passed Oak Road. Please execute a U-Turn and proceed West on Maple Street to Oak Road and turn Left at Oak Road."). Also, if the driver turns off a given road onto an incorrect road or otherwise strays from the given route, the control may communicate a similar warning or instruction to alert the driver that the vehicle is no longer traveling along the given route (e.g., "You have left Maple Street, but are not on Oak Road. Return to Maple Street and continue East on Maple Street to Oak Road, then turn Right on Oak Road.").

The control is operable to tag or code each of the instructions with a respective geographic location or waypoint (alternately, each of the instructions may be tagged or coded or associated with a respective geographic location or waypoint at the remote source before downloading to the control of the vehicle, without affecting the scope of the present invention). The control is then operable to only display a particular instruction when the geographic location tagged or coded to the particular instruction matches or generally matches the actual, then current geographic position of the vehicle.

The control also receives, preferably continuously, an input from the vehicle-based global positioning system that is indicative of the actual, current geographic position of the vehicle as the vehicle travels along the road, highway or the like. The control is then operable to compare the tagged or coded geographic location (as associated with the respective instructions) with the GPS-derived actual geographic position information. Thus, the control may determine when a particular instruction is appropriate to be displayed and/or communicated to the driver by determining that the GPS-derived actual geographic position of the vehicle is now at or at least close to the geographic location associated with a particular instruction.

The user input may comprise a vocal input from the driver of the vehicle to the remote source or service center, or may comprise a keypad input or the like, without affecting the scope of the present invention. Preferably, the geographic position of the vehicle is provided to the remote source (such as a service center or the like) via the global positioning system of the vehicle and the telematics system of the vehicle.

In one form, the output of the control is provided to the driver as an audible message. In another form, the output of the control is provided to the driver as a visible display. The visible display may comprise a video display element, an alphanumeric or iconistic display element or the like, and may comprise a display on demand type display element, a thin film transistor liquid crystal display element, a multi-pixel display element, and/or a multi-icon display element and/or the like. In another form, a combination of a visible and audible output may be used.

Optionally, the system may include a seat adjustment system that is operable to adjust a seat of the vehicle in response to data received via at least one of the vehicle-based telematics system and the vehicle-based global positioning system. The seat adjustment system may be operable in response to biometric data pertaining to the occupant of the seat of the vehicle.

According to another aspect of the present invention, a method for providing navigational directions to a driver of a vehicle comprises accessing a remote source or service center via a vehicle-based wireless communication system and downloading local information from the remote source to a control of the vehicle via the wireless communication system in response to a user input. The local information comprises at least two driving instructions. Each of the at least two driving instructions is associated with or linked to a respective, particular geographic location. A current geographic position of the vehicle is provided to the control via a vehicle-based global positioning system. Each of the at least two driving instructions is provided by the control to the driver in response to the then current geographic position of the vehicle and only when the current geographic position of the vehicle at least generally matches or corresponds to the particular geographic location electronically associated with or linked to the respective one of the at least two driving instructions.

Preferably, the method includes associating or tagging or coding or linking (such as electronically, digitally or the like) each of the instructions with a respective particular geographic location. The control may tag or code the instructions to be associated with the respective geographic locations after the instructions have been downloaded, or the remote service center may tag or code the instructions to be associated with the respective geographic locations before downloading the instructions to the control, without affecting the scope of the present invention.

In one form, the at least two driving instructions are visibly displayed to the driver at a display of the vehicle. In another form, the at least two driving instructions are audibly communicated to the driver via at least one speaker of the vehicle. In a third form, a combination of a visible display and audible communication may be used.

According to yet another aspect of the present invention, a navigation system for a vehicle comprises a vehicle-based telematics system, a vehicle-based global positioning system, and a control. The telematics system is operable to receive a user input from a driver of the vehicle and to download directional information to the control of the vehicle in response to the user input and an initial geographic position of the vehicle. The directional information comprises at least two instructions. The control is operable to tag or code or link each of the instructions with a respective geographic location. The control is operable to provide an output corresponding to a particular instruction only when the geographic location tagged or coded or linked to the particular instruction at least generally corresponds to the actual current geographic position of the vehicle.

The present invention thus provides for step-by-step instructions or driving directions to the driver of a vehicle as the driver is driving the vehicle according to the instructions. Each step or instruction is provided either after the previous step or instruction has been completed or as the vehicle approaches a turn or intersection or location where the next step is to be performed, so that the driver is not overwhelmed with multiple instructions to remember as the driver drives the vehicle toward the targeted destination. The control or the remote source or service center is operable to electronically or digitally or otherwise tag, key, code or otherwise associate each instruction or step with a geographic location or waypoint, and the control is operable to only display that instruction when the geographic location tagged to the instruction generally matches the actual, current geographic position of the vehicle. All of the instructions are provided or downloaded to the vehicle during a single, short communication with the remote source or service center via the telematics system, so as to avoid multiple communications to the remote service center or a lengthy communication with the remote service center, thereby reducing the cost of the instruction service to the driver of the vehicle.

These and other objects, advantages, purposes, and features of the present invention will become more apparent from the study of the following description taken in conjunction with the drawings.

DESCRIPTION OF THE PREFERRED EMBODIMENTS

Figure 1:
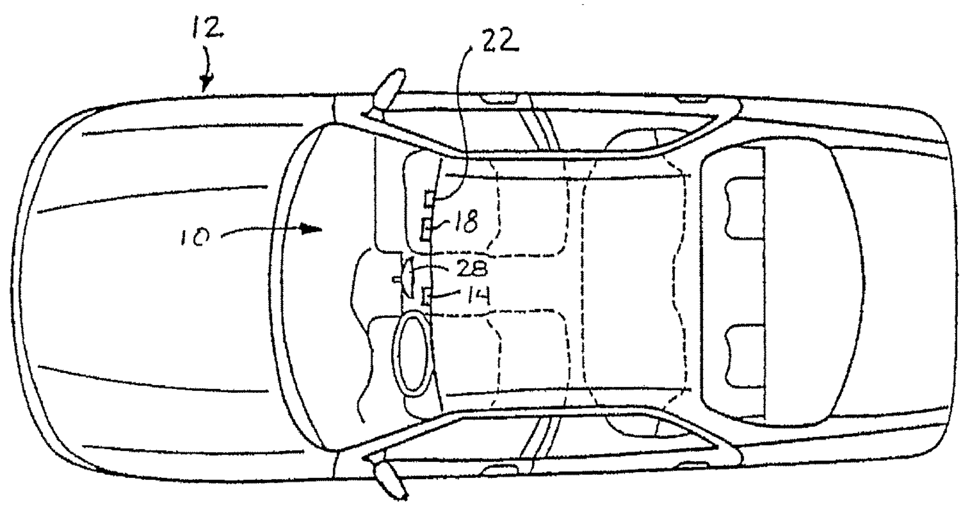
FIG. 1 is a top plan view of a vehicle incorporating a navigation system in accordance with the present invention.
Figure 2:
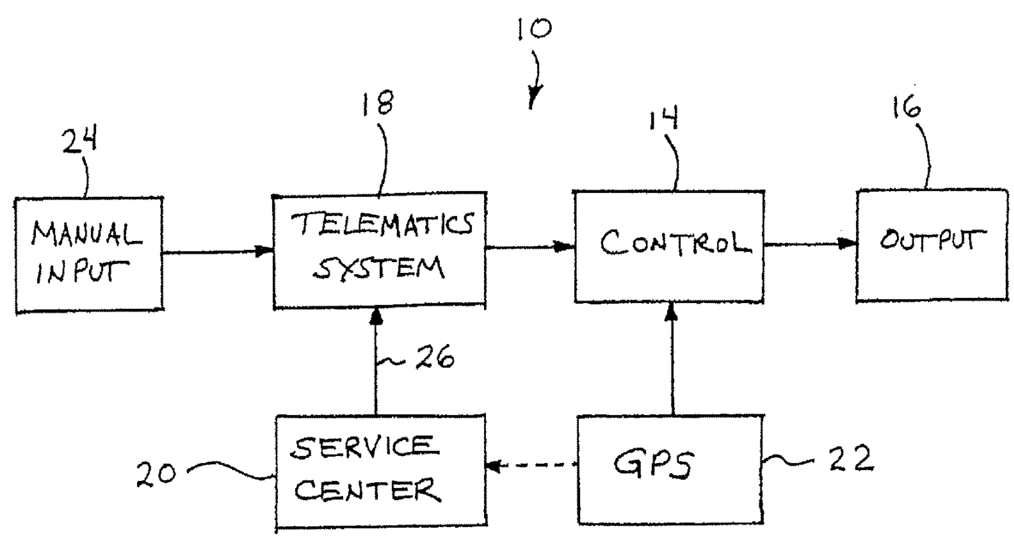
FIG. 2 is a block diagram of a navigation system in accordance with the present invention.

Referring now to the drawings and the illustrative embodiments depicted therein, a navigation system 10 of a vehicle 12 includes a control 14 which is operable to communicate an output 16, such as step-by-step directions or driving instructions, to a driver of the vehicle based on an initial, current or present geographic position of the vehicle and the desired or targeted final destination of the vehicle (FIGS. 1 and 2). The initial geographic position of the vehicle and the targeted destination is communicated to a remote source or service center 20 via a telematics system 18 of the vehicle and a global positioning system 22 of the vehicle. In response to a user input 24 from the driver or other occupant of the vehicle and the initial geographic position of the vehicle, the service center 20 provides or downloads a set of instructions or driving directions 26, which is received by the control 14 from the service center via the telematics system or wireless communication system 18 of the vehicle. Each of the particular instructions is electronically or digitally or otherwise coded, tagged, keyed, or otherwise associated with a respective particular geographic location or waypoint. The control 14 then provides the instructions or output 16 to the driver in a step-by-step manner based on the GPS-derived, actual, then current geographic position of the vehicle, and with the stepping from one step to the subsequent step of the instructions being linked to the then current geographic position of the vehicle in relation to the particular geographic locations or waypoints associated with the instructions, as discussed below.

The driver or the other occupant of the vehicle provides the user input 24 to the telematics system or wireless communication system 18 of the vehicle. The user input 24 may include a vocal communication or request for driving instructions or directional information to the final destination to an operator or voice input/recognition system of the service center or the like 20 associated with the telematics system 18 of the vehicle, or may be a keyed-in request or instructions via a keypad or the like to a remote computer system or computerized service center or the like, without affecting the scope of the present invention. The driver or other occupant of the vehicle may provide (such as via a vocal communication or via a keypad input or the like) the initial position of the vehicle to the service center or the geographic position of the vehicle may be communicated to the service center via a global positioning system 22 of the vehicle.

The remote service center 20 is then operable to download the local map and/or the driving instructions or directions to a memory storage or control 14 of the vehicle while the communication link is open between the service center and the vehicle. Because only the local information necessary to direct the driver to the targeted destination is downloaded to the control or memory of the vehicle, the download may be completed in a relatively short period of time (thus minimizing the time and cost of the communication) and does not require a large amount of memory or storage space for the information. After the instructions or directions are downloaded to the vehicle, the driver may disconnect from the service center to avoid additional charges for the communication and service.

Each of the output instructions provided by the control is electronically or digitally or otherwise keyed or coded or tagged or otherwise associated with or linked to a respective or corresponding geographic location or waypoint. The instructions may be tagged or coded by the remote source or service center before the instructions are downloaded to the vehicle, or the instructions may be tagged or coded by the control at the vehicle after the instructions have been downloaded to the control, without affecting the scope of the present invention.

The control 14 also receives, preferably continuously, an input from the in-vehicle or vehicle-based global positioning system 22 which is indicative of the actual, current geographic position of the vehicle as it travels along the road, highway or the like. The control is then operable to compare the tagged or coded geographic locations as associated with the respective instructions with the GPS-derived actual geographic position information. Thus, the control is operable to determine when a particular instruction is appropriate to be displayed or communicated to the driver of the vehicle by determining that the actual GPS-derived geographic position of the vehicle is now at or at least close to the geographic location associated with a particular instruction. The control is then operable to provide the separate or particular output instructions to the driver of the vehicle in response to the actual, then current geographic position of the vehicle matching or corresponding to or approaching a particular geographic location or waypoint keyed to or coded to or tagged to or associated with a respective, particular instruction.

Preferably, the output or instructions are provided to the driver of the vehicle in a step-by-step manner, where each individual instruction or step is provided based on the then current geographic position of the vehicle with respect to the keyed or coded geographic location. More particularly, each particular instruction is provided to the driver by the control only when the actual geographic position of the vehicle at least generally corresponds to or matches the particular geographic location associated with or linked to the respective, particular instruction. The particular instruction is thus provided to the driver of the vehicle at the particular time at which the vehicle is positioned at or near a geographic location where the particular instruction is most useful to the driver of the vehicle.

For example, an initial instruction may be electronically or digitally coded to the initial geographic position of the vehicle when the directions/instructions are first requested (e.g., "You are heading East on First Street"). Each subsequent individual step may be provided in response to the control detecting or determining (in response to an output of the global positioning system) that the vehicle is approaching, at or near the next geographic location or waypoint, such as a turn, location, intersection or the like, at which the next step is to be performed (e.g., the car is approaching and within a predetermined or threshold distance from Main Street and the next instruction is "Turn Left on Main Street"), or in response to the control detecting or determining (again in response to the global positioning system of the vehicle) that a previous instruction or step has been completed (e.g., the car has turned left and is now traveling along Main Street and the next instruction is "Proceed North on Main Street"). The control is thus operable to provide the next step or instruction only when the driver can readily understand the instruction and focus on performing that particular step. The driver thus does not have to remember all of the multiple steps or turns or street names or exits or the like while also driving the vehicle. The driver also thus does not have to remain on the line with the remote service center operator and/or does not have to repeatedly contact the service center to obtain the instructions again if any of the instructions are forgotten, since the local instructions and/or map have been downloaded to the vehicle.

The telematics system or wireless communication system 18 of the vehicle may be operable to connect to a corresponding service center or operator or voice input/recognition system or the like 20 which may provide a variety of information or assistance to the driver of the vehicle in response to a vocal message from the driver or other occupant of the vehicle (although the user input may be a keypad input or the like to a computerized service center or the like, without affecting the scope of the present invention). Such a communication system and service center may be substantially similar to known systems and centers, such as General Motors' ONSTAR®, Daimler's TELEAID™, Ford's RESCUE) or the like, which are common in vehicles today. The communication link may be accomplished utilizing various linking principles, such as the principles disclosed in commonly assigned U.S. Pat. Nos. 6,420,975; 6,278,377; 6,243,003; 6,329,925; 6,428,172; 6,326,613, the disclosures of which are hereby incorporated herein by reference.

The driver or occupant of the vehicle may actuate a communication link (such as via a push button or the like at the interior rearview mirror or at a console of the vehicle), and request from the operator, such as via a voice input, the driving instructions or directions as to how to get to a desired or targeted location or destination. The service center may receive the initial geographic position of the vehicle (such as in response to the global positioning system of the vehicle or from the driver), and may access a database to obtain the appropriate local map and/or local directions to the targeted destination. The operator may even access the vast data banks available at the service center for destinations or locations and may provide human interaction to help find the destination of choice if the driver does not know the exact address. The operator or service center then downloads the local information or step-by-step or turn-by-turn directions 26 to the control or memory or storage system 14 of the vehicle 12 in a single download. Optionally, it is envisioned that the service center may download or provide the information to the vehicle in real time (which may result in a longer opened communication link between the vehicle and the service center), without affecting the scope of the present invention.

The control 14 is operable to provide the downloaded instructions to the driver of the vehicle while the vehicle is driven by the driver toward the targeted destination. The control 14 provides the information or directions or output 16, such as when/where to turn, how far until the turn, and the direction to travel, to the driver as needed. The control may be operable to update the output display or message in real time based on the current geographic position of the vehicle as the vehicle travels along the given route.

The output or instructions may be provided to the driver by the control via an audible message or signal, such as via one or more speakers of the vehicle, such as by utilizing principles of audio systems of the types disclosed in commonly assigned U.S. Pat. Nos. 6,243,003; 6,278,377 and 6,420,975, which are hereby incorporated herein by reference, or may be provided via a display, such as in a display of an interior rearview mirror 28, such as a scrolling display of the type disclosed in U.S. patent application Ser. No. 09/799,414, filed Mar. 5, 2001, now U.S. Pat. No. 6,477,464, which is hereby incorporated herein by reference, or a display on demand type display, such as the types disclosed in commonly assigned U.S. Pat. Nos. 5,668,663 and 5,724,187, and U.S. patent application Ser. No. 10/054,633, filed Jan. 22, 2002, now U.S. Pat. No. 7,195,381; and Ser. No. 09/793,002, filed Feb. 26, 2001, now U.S. Pat. No. 6,690,268, the entire disclosures of which are hereby incorporated herein by reference, or in a display screen or the like at the interior rearview mirror assembly or elsewhere within the vehicle, without affecting the scope of the present invention. Other types of visible displays or locations for such visible displays may be utilized, such as at an accessory module or pod or windshield electronic module, an instrument panel of the vehicle, a console of the vehicle and/or the like, without affecting the scope of the present invention. The visible display may comprise written instructions, icons (such as left and right arrows or the like), or any other characters or symbols or indicia which convey to the driver of the vehicle when/where to turn and/or which direction to travel in order to arrive at the targeted destination. Optionally, the output may comprise a combination of a visible display and an audible message or signal, without affecting the scope of the present invention.

As indicated above, a variety of means may be utilized to visually convey the direction instructions to the driver of the vehicle. For example, and such as described in U.S. patent application Ser. No. 09/799,414, filed Mar. 5, 2001, now U.S. Pat. No. 6,477,464, which is hereby incorporated herein by reference, a text display may be provided and/or an iconistic display may be provided, such as a display readable through the interior rearview mirror reflective element itself. In this regard, use of a display on demand (DOD) type display (such as disclosed in commonly assigned, U.S. patent application Ser. No. 10/054,633, filed Jan. 22, 2002, now U.S. Pat. No. 7,195,381, and Ser. No. 09/793,002, filed Feb. 26, 2001, now U.S. Pat. No. 6,690, 268, and in U.S. Pat. Nos. 5,668,663 and 5,724,187, the entire disclosures of which are hereby incorporated by reference herein), may be preferred. For example, a video display element or a video display screen or an information display element can be used (such as an elongated alphanumeric/multi-pixel/multi-icon display element and/or such as an LCD display or an emitting display element, such as a multi-pixel electroluminescent display or field emission display or light emitting diode display (organic or inorganic) or the like) which is disposed within the mirror housing of the interior mirror assembly of the vehicle, and located behind the mirror reflective element in the mirror housing, and configured so that the information displayed by the display element (that is positioned to the rear of the reflector of the mirror reflective element) is viewable by the driver through the mirror reflective element. Such a display can be accomplished by partially or wholly removing the reflector in the area of the display or, more preferably, by providing a display on demand type display, whereby the reflective element comprises a transflective element, as discussed below.

Preferably, and such as is disclosed in U.S. patent application Ser. No. 09/793,002, filed Feb. 26, 2001, now U.S. Pat. No. 6,690,268, the video display screen or other visible display element or elements may be disposed behind the mirror reflective element so that the information displayed is visible by viewing through the mirror reflective element of the interior rearview mirror assembly, with the reflective element preferably comprising a transflective mirror reflector such that the mirror reflective element is significantly transmitting to visible light incident from its rear (i.e. the portion furthest from the driver in the vehicle), with at least about 15% transmission preferred, at least about 20% transmission more preferred, and at least about 25% transmission most preferred, while, simultaneously, the mirror reflective element is substantially reflective to visible light incident from its front (i.e. the position closest to the driver when the interior mirror assembly is mounted in the vehicle), with at least about 60% reflectance preferred, at least about 70% reflectance more preferred, and at least about 75% reflectance most preferred.

Preferably, a transflective electrochromic reflective mirror element is used (such as is disclosed in U.S. patent application Ser. No. 09/793,002, filed Feb. 26, 2001, now U.S. Pat. No. 6,690,268; and/or in U.S. Pat. Nos. 5,668,663 and 5,724,187, the entire disclosures of which are hereby incorporated by reference herein) that comprises an electrochromic medium sandwiched between two substrates. With the likes of a TFT LCD video display or a light emitting information display disposed behind the rear substrate of a third-surface transflective electrochromic mirror reflective element in a "display-on-demand" configuration (such as disclosed in U.S. patent application Ser. No. 10/054,633, filed Jan. 22, 2002, now U.S. Pat. No. 7,195,381, and Ser. No. 09/793,002, filed Feb. 26, 2001, now U.S. Pat. No. 6,690,268, which are hereby incorporated herein by reference), the presence of (and the image or information displayed by) the video display screen or information display is only principally visible to the driver (who views the display through the transflective mirror reflective element) when the information display element is powered so as to transmit light from the rear of the mirror reflective element through the transflective mirror reflector to reach the eyes of the driver. Preferably, a single high-intensity power LED, such as a white light emitting LED comprising a Luxeon™ Star Power LXHL-MW1A white light emitting LED having (at a 25 degree Celsius junction temperature) a minimum forward voltage of 2.55 volts, a typical forward voltage of 3.42 volts, a maximum forward voltage of 3.99 volts, a dynamic resistance of 1 ohm and a forward current of 350 milliamps, and as available from Lumileds Lighting LLC of San Jose, Calif., is used as a backlight for the TFT LCD video screen. Alternately, a plurality of such single high-intensity power LEDs (such as an array of two or of four such power LEDs) may be placed behind the TFT LCD video screen so that the intense white light projected from the individual single high-intensity power LEDs passes through the TFT LCD element and through the transflective electrochromic element, preferably producing a display intensity as viewed by the driver of at least about 200 candelas/sq. meter; more preferably at least about 300 candelas/sq. meter; and most preferably at least about 400 candelas/sq. meter. Alternately, cold cathode vacuum fluorescent sources/tubes can be used for backlighting and optionally can be used in conjunction with LED backlighting.

Optionally, and in accordance with incorporated U.S. patent application Ser. No. 09/793,002, now U.S. Pat. No. 6,690,268, a reverse-aid rearward viewing camera can be mounted to the rear of the vehicle in order to display to the driver, upon selecting a reverse gear, a field of view immediately rearward of the vehicle so as to assist the driver in reversing the vehicle. Such vehicle reverse-aid camera systems are disclosed in U.S. patent application Ser. No. 09/361,814, filed Jul. 27, 1999, now U.S. Pat. No. 6,201, 642, and in U.S. patent application Ser. No. 09/199,907, filed Nov. 25, 1998, now U.S. Pat. No. 6,717,610, and in U.S. patent application Ser. No. 09/313,139, filed May 17, 1999, now U.S. Pat. No. 6,222,447; Ser. No. 09/776,625, filed Feb. 5, 2001, now U.S. Pat. No. 6,611,202.

Note that other display locations are possible for display of the video image or information display, such as a map and/or a text message comprising driving instructions, to the driver or occupant of the vehicle. For example, a video image may be displayed on an LCD video screen of flip-down display (such as is disclosed in U.S. patent application Ser. No. 09/793,002, filed Feb. 26, 2001, now U.S. Pat. No. 6,690,268, incorporated above), or on a video screen incorporated into the rearview mirror assembly, such as the type disclosed in U.S. provisional applications, Ser. No. 60/439, 626, filed Jan. 13, 2003; Ser. No. 60/489,812, filed Jul. 24, 2003; and Ser. No. 60/492,225, filed Aug. 1, 2003, which are hereby incorporated herein by reference. Optionally, for example, a video display located in the front instrument panel can be used, or a video display located in an overhead console (such as an overhead accessory module or system as described in U.S. provisional applications, Ser. No. 60/489, 812, filed Jul. 24, 2003; and Ser. No. 60/492,225, filed Aug. 1, 2003, which are hereby incorporated herein by reference) can be used, without affecting the scope of the present invention.

Alternately, as outlined above, a local area map may be downloaded to the control from the external service provider or service center and the control may be operable (such as by using the principles disclosed in U.S. patent application Ser. No. 10/054,633, filed Jan. 22, 2002, now U.S. Pat. No. 7,195,381, and Ser. No. 09/793,002, filed Feb. 26, 2001, now U.S. Pat. No. 6,690,268, which are hereby incorporated herein by reference) to feed such a map to the likes of a thin film transistor (TFT) liquid crystal (LC) video screen or other type of video screen or display element or display system, and with the instructions being conveyed by alphanumeric characters and/or indicia or the like and/or by highlighting portions of the map display. Such highlighting may be controlled by the in-vehicle control or control unit based on actual, current vehicle position information as determined by the in-vehicle or vehicle-based global positioning system. Thus, the vehicle owner need not buy into or have in the vehicle a full map of all areas to which the vehicle may be driven (such as regional maps or national maps or the like).

Alternately, a low cost, multi-pixel display (such as the type disclosed in U.S. provisional application, Ser. No. 60/373,932, filed Apr. 19, 2002, and in U.S. patent application Ser. No. 10/418,486, filed Apr. 18, 2003, now U.S. Pat. No. 7,005,974, which are hereby incorporated herein by reference), such as a low cost multi-pixel vacuum fluorescent display, a low cost multi-pixel organic light emitting diode (OLED), a low cost multi-pixel field emission display, or any other or similar multi-pixel light emitting display or the like may be utilized, without affecting the scope of the present invention. The local area map, with the instructions iconistically displayed thereon, may be displayed on such a multi-pixel display or the like in response to the control receiving an input or download from the telematics system and/or the in-vehicle or vehicle-based global positioning system.

As disclosed in U.S. patent application Ser. No. 10/054,633, filed Jan. 22, 2002, now U.S. Pat. No. 7,195,381, incorporated above, suitable LEDs for a light source unit include a white light emitting light emitting diode, such as described in U.S. provisional applications, Ser. No. 60/263,680, filed Jan. 23, 2001; Ser. No. 60/243,986, filed Oct. 27, 2000; Ser. No. 60/238,483, filed Oct. 6, 2000; Ser. No. 60/237,077, filed Sep. 30, 2000; Ser. No. 60/234,412, filed Jul. 21, 2000; Ser. No. 60/218,336, filed Jul. 14, 2000; and Ser. No. 60/186,520, filed Mar. 2, 2000, and U.S. utility applications entitled VIDEO MIRROR SYSTEMS INCORPORATING AN ACCESSORY MODULE, filed Feb. 26, 2001, now U.S. Pat. No. 6,690,268, and REARVIEW MIRROR ASSEMBLY WITH UTILITY FUNCTIONS, Ser. No. 09/585,379, filed Jun. 1, 2000, including a thermostable LED, which emits the same color light even when the temperature varies. Thus, regardless of the interior or exterior temperature of the vehicle and/or of the accessory equipped with the thermostable non-incandescent light emitting diode source, the same color light is radiated. Such a thermostable white light emitting non-incandescent light emitting diode source can incorporate a trio of red, green, and blue fluorescent materials that together create white light when struck by 380 nm wavelength light from a gallium-nitride LED, and is available from Toyoda Gosei Co. and Toshiba Corp of Nagoya, Japan.

One suitable white light emitting diode (LED) that is thermostable is available from Toshiba America Electronic Components, Inc. of Irvine, Calif., Part No.: TLWA1100. The thermostable white-light LED integrates multiple colored phosphors and a short peak wavelength (preferably, approximately 380 nanometers (nm) in peak spectral output intensity) light-emitting diode junction in a phosphor-mixed transparent resin package to achieve a high luminosity, low power consumption light source. Such thermostable LEDs adopt a technological approach differing from that used in conventional LEDs. Light emission in the visible wavelength band is controlled by excited phosphors, not by using temperature changes in the LED to achieve a change in color output. The fact that the LED emission does not directly determine the color brings advantages in overall controllability and wavelength stability. Incorporated in vehicular accessories, such as those disclosed above, the thermostable diode achieves improved tonic reproduction and enhanced color durability during temperature shifts. Such thermostable LEDs utilize a short wavelength light source by reducing the indium in an indium-doped GaN emission layer. This excites red, green, and blue (RGB) phosphors in the transparent resin of the device package to output white light. The RGB balance of the phosphor layer determines the output color, and different colored output can be achieved through modified phosphor balance. The emission light from the LED itself does not directly contribute to the white color. The phosphors used in the new LED offer excellent performance in terms of operating temperature range and color yield. Specifications of such thermostable white LEDs include a compact package (3.2×2.8 millimeter), provided in a Surface Mount Device (SMD). Luminosity is typically about 100 millicandela (mcd) at 20 mA and luminous flux/electrical watt is about 4.5-5.0 lumens per watt at 20 mA. Correlated color temperature is about 6,500-9,000K. Operating temperature is about −40° Celsius-100° Celsius and storage temperature is about −40°-100° Celsius.

Also, high brightness LEDS are available from Uniroyal Technology Corporation of Saratoga, Fla. under the tradename POWER-Ga(I)™ High Brightness InGaN LEDs which comprise high brightness, high luminous efficiency short wavelength LEDs utilizing a power ring n-Contact and a centralized p-Pad design feature. 450 nm and 470 nm high brightness blue LED die products are available that have a minimum power output of 2 milliwatts in die form which, when conventionally packaged, can result in packaged lamp power levels between 4 and 5 milliwatts. Such LEDs combine indium gallium nitride (InGaN) materials on sapphire substrates in order to produce higher efficiencies. GaN LEDs can be produced by MOCVD epitaxy on Sapphire (aluminum oxide) or can be produced on silicon carbide substrates. Ultraviolet light emitting LEDs can be produced.

Depending on the application, LEDs emitting a colored light can be used, such as high intensity amber and reddish orange light emitting diode sources, such as solid state light emitting diode LED sources utilizing double hydro junction AlGaAs/GaAs Material Technology, such as very high intensity red LED lamps (5 mm) HLMP-4100/4101 available from Hewlett Packard Corporation of Palo Alto, Calif., or transparent substrate aluminum indium gallium phosphide (AlInGaP) Material Technology, commercially available from Hewlett Packard Corporation of Palo Alto, Calif. Also, blue can be used, or a combination of individual different colored diodes, such as red, blue, white, green, amber, orange etc. can be used with color mixing thereof to form a desired color or to deliver a desired local intensity of illumination as noted above. Other suitable white emitting light-emitting diodes are available from Nichia Chemical Industries of Tokyo, Japan and from Cree Research Inc., of Durham, N.C. For example, a white light emitting diode is available from Nichia Chemical Industries of Tokyo, Japan under Model Nos. NSPW 300AS, NSPW 500S, NSPW 310AS, NSPW 315AS, NSPW 510S, NSPW 515S and NSPW WF50S, such as is disclosed in U.S. patent application Ser. No. 09/448,700, filed Nov. 24, 1999, now U.S. Pat. No. 6,329,925, and in U.S. patent application Ser. No. 09/244,726, filed Feb. 5, 1999, now U.S. Pat. No. 6,172,613. A variety of constructions are used including GaAsP on GaP substrate, gallium aluminum phosphide, indium gallium nitride, and GaN on a SiC substrate. Optionally, a plurality of LEDs such as a cluster of two, three, four, six, eight or the like LEDs (each of the same color or the cluster comprising different colored LEDs) can be used to target and illuminate a local area for higher illumination at that area, such as may be useful in a map light or as a reading light or as an interior light or as an illumination source for an interior vehicle cabin-mounted and monitoring camera (most preferably illuminating the target area with white light). Such a cluster of high efficiency LEDs can be mounted at the mirror mount so as to project an intense pattern of light generally downwardly into the vehicle cabin for purposes of map reading, general illumination, courtesy illumination and the like. Also, a cluster of LED's, preferably including at least one white emitting LED and/or at least one blue emitting LED, can be mounted in a roof portion, side portion or any other portion of the vehicle cabin to furnish dome lighting, rail lighting, compartment lighting and the like. Use of white emitting LEDs is disclosed in U.S. Pat. No. 6,152,590, entitled LIGHTING DEVICE FOR MOTOR VEHICLES, filed Feb. 12, 1999, by Peter Fuerst and Harald Buchalla of Donnelly Hohe Gmbh & Co, KG.

Other suitable LEDs may include high-intensity, high current capability light emitting diodes such as the high-flux power LEDs available from LumiLeds Lighting, U.S., LLC of San Jose, Calif. under the SunPower Series High-Flux LED tradename. Such high-intensity power LEDs comprise a power package allowing high current operation of at least about 100 milliamps forward current, more preferably at least about 250 milliamps forward current, and most preferably at least about 350 milliamps forward current through a single LED. Such high current/high-intensity power LEDs (as high as 500 mA or more current possible, and especially with use of heat sinks) are capable of delivering a luminous efficiency of at least about 1 lumen per watt, more preferably at least about 3 lumens per watt, and most preferably at least about 5 lumens per watt. Such high intensity power LEDs are available in blue, green, blue-green, red, amber, yellow and white light emitting forms, as well as other colors. Such high-intensity LEDs can provide a wide-angle radiation pattern, such as an about 30 degree to an about 160 degree cone. Such high-intensity power LEDs, when normally operating, emit a luminous flux of at least about 1 lumen, more preferably at least about 5 lumens and most preferably at least about 10 lumens. For certain applications such as ground illumination from lighted exterior mirror assemblies and interior mirror map lights, such high-intensity power LEDs preferably conduct at least about 250 milliamps forward current when operated at a voltage in the about 2 volts to about 5 volts range, and emit a luminous flux of at least about 10 lumens, more preferably at least about 15 lumens and most preferably at least about 25 lumens, preferably emitting white light.

For example, the mirror assembly may include circuitry for mirror mounted video cameras, which are used to visually detect the presence of moisture on the windshield and actuate windshield wipers accordingly, such as described in U.S. patent application Ser. No. 08/621,863, filed Mar. 25, 1996, now U.S. Pat. No. 5,796,094, or mirror mounted cameras for vehicle internal cabin monitoring disclosed in U.S. Pat. Nos. 5,877,897 and 5,760,962, both commonly assigned, or mirror mounted cameras for rear vision systems as disclosed in U.S. Pat. Nos. 5,959,367; 5,929,786; 5,949,331; 5,914,815; 5,786,772; 5,798,575; 5,670,935; and U.S. patent application Ser. No. 09/304,201, filed May 3, 1999, now U.S. Pat. No. 6,198,409; Ser. No. 09/375,315, filed Aug. 16, 1999, now U.S. Pat. No. 6,175,164; Ser. No. 09/199,907 filed Nov. 25, 1998, now U.S. Pat. No. 6,717,610; Ser. No. 09/361,814, filed Jul. 27, 1999, now U.S. Pat. No. 6,201,642; Ser. No. 09/372,915, filed Aug. 12, 1999, now U.S. Pat. No. 6,396,397; Ser. No. 09/300,201, filed May 3, 1999; and Ser. No. 09/313,139, filed May 17, 1999, now U.S. Pat. No. 6,222,447, which are all commonly assigned. Additional features and accessories that may be incorporated into the mirror assembly include: a trip computer, an intrusion detector, displays indicating, for example passenger air bag status, including information displays such as a PSIR (Passenger Side Inflatable Restraint) display, an SIR (Side-Airbag Inflatable Restraint), compass/temperature display, a tire pressure status display or other desirable displays and the like, such as those described in U.S. patent application Ser. No. 09/244,726, filed Feb. 5, 1999, now U.S. Pat. No. 6,172,613. For example, a rearview mirror assembly (or an accessory module assembly such as a windshield electronics module assembly), may include: antennas, including GPS or cellular phone antennas, such as disclosed in U.S. Pat. No. 5,971,552; a communication module, such as disclosed in U.S. Pat. No. 5,798,688; displays such as shown in U.S. Pat. No. 5,530,240 or in U.S. application Ser. No. 09/244,726, filed Feb. 5, 1999, now U.S. Pat. No. 6,172,613; blind spot detection systems, such as disclosed in U.S. Pat. No. 5,929,786 or 5,786,772; transmitters and/or receivers, such as garage door openers, a digital network, such as described in U.S. Pat. No. 5,798,575; a high/low head lamp controller, such as disclosed in U.S. Pat. No. 5,715,093; a memory mirror system, such as disclosed in U.S. Pat. No. 5,796,176; a hands-free phone attachment, a video device for internal cabin surveillance and/or video telephone function, such as disclosed in U.S. Pat. Nos. 5,760,962 and 5,877,897 and application Ser. No. 09/433,467, now U.S. Pat. No. 6,326,613; a remote keyless entry receiver; microphones and/or speakers, such as disclosed in U.S. patent application Ser. No. 09/361,814, filed Jul. 27, 1999, now U.S. Pat. No. 6,201,642, and Ser. No. 09/199,907, filed Nov. 25, 1998, now U.S. Pat. No. 6,717,610; a compass, such as disclosed in U.S. Pat. No. 5,924,212; seat occupancy detector; a trip computer; an ONSTAR System or the like, with all of these referenced patents and applications being commonly assigned.

An interior rearview mirror assembly may also include a compass/temperature and a clock display, fuel level display, and other vehicle status and other information displays. The interior rearview mirror assembly may also include a compass/temperature and a clock display, fuel level display, and other vehicle status and other information displays. Furthermore, information displays may be incorporated which provide information to the driver or occupants of the vehicle, such as warnings relating to the status of the passenger airbag. In application Ser. No. 09/244,726, filed Feb. 5, 1999, now U.S. Pat. No. 6,172,613, information displays are provided which include information relating to vehicle or engine status, warning information, and the like such as information relating to oil pressure, fuel remaining, time, temperature, compass headings for vehicle direction, and the like. The passenger side air bag on/off signal may be derived from various types of seat occupancy detectors such as by video surveillance of the passenger seat as disclosed in PCT Application No. PCT/US94/01954, filed Feb. 25, 1994, published Sep. 1, 2004 as PCT Publication No. WO/1994/019212, or by ultrasonic or sonar detection, infrared sensing, pyrodetection, weight detection, or the like. Alternately, enablement/displayment of the passenger side air bag operation can be controlled manually such as through a user-operated switch operated with the ignition key of the vehicle in which the mirror assembly is mounted as described in U.S. patent application Ser. No. 08/799,734, filed Feb. 12, 1997, now U.S. Pat. No. 5,786,772. In addition, the interior rearview mirror assemblies may include electronic and electric devices, including a blind spot detection system, such as the type disclosed in U.S. patent application Ser. No. 08/799,734, filed Feb. 12, 1997, now U.S. Pat. No. 5,786,772, or rain sensor systems, for example rain sensor systems which include windshield contacting rain sensors such as described in U.S. Pat. No. 4,973,844 or non-windshield contacting rain sensors, such as described in PCT International Application PCT/US94/05093, published as WO 94/27262 on Nov. 24, 1994.

In addition, the mirror assembly (or an accessory module assembly such as a windshield electronics module assembly) may incorporate one or more video screens or video display assemblies, such as disclosed in U.S. provisional applications, Ser. No. 60/263,680, filed Jan. 23, 2001; Ser. No. 60/243,986, filed Oct. 27, 2000; Ser. No. 60/238,483, filed Oct. 6, 2000; Ser. No. 60/237,077, filed Sep. 29, 2000; Ser. No. 60/234,412, filed Sep. 21, 2000; Ser. No. 60/218,336, filed Jul. 14, 2000; and Ser. No. 60/186,520, filed Mar. 2, 2000, all commonly assigned.

The video screen may be used for a baby minder system, such as the vehicle interior monitoring system described in U.S. Pat. Nos. 5,877,897 and 5,760,962 or the rear vision system described in U.S. patent application Ser. No. 09/361,814, filed Jul. 27, 1999, now U.S. Pat. No. 6,201,642, and Ser. No. 09/199,907, filed Nov. 25, 1998, now U.S. Pat. No. 6,717,610, and Ser. No. 09/433,467, filed Nov. 4, 1999, now U.S. Pat. No. 6,326,613. An interior surveillance system permits the driver of the vehicle to observe behavior or the activities of babies or children or other passengers seated in the rear seat. This is especially advantageous when the child or baby is in a rearward facing car seat, where the child or baby would ordinarily not be visible to the driver while driving. For example, a camera, such as a CMOS or CCD camera, can be mounted to view the rear seat area of the vehicle so that the driver can view what is occurring, such as in a rear seat mounted baby seat or with a rear seat passenger, such as children. Preferably, to enable viewing of the rear seat occupant or occupants even by night, the target field of view of the camera may be illuminated in a manner that provides adequate visibility for the camera to discern what is occurring in the rear seat in a darkened vehicle cabin but not illuminating in a manner that causes glare, distraction, and/or discomfort to any vehicle occupants, including the driver and/or rear seat passengers. For example, such a rear seat monitoring camera illumination is preferably achieved using directed low level non-incandescent light sources, such as light emitting diodes (LEDs), organic light emitting material, electroluminescent sources (both organic and inorganic), and the like, and most preferably such non-incandescent sources are low power and are directed low intensity sources, such as described in U.S. Pat. No. 5,938,321 and application Ser. No. 09/287,926, filed Apr. 7, 1999, now U.S. Pat. No. 6,139,172. The baby minder camera may be mounted as a part of the rearview mirror assembly and, most preferably, may be mounted as a part of a roof area of the interior vehicle cabin such as a header, including a front header of a roof or a rear header or a header console of a roof. It may be desirable to mount a baby minder camera to the rear header of a roof when it is desirable to view rear facing child support seats. Most preferably, a plurality of at least two, more preferably at least four, and most preferably at least six LEDs (or similar low level, directed, low-current light sources such as electroluminescent sources and organic light emitting sources) are mounted with a camera (preferably, such as to form a ring around the camera) with the light projected from the individual LEDs directed to be coincident with the camera field of view and to illuminate the target area desired to be viewed. The LEDs being directed low level sources will not glare or cause discomfort to occupants when illuminated. Further, camera illumination sources can be illuminated whenever the ignition switch is on to operate the vehicle or at least when the ignition switch is placed in an "accessory on" position so that both the camera and illumination lights are operating on vehicle battery power even when parked. Alternately, the illumination lights can be operational only when the baby minder camera is selected to be operational. While it is preferred to use non-incandescent lights, incandescent light sources can be used, most preferably high intensity, low current incandescent light sources. For example, when the camera is activated to view the rear seat or to view a baby seat or the like, the dome light in the vehicle, which typically comprises an incandescent light source, can illuminate so that the rear seat area is illuminated to assist visibility for the camera. A circuit or other device can be provided that illuminates the dome light (or a similar rear seat-illuminating interior light source, such as a rail lamp or the like) whenever the camera is selected to view the rear seat. Optionally, the dome light or similar interior light within the interior cabin, once caused to illuminate when the camera is activated, can cease to illuminate after a determined time interval (such as 5 seconds or ten seconds or longer) under the control of a timeout circuit or device. By providing a timeout, the driver can selectively view the status of passengers in the rear seat of the vehicle by selecting a baby-minder camera or similar rear seat viewing function (such as by voice command, user-operated switch or the like). Upon selection of the camera function, whatever is being viewed on the video screen in the vehicle may be interrupted (or superimposed over or the like), the interior light in the cabin (such as the dome light) will illuminate, a timeout will initiate, and the driver (or other front-seat occupant) can view the rear seat status for the duration of the timeout. Once the timeout elapses, the interior light ceases to illuminate, and preferably, the camera ceases to be activated and the video screen reverts to its pre-event status. Optionally, a reverse-aid rearward viewing camera can be mounted to the rear of the vehicle in order to display to the driver, upon selecting a reverse gear, a field of view immediately rearward of the vehicle so as to assist the driver in reversing the vehicle. Such vehicle reverse-aid camera systems are disclosed in U.S. patent application Ser. No. 09/361,814, filed Jul. 27, 1999, now U.S. Pat. No. 6,201,642, and in U.S. patent application Ser. No. 09/199,907, filed Nov. 25, 1998, now U.S. Pat. No. 6,717,610, and in U.S. patent application Ser. No. 09/313,139, filed May 17, 1999, now U.S. Pat. No. 6,222,447.

Light emitting sources, such as light emitting diodes, can be used to provide lighting for any camera that feeds an image to the mirror-mounted video screen (or feeds an image to an accessory module assembly such as a windshield electronics module assembly). Light emitting diodes can be used to provide illumination in various colors, such as white, amber, yellow, green, orange red, blue, or their combination, or the like, may be used. Alternately, other light emitting elements can be used to provide illumination for any camera that feeds an image to the mirror-mounted video screen, such as incandescent sources, fluorescent sources, including cold-cathode fluorescent sources, electroluminescent sources (both organic and inorganic), such as described in U.S. Pat. No. 5,938,321, and application Ser. No. 09/287,926, filed Apr. 7, 1999, now U.S. Pat. No. 6,139,172, and in such as is disclosed in U.S. patent application Ser. No. 09/466,010, filed Dec. 17, 1999, now U.S. Pat. No. 6,420,975, and in U.S. patent application Ser. No. 09/449,121, filed Nov. 24, 1999, now U.S. Pat. No. 6,428,172, and U.S. patent application Ser. No. 09/585,379, filed Jun. 1, 2000, entitled REARVIEW MIRROR ASSEMBLY WITH UTILITY FUNCTIONS.

The mirror-mounted video screen can display the output from a rear vision back-up camera, such as disclosed in application Ser. No. 09/199,907, filed Nov. 25, 1998, now U.S. Pat. No. 6,717,610, and Ser. No. 09/361,814, filed Jul. 27, 1999, now U.S. Pat. No. 6,201,642, commonly assigned, along with vehicle instrument status, such as a vehicle information display, such as information relating to fuel gauge levels, speed, climate control setting, GPS directional instructions, tire pressure status, instrument and vehicle function status, and the like.

Also, and especially for a mirror assembly incorporating a video screen that is incorporated as part of an interior electro-optic (such as electrochromic) mirror assembly, a common circuit board and/or common electronic components and sub-circuitry can be utilized to control the electro-optic activity of the reflective element and to control the image displayed by the video screen, thus achieving economy of design and function, and for operating other electrical or electronic functions supported in the interior rearview assembly. For example, a circuit board of the interior mirror assembly may support, for example, light emitting diodes (LEDs) for illuminating indicia on display elements provided on a chin or eyebrow portion of the bezel region of the interior mirror casing. Reference is made to U.S. Pat. Nos. 5,671,996 and 5,820,245. It should be understood that one or more of these buttons or displays may be located elsewhere on the mirror assembly or separately in a module, for example of the type disclosed in U.S. patent application Ser. No. 09/244,726, now U.S. Pat. No. 6,172,613, and may comprise the touch-sensitive displays as disclosed in U.S. patent application Ser. No. 60/192,721, filed Mar. 27, 2000. Note that button inputs can be provided along the lower bezel region of the interior mirror assembly such that, when actuated, a display appears within the mirror reflector region of the mirror reflective element. Preferably, the display appears local to the physical location of the particular button accessed by the driver or vehicle occupant (typically, immediately above it) so that the person accessing the mirror associates the appearance and information of the display called up by that individual button with the user's actuation of the button. Multiple actuations of that button can cause the display to scroll through various menu items/data displays, allowing the user to access a wide range of information. The button and associated circuitry can be adapted to recognize when a particular menu item is desired selected (such as holding down a particular input button for longer than a prescribed period, for example longer than about 1 second or longer than about 2 seconds or the like; if the button is held down for less than the prescribed period, the display scrolls to the next menu item). Preferably, whatever information is being displayed is displayed by a substantially reflecting and substantially transmitting reflective/transmissive reflector of the mirror reflective element such as the display on demand constructions disclosed in U.S. Pat. No. 5,724,187. Also, these features can be provided for a non-mirror video display.

Optionally, one or more of the cameras of the vehicle may be equipped with infrared LED light emitting sources, such as are disclosed in U.S. patent application Ser. No. 09/025,712, filed Feb. 18, 1998, now U.S. Pat. No. 6,087,953, and U.S. patent application Ser. No. 09/244,726, filed Feb. 5, 1999, now U.S. Pat. No. 6,172,613, and in U.S. patent application Ser. No. 09/561,023, filed Apr. 28, 2000, now U.S. Pat. No. 6,553,308, and in U.S. patent application Ser. No. 09/466,010, filed Dec. 17, 1999, now U.S. Pat. No. 6,420,975, in order to light up an area in or around the vehicle when it is dark. When an intrusion detector such as a motion detector (preferably a pyrodetector-based intrusion detection system such as is disclosed in U.S. patent application Ser. No. 08/901,929, filed Jul. 29, 1997, now U.S. Pat. No. 6,166,625, and U.S. patent application Ser. No. 09/516,831, filed Mar. 1, 2000, now U.S. Pat. No. 6,390,529, and U.S. patent application Ser. No. 09/275,565, filed Mar. 24, 1999, now U.S. Pat. No. 6,086,131) is triggered by, for example, someone attempting to break into the vehicle or steal the vehicle, the vehicle-based security system triggers images captured by the vehicular camera(s) to be downloaded to the telemetry system which then forwards by wireless telecommunication (such as by radio frequency or by microwave transmission) the images (or a security alert signal derived from an in-vehicle image analysis of the captured images) to a security service, a mobile device in the possession of the driver of the vehicle when he/she is remote from the parked vehicle (such as a key-fob or a Palm Pilot™ PDA), the cell phone of the vehicle owner, the home computer of the vehicle owner or the police or the like that is remote and distant from the vehicle where the security condition is being detected. Preferably, the in-vehicle camera-based security system silently and secretly records the events occurring in and/or around the vehicle while it is operating (such as when idling in traffic or moving on a highway or stopped at a traffic light) and provides a "black box" recording of activities in the interior of the vehicle or exterior of the vehicle. For example, the security system may be used to record or document vehicle status including speed, brake activation, vehicle control status signals (for example, whether the turn signal has been actuated, vehicle traction, tire pressures, yaw and roll, geographic location, time and date) and other vehicle information as well as record visual images detected by the cameras. In an accident, such vehicle performance/function data in combination with a visual recording of the interior and/or exterior vehicular scene (and optionally, a microphone recording of sounds/voices interior and/or exterior to the vehicle) can help insurance and police investigators establish the causes and conditions of an accident. The camera-based vehicle performance/function recording system of the vehicle preferably records data onto a recording medium (such as onto electronic memory or onto digital recording tape) that is rugged and protected from the consequences of an accident so as to survive the impact forces, shocks, fires and other events possible in an automobile accident. Preferably, any electronic memory utilized is non-volatile memory that is non-erasing in the event of electrical power loss in the vehicle. For example, the camera-based in-vehicle security system may include an electronic memory recording medium and/or a video tape (preferably a digital) recording medium so that a pre-determined period of operation of the vehicle, such as up to the last about 1 minute of vehicle operation, more preferably up to the last about 5 minutes of vehicle operation, most preferably up to the last about 15 minutes of vehicle operation, or even greater, is continuously recorded (such as on a closed-loop tape or electronic recording that continually records the most recent events inside and/or outside the road transportation vehicle). The camera-based in-vehicle security system can maintain the stored images and/or vehicle data in the vehicle for downloading when desired such as after an accident. Alternately, the camera-based in-vehicle security system can transmit the images and/or vehicle data by wireless communication to a remote receiver such as a receiver distant and remote from the vehicle (such as at a security system or a telematic service such as ONSTAR™ or RESCU™ or at the vehicle owners home or at a car rental center). This can occur continuously while the vehicle is being operated, so that in the event an accident occurs, retrieval and analysis of the recorded information is not impeded such as by damage or even loss of the vehicle in the accident. Also, the remote receiver of the information can alert authorities (such as a police, fire and/or ambulance service) of an accident immediately when such accident occurs (and thus potentially speed aid to any accident victims and/or dispatch the correct medical aid for the type of accident/injuries recorded by the camera(s)). The recorded information can include the gear in which the driver is operating the vehicle, the activation of the brakes, the speed at which the driver is traveling, the rate of acceleration/deceleration, the time, date and geographic location, the atmospheric conditions including lighting conditions—basically, the system can record what happened during a collision whereby the system provides an information recordation function. For example, when the system is used to record an accident when the vehicle is operating, the cameras may record scenes, vehicle instrument/function status, or the like which are kept on a tape or non-volatile electronic, solid-state memory, for example a continuous loop tape or electronic memory. Alternately, this information can be continuously transmitted or downloaded. For example, the information can be downloaded in response to a selected stimuli or trigger, such as when the brakes are activated, the air bag or bags are activated, when the horn is operated, or when the car de-accelerates, or the like. For example, the system may use accelerometers such as disclosed in U.S. patent application Ser. No. 09/440,497, filed Nov. 15, 1999, now U.S. Pat. No. 6,411,204, and, furthermore, may be combined with the deceleration based anti-collision safety light control system described in the aforementioned application. This information recordation function can be used, as noted above, to record both interior activities and exterior activities and, therefore, can be used as noted above as a security system as well. When the system is used as a security system, the telemetry system may contact the security base who in turn can scroll through the camera images to determine whether the alarm is a true or false alarm. In this manner, various existing systems that are provided in the vehicle may be optionally used individually to provide one or more functions or collectively to provide even further or enhanced functions.

Examples of camera locations where vehicular cameras included in a vehicular camera-based accident recording system can be located include interior and exterior mirror assembly locations, roof areas such as a headliner or header console, front, side and rear exterior body areas such as front grilles, rear doors/trunk areas, side doors, side panels, door handles, CHMSL units, interior body pillars (such as an A-, B- or C-interior pillar) and seat backs, and such as are disclosed in U.S. provisional applications, Ser. No. 60/187,961, filed Mar. 9, 2000; Ser. No. 60/192,721, filed Mar. 27, 2000; and Ser. No. 60/186,520, filed Mar. 1, 2000; and in U.S. Pat. Nos. 5,877,897; 5,760,962; 5,959,367; 5,929,786; 5,949,331; 5,914,815; 5,786,772; 5,798,575 and 5,670,935; and U.S. patent application Ser. No. 09/304,201, filed May 3, 1999, now U.S. Pat. No. 6,124,886; Ser. No. 09/375,315, filed Aug. 16, 1999, now U.S. Pat. No. 6,175,164; Ser. No. 09/199,907, filed Nov. 25, 1998, now U.S. Pat. No. 6,717,610; Ser. No. 09/361,814, filed Jul. 27, 1999, now U.S. Pat. No. 6,201,642; Ser. No. 09/372,915, filed Aug. 12, 1999, now U.S. Pat. No. 6,396,397; Ser. No. 09/304,201, filed May 3, 1999, now U.S. Pat. No. 6,198,409; and Ser. No. 09/313,139, filed May 17, 1999, now U.S. Pat. No. 6,222,447, which are all commonly assigned. For example, a camera, preferably a solid-state CMOS video camera, can be located within the interior cabin of the vehicle (and preferably located at, on or within the interior rearview mirror assembly or at or in an A-pillar), and adapted to capture a surveillance image of the front and rear occupants of the vehicle. In this regard, locating the interior cabin surveillance camera at, on or within the interior rearview mirror assembly is preferred as this location provides the camera with a good rearward field of view that captures an image of all front and rear seat occupants. Preferably, the vehicle is also equipped with the in-vehicle portion of a wireless communication telematic system such as an ONSTAR™ or RESCU™ system, and the geographic location of the vehicle can also be established by a navigational system, such as an in-vehicle GPS system. Images of the interior vehicle cabin (including images of the various vehicle occupants) can be captured by the in-vehicle image capture device, preferably an interior mirror-mounted video camera, and this information, in conjunction with the geographic location of the vehicle provided by a position locator such as a GPS system, along with various vehicle information/function data such as the state of activation of any air bag in the vehicle, can be communicated by wireless telecommunication to an external service remote from the vehicle such as an ONSTAR™ or RESCU™ service. Such communication can be periodic (such as when the ignition is first turned on during a particular trip, or initially when the ignition is first turned on and intermittently thereafter, such as every about 1 minute or so) or continuous during operation of the vehicle with its engine turned on. Should the receiver at the remote service be alerted that an accident has occurred (such as by receiving from the vehicle via wireless telematic communication an accident alert signal indicative that an air bag has activated), the remote receiver (which can be an ONSTAR™ operator or an automatic computer-based image analyzer or an emergency service such as a "911" service provider) can count, via the video imaged relayed from the vehicle, the number of occupants in the vehicle and can accordingly alert emergency services as to the location of the accident and the number of victims involved (thus ensuring that the appropriate number of, for example, ambulances are dispatched to deal with the actual number of potential victims in the vehicle at the time of the crash). Optionally, the owner/driver of the vehicle can register/notify the remote telematic service of any special medical needs, blood types and the likes of the likely driver(s) and/or likely occupants (such as family members) along with any next-of-kin information, insurance coverage and the like so that, in the event the like of an ONSTAR™ or RESCU™ telematic service or telematically-linked "911" emergency response service determines an accident has occurred, medical and emergency relief specific to the likely/actual occupants of the vehicle can be dispatched. Likewise, should an in-vehicle fire be detected such as by visual determination via image analysis of video images telematically transmitted and/or by an in-vehicle temperature probe transmitting data telematically, then the fire brigade can be automatically sent to the crash site and/or an in-vehicle fire extinguisher can be activated to put out any fire (either by remote, wireless activation by the telematic service of the in-vehicle fire extinguisher or by automatic in-vehicle image analysis of the image recorded by an interior or exterior camera of the vehicle that, upon in-vehicle image analysis determining that a fire has occurred in the vehicle, causes a vehicular on-board fire extinguisher to actuate to put out the fire). Also, either remotely or via in-vehicle image analysis, the engine of the vehicle can be turned off after an accident has been detected via the vehicular camera system.

A variety of other electrical and electronic features can be incorporated into the assemblies, such as those disclosed in U.S. patent application Ser. No. 09/433,467, filed Nov. 4, 1999, now U.S. Pat. No. 6,326,613. For example, a microphone or a plurality of microphones may be incorporated, preferably to provide hands-free input to a wireless telecommunication system such as the ONSTAR™ system in use in General Motors vehicles. Most preferably, such microphones provide input to an audio system that transmits and communicates wirelessly with a remote transceiver, preferably in voice recognition mode. Such systems are described in U.S. patent application Ser. No. 09/382,720, filed Aug. 25, 1999, now U.S. Pat. No. 6,243,003.

In this regard it may be desirable to use audio processing techniques, such as digital sound processing, to ensure that vocal inputs to the vehicular audio system are clearly distinguished from cabin ambient noise such as from wind noise, HVAC, and the like. Digital sound processing techniques, as known in the acoustics arts and such as are disclosed in U.S. Pat. No. 4,959,865, entitled A METHOD FOR INDICATING THE PRESENCE OF SPEECH IN AN AUDIO SIGNAL, issued Sep. 25, 1990, to Stettiner et al., are particularly useful to enhance clarity of vocal signal detection when a single microphone is used, located in the interior mirror assembly such as in the mirror casing that houses the interior mirror reflective element, as part of a vehicular wireless communication system such as General Motors' ONSTAR™ system. Use of digital signal processing and a single mirror-mounted microphone (such as is described in U.S. patent application Ser. No. 09/396,179, filed Sep. 14, 1999, now U.S. Pat. No. 6,278,377) is particularly advantageous for economical achievement of clear and error-free transmission from the vehicle, while operating along a highway, to a remote receiver, particularly in speech-recognition mode. Although advantageous with a single mirror-mounted microphone (or for a microphone mounted elsewhere in the vehicle cabin such as in the header region or in an accessory module assembly such as a windshield electronics module assembly), digital sound processing is also beneficial when multiple microphones are used, and preferably when at least two and more preferably at least four microphones are used.

As previously described, connection and communication between the video displays and/or the cameras and/or other electronic accessories can be by wired connection (including multi-element cables, wired multiplex links and fiber-optic cables) and/or by wireless connection/communication (such as by infrared communication and/or by radio frequency communication such as via BLUETOOTH, described below).

For example, the video displays may include a display of the speed limit applicable to the location where the vehicle is travelling. Conventionally, speed limits are posted as a fixed limit (for example, 45 MPH) that is read by the vehicle driver upon passing a sign. As an improvement to this, an information display (preferably an alphanumerical display and, more preferably, a reconfigurable display) can be provided within the vehicle cabin, and preferably displayed by a video display, and readable by the driver, that displays the speed limit at whatever location on the road/highway the vehicle actually is at any moment. For example, existing speed limit signs could be enhanced to include a transmitter that broadcasts a local speed limit signal, such signal being received by an in-vehicle receiver and displayed to the driver. The speed limit signal can be transmitted by a variety of wireless transmission methods, such as radio transmission, and such systems can benefit from wireless transmission protocols and standards, such as the BLUETOOTH low-cost, low-power radio based cable replacement or wireless link based on short-range radio-based technology. BLUETOOTH enables creation of a short-range (typically 30 feet or so although longer and shorter ranges are possible), wireless personal area network via small radio transmitters built into various devices. For example, transmission can be on a 2.45 gigahertz band, moving data at about 721 kilobits per second, or faster. BLUETOOTH, and similar systems, allow creation of an in-vehicle area network. Conventionally, features and accessories in the vehicle are wired together. Thus, for example, an interior electrochromic mirror and an exterior electrochromic mirror is connected by at least one wire in order to transmit control signal and the like. With BLUETOOTH and similar systems such as the IEEE 802.11a protocol which is a wireless local area network standard that preferably uses a 5 GigaHertz frequency band and with a data transfer rate of at least about 10 Mb/sec and more preferably at least about 30 Mb/sec, control commands can be broadcast between the interior mirror and the exterior mirror (and vice versa) or between a camera capturing an image in a horse box (or any other towed trailer) being towed by a vehicle and a video display located at the windshield or at the interior rearview mirror or at or adjacent to an A-pillar of that vehicle that is viewable by the vehicle driver without the need for physical wiring interconnecting the two. Likewise, for example, the two exterior mirror assemblies on the vehicle can exchange, transmit and/or receive control commands/signals (such as of memory position or the like such as is described in U.S. Pat. No. 5,798,575) via an in-vehicle short-range radio local network such as BLUETOOTH. Similarly, tire pressure sensors in the wheels can transmit via BLUETOOTH to a receiver in the interior mirror assembly, and tire pressure status (such as described in U.S. patent application Ser. No. 09/513,941, filed Feb. 28, 2000, now U.S. Pat. No. 6,294,989) can be displayed, preferably at the interior rearview mirror. In the case of the dynamic speed limit system described above, preferably, the in-vehicle receiver is located at and/or the display of local speed limit is displayed at the interior mirror assembly (for example, a speed limit display can be located in a chin or eyebrow portion of the mirror case, such as in the mirror reflector itself, or such as in a pod attached to the interior mirror assembly), or can be displayed on any video display. More preferably, the actual speed of the vehicle can be displayed simultaneously with and beside the local speed limit in-vehicle display and/or the difference or excess thereto can be displayed. Optionally, the wireless-based speed limit transmission system can actually control the speed at which a subject vehicle travels in a certain location (such as by controlling an engine governor or the like) and thereby provide a vehicle speed control function. Thus, for example, a school zone speed limit can be enforced by transmission of a speed-limiting signal into the vehicle. Likewise, different classes of vehicles can be set for different speed limits for the same stretch of highway. The system may also require driver identification and then set individual speed limits for individual drivers reflecting their skill level, age, driving record and the like. Moreover, a global positioning system (GPS) can be used to locate a specific vehicle, calculate its velocity on the highway, verify what the allowed speed limit is at that specific moment on that specific stretch of highway, transmit that specific speed limit to the vehicle for display (preferably at the interior rearview mirror that the driver constantly looks at as part of the driving task) and optionally alert the driver or retard the driver's ability to exceed the speed limit as deemed appropriate. A short-range, local communication system such as envisaged in the BLUETOOTH protocol finds broad utility in vehicular applications, and particularly where information is to be displayed at the interior mirror assembly or on a video display, or where a microphone or user-interface (such as buttons to connect/interact with a remote wireless receiver) is to be located at the interior (or exterior) rearview mirror assembly. For example, a train approaching a railway crossing may transmit a wireless signal such as a radio signal (using the BLUETOOTH protocol or another protocol) and that signal may be received by and/or displayed at the interior rearview mirror assembly (or the exterior side view mirror assembly) or a video display. Also, the interior rearview mirror and/or the exterior side view mirrors and/or any video display can function as transceivers/display locations/interface locations for intelligent vehicle highway systems, using protocols such as the BLUETOOTH protocol. Protocols such as BLUETOOTH and the IEEE 802.11a wireless local area network standard that preferably uses a 5 GigaHertz frequency band and with a data transfer rate of at least about 10 Mb/sec and more preferably at least about 30 Mb/sec, as known in the telecommunications art, can facilitate voice/data, voice over data, digital and analog communication and vehicle/external wireless connectivity, preferably using the interior and/or exterior mirror assemblies as transceiver/display/user-interaction sites. Electronic accessories to achieve the above can be accommodated in any of the video displays/video mirrors/camera assemblies, and/or in the interior mirror assembly (such as in the housing disclosed in U.S. patent application Ser. No. 09/433,467, filed Nov. 4, 1999, now U.S. Pat. No. 6,326,613).

Furthermore, information displays may be incorporated which provide information to the driver or occupants of the vehicle, such as warnings relating to the status of the passenger airbag or a train approaching warning. Such a train approaching warning system alerts the driver of the vehicle of the eminent arrival of a train at a railroad crossing. Such a warning system can activate audible and/or visual alarms in the vehicle if a train is approaching. Such train warning displays may override any existing displays so that the driver is fully alert to any potential hazard. One suitable train control system is described in U.S. patent application Ser. No. 09/561,023, filed Apr. 28, 2000, now U.S. Pat. No. 6,553,308. Vehicle to road-side communication antennas can be attached to railroad signs, crossing barriers, and the like and can transmit to antennas mounted in the vehicle located such as within the interior rearview mirror of the vehicle or within an interior cabin trim item or side exterior rearview mirror assembly. One such track side communication system is available from Dynamic Vehicle Safety Systems of Amarillo, Tex., which detects signals from trains approaching a crossing and transmits these signals along the road to forewarn of a railroad crossing ahead.

In application Ser. No. 09/244,726, filed Feb. 5, 1999, now U.S. Pat. No. 6,172,613, information displays are provided which include information relating to vehicle or engine status, warning information, and the like such as information relating to oil pressure, fuel remaining, time, temperature, compass headings for vehicle direction, and the like. The passenger side air bag on/off signal may be derived from various types of seat occupancy detectors such as by video surveillance of the passenger seat as disclosed in PCT Application No. PCT/US94/01954, filed Feb. 25, 1994, published Sep. 1, 2004 as PCT Publication No. WO/1994/019212, or by ultrasonic or sonar detection, infrared sensing, pyrodetection, weight detection, or the like. Alternately, enablement/displayment of the passenger side air bag operation can be controlled manually such as through a user operated switch operated with the ignition key of the vehicle in which the assembly is mounted as described in U.S. patent application Ser. No. 08/799,734, filed Feb. 12, 1997, now U.S. Pat. No. 5,786,772.

In addition, the interior rearview mirror assembly may include a blind spot detection system, such as the type disclosed in U.S. patent application Ser. No. 08/799,734, filed Feb. 12, 1997, now U.S. Pat. No. 5,786,772, or rain sensor systems, for example rain sensor systems which include windshield contacting rain sensors, such as described in U.S. Pat. No. 4,973,844 or non-windshield contacting rain sensors, such as described in PCT International Application PCT/US94/05093, published as WO 94/27262 on Nov. 24, 1994.

The interior rearview mirror assembly may also incorporate one or more user actuatable buttons or the like for activating the various accessories housed in the assembly, for example an ONSTAR system, HOMELINK® system, a remote transaction system, or the like. For example, one or more user actuatable buttons may be mounted at the chin area or eyebrow area for actuating, for example a video screen, or for selecting or scrolling between displays or for activating, for example, a light, including a map light which may be incorporated into the mirror casing. Furthermore, a dimming switch may be incorporated into the casing to provide adjustment to the brightness of the video screen.

Also, a single high-intensity power LED may comprise a single LED light source in a compact package or as an individual chip or circuit element (and with a diagonal size less than about 14 mm diagonal cross-sectional dimension when viewed from the light emitting side; more preferably less than about 8 mm; and most preferably, less than about 5 mm) that illuminates to emit a light beam when (powered at about 25 degrees Celsius or thereabouts) at least about 100 milliamps passes (i.e., conducts) through the LED element (more preferably when at least about 225 milliamps passes through the LED element and most preferably when at least 300 milliamps passes through the LED element), and with a luminous efficiency of at least about 1 lumen/watt, more preferably at least about 3 lumens/watt, and most preferably at least about 7 lumens/watt. Such high-intensity power LEDs, when normally operating, emit a luminous flux of at least about 1 lumen, more preferably at least about 5 lumens and most preferably at least about 10 lumens. For certain applications such as ground illumination from lighted exterior mirror assemblies and interior mirror map lights, such high-intensity LEDs preferably conduct at least about 250 milliamps forward current when operated at a voltage in the about 2 volts to about 5 volts range, and emit a luminous flux of at least about 10 lumens, more preferably at least about 15 lumens, even more preferably at least about 20 lumens, and most preferably at least about 25 lumens, preferably emitting white light.

Single high-intensity power LEDs suitable to use include high-intensity, high-current capability light emitting diodes such as the high-flux LEDs available from LumiLeds Lighting, U.S., LLC of San Jose, Calif. under the Sun Power Series High-Flux LED tradename. Such high-intensity power LEDs comprise a power package allowing high-current operation of at least about 100 milliamps forward current, more preferably at least about 250 milliamps forward current, and most preferably at least about 350 milliamps forward current, through a single LED. Such high-current/high-intensity power LEDs (as high as 500 mA or more current possible, and especially with use of heat sinks) are capable of delivering a luminous efficiency of at least about 1 lumen per watt, more preferably at least about 3 lumens per watt, and most preferably at least about 5 lumens per watt. Such high-intensity LEDs are available in blue, green, blue-green, red, amber, yellow and white light emitting forms, as well as other colors. Such high-intensity LEDs can provide a wide-angle radiation pattern, such as an about 30 degree to an about 160 degree cone. Typically, such high-intensity LEDs are fabricated using Indium Gallium Nitride technology. To assist heat dissipation and maintain the LED junction below about 130° Celsius (and more preferably below about 100° Celsius and most preferably below about 70° Celsius), a heat sink can be used. Preferably, such a heat sink comprises a metal heat dissipater (such as an aluminum metal heat sink) with a surface area dissipating heat of at least about 1 square inch, more preferably of at least about 2.5 square inches, and most preferably of at least about 3.5 square inches. When used as, for example, a map light assembly mounted in an interior rearview mirror assembly (such as in the mirror housing or in a pod attaching to the mirror mount to the vehicle), a single high-intensity power LED (for example, a single white light emitting LED passing about 350 mA and emitting light, and preferably white light or any other color, with a luminous efficiency of at least about 3 lumens per watt, and with a light pattern of about 120° or so) can be combined with a reflector element and a lens to form a high-intensity power LED interior light module capable of directing an intense light beam of light from an interior mirror assembly mounted to a windshield or header region of the vehicle to the lap area of a driver or a front-seat passenger in order to allow a reading function such as a map reading function and/or to provide courtesy or theatre lighting within the vehicle cabin. Also, a single high-intensity power LED (for example, a single white light emitting LED or a red light emitting or any other colored light emitting diode passing about 350 mA and emitting light, preferably white light or any other color, with a luminous efficiency of at least about 3 lumens per watt, and with a light pattern of about 120° or so) can be combined with a reflector element and a lens to form a high-intensity LED security light module capable of directing an intense light beam of light (or any other color) from an exterior mirror assembly to illuminate the ground adjacent an entry door of the vehicle in order to provide a security lighting function. Also, a single high-intensity power LED (for example, a single white light emitting LED or a red light emitting or any other colored light emitting diode passing about 350 mA and emitting white light with a luminous efficiency of at least about 3 lumens per watt, and with a light pattern of about 120° or so) can be combined with a reflector element and a lens (and optionally with high-intensity and/or conventional near-IR light emitting diodes), and be used in conjunction with a reversing or forward parking camera mounted on the exterior of a vehicle (such as at a license plate holder) in order to provide illumination for the, for example, reverse-aid camera when reversing at night.

For applications such as ground illumination from exterior mirror assemblies and map/reading lighting from interior mirror assemblies or from windshield-mounted accessory modules such as windshield electronic modules or for ground illumination/camera-field-of-view illumination in association with video-based reverse-aids systems or park-aid systems or tow hitch-aid systems, it is preferable to use a single high-intensity power LED source having a luminous efficiency of at least about 7 lumens/watt; more preferably at least about 15 lumens/watt; and most preferably at least about 20 lumens/watt, with such single high efficiency power LED light source preferably being provided in a module that includes a heat sink/heat dissipater and most preferably, that further includes a power regulator such as a series power resistor and most preferably, a DC to DC voltage converter. Such high efficiency power LEDs are available from LumiLeds Lighting, U.S., LLC of San Jose, Calif. under the Sun Power Series High-Flux LED tradename, for example.

Also, a video display element or screen can be used (such as an LCD display or an emitting display element such as a multi-pixel electroluminescent display or field emission display or light emitting diode display (organic or inorganic)) disposed within the mirror housing of the interior mirror assembly of the vehicle, and located behind the mirror reflective element in the mirror housing, and configured so that the image displayed by the video display element is visible to the driver by viewing through the mirror reflective element. Preferably, and such as is disclosed in U.S. utility patent application Ser. No. 09/793,002, filed Feb. 26, 2001, now U.S. Pat. No. 6,690,268, the mirror reflective element (behind which the video display screen is disposed so that the image displayed is visible by viewing through the mirror reflective element) of the interior mirror assembly preferably comprises a transflective mirror reflector such that the mirror reflective element is significantly transmitting to visible light incident from its rear (i.e. the portion furthest from the driver in the vehicle), with at least about 15% transmission preferred, at least about 20% transmission more preferred and at least about 25% transmission most preferred, while simultaneously, the mirror reflective element is substantially reflective to visible light incident from its front (i.e. the position closest to the driver when the interior mirror assembly is mounted in the vehicle), with at least about 60% reflectance preferred, at least about 70% reflectance more preferred and at least about 75% reflectance most preferred. Preferably a transflective electrochromic reflective mirror element is used (such as is disclosed in U.S. utility patent application Ser. No. 09/793,002, filed Feb. 26, 2001, now U.S. Pat. No. 6,690,268, and in U.S. Pat. Nos. 5,668,663; 5,724,187) that comprises an electrochromic medium sandwiched between two substrates. The front (i.e. closest to the driver when the interior mirror assembly is mounted in the vehicle) substrate preferably comprises a glass substrate having a transparent electronic conductive coating (such as indium tin oxide or doped tin oxide) on its inner surface (and contacting the electrochromic medium). More preferably, the front substrate of the twin-substrate electrochromic cell that sandwiches the electrochromic medium comprises a glass substrate having a thickness of about 1.6 millimeters or less; most preferably, about 1.1 millimeters or less. The rear (i.e. furthest from the driver when the interior mirror assembly is mounted in the vehicle) substrate preferably comprises a glass substrate having a transflective mirror reflector on the surface thereof that the electrochromic medium contacts (such a configuration being referred to as a “third-surface” reflector in the electrochromic mirror art). For example, the mirror reflector can comprise a transparent semiconductor/metal conductor/transparent semiconductor multilayer stack such an indium tin oxide/silver/indium tin oxide stack (for example, a third-surface electrochromic mirror reflective element can be used comprising a front substrate comprising an about 1.1 mm thick glass substrate having a half-wave ITO coating of about 12 ohms/square sheet resistance on its inner surface; a rear substrate comprising an about 1.6 mm thick glass substrate having a transflective mirror reflector thereon comprising an about 350 angstrom thick silver metal layer sandwiched between an about 800 angstrom thick indium thin oxide transparent semiconductor layer and another about 800 angstrom thick indium thin oxide transparent semiconductor layer; and with an electrochromic solid polymer matrix medium such as is disclosed in U.S. Pat. No. 6,245,262 disposed between the transflective mirror reflector of the rear substrate and the half-wave indium tin oxide layer of the front substrate. Visible light reflectivity of the transflective electrochromic mirror element is about 60-65%; transmission is about 20-25%. With a TFT LCD video display disposed behind the rear substrate of such a third-surface transflective electrochromic mirror reflective element in a "display-on-demand" configuration, the presence of (and image displayed by) the video display screen is only principally visible to the driver (who views through the transflective mirror reflective element) when the video display element is powered so as to project light from the rear of the mirror reflective element).

Also, and as disclosed in U.S. utility patent application Ser. No. 09/793,002, filed Feb. 26, 2001, now U.S. Pat. No. 6,690,268, incorporated above, an image on the screen includes a video view rearward of the vehicle, and also preferably includes electronically generated indicia overlaying the video image on the video screen and indicating the distance of detected objects (such as via a graphic display or via an alphanumeric display in feet/inches) and/or highlighting of obstacles/objects that a reversing vehicle is in jeopardy of colliding with (such as a child or a barrier). For example, red highlighting can be used, or a screen portion can strobe/flash to draw the driver's attention to an object in the screen. Also, the control can provide an audible output signal to a speaker that audibly alerts the driver that the vehicle is reversing closer and closer to a rear-situated object. The combination of a video reverse-aid system with an audible reverse-aid system based off an object detection system such as an ultrasonic obstacle detection system is a significant advance over reversing systems known to date, and particularly with distance or similar graphics overlaying the video image of the rearward scene.

Also, any of the video screens of the above embodiments, and such as disclosed in U.S. utility patent application Ser. No. 09/793,002, filed Feb. 26, 2001, now U.S. Pat. No. 6,690,268, can display the image output by a forward facing image capture device (preferably positioned to capture a video image of the ground surface/objects/persons immediately in front of the vehicle, most preferably encompassing an area that encompasses substantially the entire front fender width of the vehicle) and/or can display the image output by a rearward facing image capture device positioned to capture a video image of the ground surface/objects/persons immediately to the rear of the vehicle, most preferably encompassing an area that encompasses substantially the entire rear fender width of the vehicle. Preferably, a graphic overlay with indicia of forward or backup travel, such as disclosed in U.S. patent application Ser. No. 09/313,139 filed May 19, 1999, now U.S. Pat. No. 6,222,447, in U.S. patent application Ser. No. 09/776,625, filed Feb. 5, 2001, now U.S. Pat. No. 6,611,202, and in U.S. Pat. No. 5,949,331. For example, the intended path of travel and/or a distance grid can be electronically superimposed upon the video image from a reverse-aid camera as displayed on any screen of the above video mirrors, video display assemblies and accessory modules.

As disclosed in U.S. patent application Ser. No. 09/793,002, filed Feb. 26, 2001, now U.S. Pat. No. 6,690,268 (incorporated by reference above), a towing vehicle is equipped with a reversing-aid camera (that is mounted, for example, at the rear license plate region of vehicle). The reversing-aid camera has its field of view directed to include the tow bar/hitch connection, as well as the leading portion of the towed container. The driver is provided with a control that allows him/her toggle between the reversing-aid camera and a tow container reverse-aid camera. When the driver selects the reversing-aid camera, a view of the tow-bar/tow container (that may be a boat or a U-Haul trailer or an animal container or a trailer tent or any other trailer type) is displayed on a video display screen (that can be any of the video display screens of the present invention). When the driver selects the tow container reverse-aid camera, a view to the rear of the tow container (that may be a boat or a U-Haul trailer or an animal container or a trailer tent or any other trailer type) is displayed on the video display screen (that can be any of the video display screens of the present invention).

Also, a variety of lenses (both refractive and diffractive) can be used to define the field of view of the cameras of the present invention. For reverse-aid type cameras, a wide angle lens is useful so that a view of the entire road immediately to the rear of the vehicle, and of width of the vehicle, is captured. To reduce any image distortion, optical image distortion reduction means and/or software-based image distortion reducing means, as known in the art, can be used. Optionally, two cameras can be used to assist reversing; one equipped with a wide-angle lens and mounted such as at the rear license plate of the vehicle in order to view a near field of zero to 5 feet or so immediately exteriorly, and a second camera, aimed more far field to capture an image of traffic and obstacles further down the path the vehicle is reversing in, can be used. Selection of one or the other of the first and second camera can be at the driver's discretion, or alternately, engagement of the reverse gear handle by the driver initially selects the first, near-field view so that the driver can check it is safe to initiate a reverse move, and then once the reverse gear is fully engaged and the vehicle is actually moving in reverse, the second, far-field view is selected.

The video screen can be used with at least one of a rear back-up camera, a baby-minder camera, and a sidelane-viewing camera. An image capturing device is in communication with the video screen, which displays images captured by the image capturing device and, further, displays indicia overlaying the video image. For example, the indicia may comprise a graphic display or an alphanumeric display.

The video screen may display an information display selected from the group consisting of a rain sensor operation display, a telephone information display, a highway status information display, a blind spot indicator display, a hazard warning display, a vehicle status display, a page message display, a speedometer display, a tachometer display, an audio system display, a fuel gage display, a heater control display, an air conditioning system display, a status of inflation of tires display, an email message display, a compass display, an engine coolant temperature display, an oil pressure display, a cellular phone operation display, a global positioning display, a weather information display, a temperature display, a traffic information display, a telephone number display, a fuel status display, a battery condition display, a time display, a train approach warning display, and a toll booth transaction display.

The video screen may comprise one of a vacuum fluorescent display element, a light emitting diode display, an electroluminescent display element, a multi-pixel display element, a reconfigurable display element, and a scrolling display element.

In another aspect, a video mirror system includes a variable intensity control which is in communication with the video screen, which varies the display intensity of the video screen, for example, in response to ambient lighting conditions.

Note that since a rear-facing camera will have a portion exposed to the outdoor elements such as rain, ice, snow, road splash, dirt etc, it is desirable that a cleaning means be included to maintain any lens/lens cover clean/contaminant-free. For example, use of vectored airflow can be used to blow away any accumulated rain drops etc on the lens/lens cover. Thus, the camera assembly, and its installation into the rear of the vehicle, can be constructed so as to include air channeling elements such as baffles to channel airflow over the rear-facing lens portion, and so remove water drops therefrom. A lens heater (such as a glass plate coated with a transparent resistive coating such as indium tin oxide or doped tin oxide) can be included to defog/de-ice the camera lens. Alternately, or in addition, a mechanical wiper can be provided. Also, a lens cover can be provided that mechanically removes only when the rear-facing camera is accessed to view rearward, so as to minimize the time that the lens is exposed to the outdoor elements. Thus, for example, a metal or plastic shield or shutter can be disposed over the camera lens when the camera is not in use (such as when the vehicle is parked or when the vehicle is driving forward). However, when the engine is operating, and reverse gear of the vehicle transmission system is engaged by the driver, the cover over (and protecting) the camera lens is mechanically opened/removed (such as by rotating out of the way) to expose the lens of the camera and to allow the camera view rearwardly. Once reverse gear is disengaged, the mechanical shutter closes over the camera lens, protecting it once again from the outdoor elements. An output of the camera is provided as an input to a control. The system also includes an object-monitoring sensor (preferably, an ultrasonic sensor such as is known in the art, or a radar sensor or an infrared sensor, or the like, such as is known in the art). The object monitoring sensor generates an output indicative of detection of an object rearward of the vehicle, and preferably includes a measure of the distance of that detected object from the rear of the vehicle. The output is also provided to the control. The control generates a video output signal which is provided as an input to the video screen, which preferably is mounted at, on, or within the interior rearview mirror assembly in the vehicle. The image on the screen generated thereby includes a video view rearward of the vehicle, and also preferably includes electronically generated indicia overlaying the video image on the video screen and indicating the distance of detected objects (such as via a graphic display or via an alphanumeric display in feet/inches) and/or highlighting of obstacles/objects that a reversing vehicle is in jeopardy of colliding with (such as a child or a barrier). For example, red highlighting can be used, or a screen portion can strobe/flash to draw the driver's attention to an object in the screen. Also, the control can provide an audible output signal to a speaker that audibly alerts the driver that the vehicle is reversing closer and closer to a rear-situated object. The combination of a video reverse-aid system with an audible reverse-aid system based off an object detection system such as an ultrasonic obstacle detection system is a significant advance over reversing systems known to date, and particularly with distance or similar graphics overlaying the video image of the rearward scene.

Preferably, the video screens used in this present invention are pixelated liquid crystal displays, or most preferably, are pixelated emitting displays such as field emission displays or plasma displays or electroluminescent displays such as organic electroluminescent displays. Alternately, a cathode ray tube video screen can be used. Also note, as described above, the display on the video screen can be a reconfigurable display capable of displaying a plurality of vehicle functions. Also, the field of view of any camera inside or outside the vehicle can be fixed, or it can be variable such as by manipulating a joystick or the like. For example, a manual control to move the field of view of the camera and/or its focus and/or its zoom can be included in the joystick or similar controls conventionally provided to adjust outside sideview mirror reflectors.

Also, dynamic color selection can be used in operating the video display. Also, optionally, a Kopin display, as known in the art, can be used. Optionally, the electronics to generate an image can be located at, on or in the interior mirror assembly, and an image can be projected from the interior mirror assembly toward the vehicle windshield for viewing by the driver of the vehicle by looking at or through the vehicle windshield.

Note that communication between any camera and the display screen can be by wire (such as a direct wire connection or via an optical fiber link) or via a bus system (such as a CAN or LIN system, as known in the arts) or wirelessly such as by IR or RF communication (such as using a local area RF broadcast network such as the BLUETOOTH protocol from Motorola).

Also, to minimize cost in the system, the video screen can connect to a control that provides a direct row/column drive to the pixelated array of the video screen; and with the control itself receiving a direct row/column feed from the pixelated array of the camera (such as a CMOS camera) used to capture the image desired displayed on the video screen. Row and column drivers for the video screen can be included in the video screen package itself, such as via flexible circuitry attached to the back of the video screen element (typically a glass element) itself.

Also, because ambient light washout can be a problem for a mirror-mounted video display (or any other video display of the present invention), a contrast enhancement filter can be disposed over the video screen (or incorporated into its construction) to increase the contrast ratio between the video image and ambient light. Optionally, anti-reflective coatings/films/layers can be used to reduce surface reflections off the video screen. Suitable anti-reflective coatings/films/layers are known in the art and can include diffuser surface layers and interference layers. Optionally, an electrically variable contrast enhancement filter can be used overlying the video screen, such as an electro-optic (preferably electrochromic) contrast enhancement filter.

Also, optionally, a video screen displaying an image of the rearward scene of the vehicle, and preferably displaying a panoramic image such as described in U.S. Pat. Nos. 5,670,935 and 5,550,677 and U.S. patent application Ser. No. 09/199,907, filed Nov. 25, 1998, now U.S. Pat. No. 6,717,610, and Ser. No. 09/361,814, filed Jul. 27, 1999, now U.S. Pat. No. 6,201,642, can be used instead of a conventional mirror reflector.

Also, and especially for video mirror assemblies where the video screen is incorporated as part of an interior electro-optic (such as electrochromic) mirror assembly, a common circuit board and/or common electronic components and sub-circuitry can be utilized to control the electro-optic activity of the reflective element and to control the image displayed by the video screen, thus achieving economy of design and function and for operating other electrical or electronic functions supported in the interior rearview assembly. For example, a circuit board of the interior mirror assembly may support, for example, light emitting diodes (LEDs) for illuminating indicia on display elements provided on a chin or eyebrow portion of the bezel region of the interior mirror casing. Reference is made to U.S. Pat. Nos. 5,671,996 and 5,820,245. It should be understood that one or more of these buttons or displays may be located elsewhere on the mirror assembly or separately in a module, for example of the type disclosed in pending U.S. patent application Ser. No. 09/244,726, entitled "REARVIEW MIRROR ASSEMBLY INCORPORATING VEHICLE INFORMATION DISPLAY", filed by DeLine et al., and may comprise the touch-sensitive displays as disclosed in U.S. provisional application entitled "INTERACTIVE AUTOMOTIVE REARVIEW SYSTEM", Ser. No. 60/192,721, filed Mar. 27, 2000.

Also, the video display in any of the video mirror applications of the present invention can function as the display screen for a portable computer device, a portable cellular phone, and/or a portable personal digital assistant device (PDA) such as a Palm Pilot™ or other personal digital assistant. When serving as the display screen of a PDA, the PDA/in-vehicle display screen can optionally operate in combination with a cellular phone or as a stand-alone device. Also, any of the video screens of the present invention can serve multiple purposes such as a video screen for an on-board vehicular camera and/or as the video monitor screen for a portable computing/PDA/cellular phone/telecommunication device. The video display system of the present invention can itself function as an in-vehicle PDA and/or cellular phone, in addition to other functions as described above. Portable devices such as PDAs, cellular phones, and palm/notebook/laptop portable computers can connect to/communicate with the video mirror systems of the present invention by direct wired connection/docking or by wireless communication such as described in U.S. patent application Ser. No. 09/561,023, filed Apr. 28, 2000, entitled "VEHICLE-BASED NAVIGATION SYSTEM WITH SMART MAP FILTERING, PORTABLE UNIT HOME-BASE REGISTRATION AND MULTIPLE NAVIGATION SYSTEM PREFERENTIAL USE", to Uhlmann et al.; U.S. provisional application Ser. No. 60/131,593, filed Apr. 29, 1999, and U.S. provisional application Ser. No. 60/199,676, filed Apr. 21, 2000. Preferably, the video mirror systems of the present invention are equipped with a mobile device communication port (such as an IrDA-port) that transmits/receives data via wireless infrared communication. For example, any of the video display housings and/or any of the video attachment members/mounts and/or any of the interior mirror assemblies can be equipped with a mobile device communication port (such as an IrDA-port) that transmits/receives data via wireless infrared communication. Also, any of the video display assemblies, including any of the video screens or video display housings can be adapted to receive data input by touch such as by a human finger or a stylus such as via a touch screen, and such as is disclosed in U.S. provisional application Ser. No. 60/192,721, filed Mar. 27, 2000, entitled "INTERACTIVE AUTOMOTIVE REARVISION SYSTEM", to Lynam et al.

As disclosed in U.S. utility patent application Ser. No. 09/793,002, filed Feb. 26, 2001 (now U.S. Pat. No. 6,690,268), incorporated above, a forward facing camera can be mounted such as at the front grille or front fender/bumper or front bonnet/hood area of the vehicle, and with its field of view directed to capture an image of the road surface immediately in front of the vehicle. With such as forward parking-aid camera device (that can utilize wide-angle optics and other techniques as previously described and referenced with regards to reverse back-up aid cameras), the driver of a vehicle, such as a large SUV such as the MY2000 Ford Excursion vehicle from Ford Motor Company, can see how close the front fender/bumper is from another vehicle or a barrier or the like when the driver is parking the vehicle. Optionally, a driver actuatable switch can be provided to allow the driver select display of the view from the forward-facing park-aid camera device. Alternately, and preferably, the image from the forward-facing park-aid camera device is displayed on the in-vehicle video screen (such as any of the screens disclosed herein) whenever the vehicle is moving in a forward direction at a velocity less than a predetermined slow velocity (for example, when moving forward at less than about 7 miles/hour or less than about 5 miles per hour or less than about 3 miles per hour), such slow forward speed of travel being potentially indicative of a parking event occurring. Optionally, the forward facing park-aid view can be displayed whenever the vehicle is stationary with its engine operating as a safety measure to prevent inadvertent collision with obstacles or persons upon moving forward.

As disclosed in U.S. utility patent application Ser. No. 09/793,002, filed Feb. 26, 2001 (now U.S. Pat. No. 6,690,268) incorporated above, interconnection to and communication with the components of the video mirror systems of the present invention can be via a variety of means and protocols including J2284, J1850, UART, optical fiber, hard wired, wireless RF, wireless IR and wireless microwave. Also, the image displayed on the display screen can adapt/change depending on the driving task condition. For example, if reverse gear is selected, and as previously described, the display can automatically change to display the image immediately behind the vehicle. If this is the current view at the time the reverse gear is initially engaged, no change is necessary. Also, reverse gear selection can turn on any additional illumination sources (IR, visible etc). For vehicle equipped with blind spot cameras as well as a reversing camera, a split screen display can be used to show the area immediately behind the vehicle and to the vehicle sides. When reverse gear is disengaged, the additional illumination can automatically turn off, and the video screen can revert to its pre-reversing display image. When reversing, additional warning inputs can be displayed or audibly communicated to the driver such as a warning of objects detected, peripheral motion, the direction in which an object detected lies, and the distance to an object (determined by radar, ultrasonic, infrared, and/or vision analysis). Such objects/data detected can be displayed as icons and/or an alphanumerical display on a video image of the rearward scene and/or on a graphic representation of the rearward view.

As disclosed U.S. Pat. No. 5,670,935, incorporated above, a rearview vision system for a vehicle includes at least one image capture device directed rearwardly with respect to the direction of travel of the vehicle. A display system displays an image synthesized from output of the image captive device. The display system is preferably contiguous with the forward field of view of the vehicle driver at a focal length that is forward of the vehicle passenger compartment. A plurality of image capture devices may be provided and the display system displays a unitary image synthesized from outputs of the image captive devices which approximates a rearward-facing view from a single location, such as forward of the vehicle.

For enhancing the interpretation of visual information in the rearview vision system by presenting information in a manner which does not require significant concentration of the driver or present distractions to the drive, the rearview vision system has at least two image capture devices positioned on the vehicle and directed rearwardly with respect to the direction of travel of the vehicle. A display is provided for images captured by the image capture devices. The display combines the captured images into an image that would be achieved by a single rearward-looking camera having a view unobstructed by the vehicle. In order to obtain all of the necessary information of activity, not only behind but also alongside of the vehicle, the virtual camera should be positioned forward of the driver. The image synthesized from the multiple image capture devices may have a dead space which corresponds with the area occupied by the vehicle. This dead space is useable by the driver's sense of perspective in judging the location of vehicles behind and alongside of the equipped vehicle.

Techniques are provided for synthesizing images captured by individual, spatially separated, image capture devices into such ideal image, displayed on the display device. This may be accomplished by providing at least three image capture devices. At least two of the image capture devices are side image capture devices mounted on opposite sides of the vehicle. At least one of the image capture devices is a center image capture device mounted laterally between the side image capture devices. A display system displays an image synthesized from outputs of the image capture devices. The displayed image includes an image portion from each of the image capture devices.

Preferably, perspective lines are included at lateral edges of the dead space which are aligned with the direction of travel of the vehicle and, therefore, appear in parallel with lane markings. This provides visual clues to the driver's sense of perspective in order to assist in judging distances of objects around the vehicle.

Image enhancement means are provided for enhancing the displayed image. Such means may be in the form of graphic overlays superimposed on the displayed image. Such graphic overlap may include indicia of the anticipated path of travel of the vehicle which is useful in assisting the driver in guiding the vehicle in reverse directions. Such graphic overlay may include a distance grid indicating distances behind the vehicle of objects juxtaposed with the grid.

The vehicle, which may be an automobile, a light truck, a sport utility vehicle, a van, a bus, a large truck, or the like, includes a rearview vision system for providing a driver of the vehicle with a view rearwardly of the vehicle with respect to the direction of travel of the vehicle. The vision system includes at least two side image capture devices positioned, respectively, on opposite sides of vehicle and a center image capture device positioned on the lateral centerline of the vehicle. All of the image capture devices are directed generally rearwardly of the vehicle. The rearview vision system additionally includes an image processor for receiving data signals from image capture devices and synthesizing, from the data signals, a composite image which is displayed on a display.

Images captured by image capture devices are juxtaposed on the display by the image processor in a manner which approximates the view from a single virtual image capture device positioned forwardly of the vehicle at a location and facing rearwardly of the vehicle, with the vehicle being transparent to the view of the virtual image capture device. The vision system provides a substantially seamless panoramic view rearwardly of the vehicle without duplicate or redundant images of objects. Furthermore, elongated, laterally-extending, objects, such as the earth's horizon, appear uniform and straight across the entire displayed image. The displayed image provides a sense of perspective, which enhances the ability of the driver to judge location and speed of adjacent trailing vehicles.

Each of the side image capture devices has a field of view and is aimed rearwardly with respect to the vehicle about an axis which is at an angle, with respect to the vehicle, that is half of the horizontal field of view of the image capture device. In this manner, each of the image capture devices covers an area bounded by the side of the vehicle and extending outwardly at an angle defined by the horizontal field of view of the respective side image capture device. The center image capture device has a horizontal field of view, which is symmetrical about the longitudinal axis of the vehicle. The field of view of each side image capture device intersect the field of view of the center image capture device at a point which is located a distance behind the vehicle.

Rear blind zones are located symmetrically behind the vehicle extending from the rear of the vehicle to a point. Side blind zones located laterally on respective sides of the vehicle extend rearwardly of the forward field of view of the driver to the field of view of the respective side image capture device.

A left overlap zone and a right overlap zone extend rearward from respective points where the horizontal fields of view of the side image capture devices intersect the field of view of the center image capture device. Overlap zones define areas within which an object will be captured both by the center image capture device and one of the side image capture devices. An object in an overlap zone will appear on the display in multiple image portions in a redundant or duplicative fashion. In order to avoid the presentation of redundant information to the driver, and thereby avoid confusion and simplify the task of extracting information from the multiple images or combined images on the display, the object should avoid overlapping zones.

When operating the vehicle in the reverse direction, it may be desirable to provide additional data concerning the area surrounding the immediate rear of the vehicle. This may be accomplished by utilizing non-symmetrical optics for the center image capture device in order to provide a wide angle view at a lower portion of the field of view. Alternatively, a wide angle optical system could be utilized with the electronic system selectively correcting distortion of the captured image. Such a system would provide a distortion-free image while obtaining more data, particularly in the area surrounding the back of the vehicle.

Use of more than three image capture devices is comprehended. In addition to side image capture devices positioned at the front sides of the vehicle and a center image capture device positioned at the center rear of the vehicle, additional image capture devices may be useful at the rear corners of the vehicle in order to further eliminate blind spots. It may additionally be desirable to provide an additional center image capture device at a higher elevation in order to obtain data immediately behind the vehicle and thereby fill in the road surface detail immediately behind the vehicle. Such additional detail is particularly useful when operating the vehicle in the reverse direction. Of course, each of the image capture devices could be a combination of two or more image capture devices.

An image display device displays a composite image made up of a left image portion, a right image portion, and a center image portion. The display may additionally include indicia such as the readout of a compass, vehicle speed, turn signals, and the like as well as other graphical or video displays, such as a navigation display, a map display, and a forward-facing vision system. In this manner, the rearview vision system may be a compass vision system or an information vision system.

The display is of a size to be as natural as possible to the driver. This is a function of the size of the display and the distance between the display and the driver and is preferably positioned within the driver's physiological field of view without obstructing the view through the windshield. It is known that the driver's field of view, with the head and eyes fixed forward, extends further in a downward direction than in an upward direction. The display could be located above the vertical view through the windshield wherein the display may be observed at the upward portion of the driver's field of view. However, the position for the display is preferred wherein the display is within the lower portion of the driver's field of view.

The display is a flat panel display, such as a back-lit liquid crystal display, a plasma display, a field emission display, or a cathode ray tube. However, the synthesized image could be displayed using other display techniques such as to provide a projected or virtual image. One such virtual display is a heads-up display. The display may be mounted/attached to the dashboard, facia or header, or to the windshield at a position conventionally occupied by an interior rearview mirror.

Although various camera devices may be utilized for image capture devices, an electro-optic, pixelated imaging array, located in the focal plane of an optical system, is preferred. Such imaging array allows the number of pixels to be selected to meet the requirements of rearview vision system. A commercially available display may be used, however, by leaving a horizontal band of the display for displaying alpha-numeric data, such as portions of an instrument cluster, compass display, or the like.

The image capture devices are CMOS imaging arrays of the type manufactured by VLSI Vision Ltd. of Edinburgh, Scotland, which are described in more detail U.S. patent application Ser. No. 08/023,918 filed Feb. 26, 1993, by Kenneth Schofield and Mark Larson for an AUTOMATIC REARVIEW MIRROR SYSTEM USING A PHOTOSENSOR ARRAY, now U.S. Pat. No. 5,550,677. However, other pixelated focal plane image-array devices, which are sensitive to visible or invisible electromagnetic radiation, could be used. The devices could be sensitive to either color or monochromatic visible radiation or near or far infrared radiation of the type used in night-vision systems. Each image capture device could be a combination of different types of devices, such as one sensitive to visible radiation combined with one sensitive to infrared radiation. Examples of other devices known in the art include charge couple devices and the like.

The relationship is enhanced between the driver's primary view and the image presented on the rearview vision system. This is accomplished in a manner which provides ease of interpretation while avoiding confusion so that the driver does not have to concentrate or look closely at the image. In this manner, information presented on the display is naturally assimilated. This is accomplished while reducing blind spots so that other vehicles or objects of interest to the driver will likely be displayed to the driver. Additionally, the use of perspective allows distances to be more accurately determined.

It is further envisioned that the control may provide a warning or alert to the driver of the vehicle when the actual geographic position of the vehicle (as provided by the global positioning system of the vehicle) is not where it should be based on the instructions received from the remote service center. For example, the control may instruct the driver to turn around or otherwise get back onto the given route, or the control may instruct the driver to contact the service center to obtain updated directions based on the new position of the vehicle. This may be done if, for example, the geographic position of the vehicle is outside of a predetermined or threshold range or distance of the next location or waypoint, or if the geographic position of the vehicle is past the location or waypoint. Optionally, the control may provide audible chirps or other audible signal or the like delivered by a speaker to alert the driver when approaching a turn or to indicate to the driver that the driver has missed a turn.

The control may also be operable to continuously monitor the actual geographic position of the vehicle and compare to the locations or waypoints associated with the instructions even after the vehicle has strayed from the given route. As discussed above, the control may provide instructions to turn around to get back on the given route. However, if the vehicle continues along a different path (such as in situations where the driver gets lost and attempts to find a way back to the given route, or where the driver may take an alternate route, such as an alternate route known to the driver or a detour or the like), but eventually arrives at one of the geographic locations or waypoints associated with the downloaded instructions, the control may be operable to recognize that the vehicle is back on the given route and resume communicating/displaying the appropriate instructions to the driver to direct the driver to the targeted destination.

During operation, as the driver is driving the vehicle, the driver may access or contact a service center via the telematics system 18 of the vehicle, such as ONSTAR®, TELEAID™, RESCU® or the like, depending on the type of vehicle, and request driving directions to a particular desired destination or targeted location. The operator or service center may provide the directions to the desired destination from the known position of the vehicle (which may be provided by the driver to the service center or may be known by the service center in response to the global positioning system of the vehicle). Preferably, the service center communicates the directions and downloads the directions to a storage location or control of the vehicle. The directions or instructions are electronically or digitally or otherwise coded or tagged or otherwise associated with or linked to a particular geographic location or waypoint either by the remote service center or by the control. The control is then operable to provide the directions in sections or parts or steps, with each separate, particular step or instruction being provided to the driver in response to the current geographic position of the vehicle (based on a signal from the global positioning system of the vehicle) generally corresponding to a particular geographic location or waypoint associated with the particular step or instruction. For example, a step may be provided in response to the vehicle completing a previous step of the directions, and/or may be provided in response to the vehicle approaching (such as the vehicle being within a threshold distance of) the street, intersection, location or the like at which the next step or turn is to be performed, without affecting the scope of the present invention.

Therefore, the present invention provides a navigation system which is operable to provide step-by-step instructions to a targeted destination to a driver of a vehicle while the driver is driving the vehicle toward the targeted destination. The instructions are downloaded from a remote database at a remote service center or the like via a telematics system or wireless communication system of the vehicle. The instructions may then be provided to the driver only as needed by the driver, since they are coded or associated with or linked to particular geographic locations or waypoints, thereby simplifying the instructions so that the driver will be able to understand each step and execute the step accordingly. The instructions may be downloaded to a storage or memory location or system of the vehicle during a brief communication or connection with the remote service center, so that the driver does not have to remain connected with the remote service center or repeatedly contact the service center to receive updated instructions as the driver drives the vehicle toward the targeted destination. The downloaded instructions are only the local instructions and thus do not require an excessive amount of time to download nor do they require an excessive amount of storage space or memory on the control. Thus, the remote service center, operator, computerized system or the like maintains the detailed maps and directories, and feeds back or downloads wirelessly to the vehicle the local information or map for communication or display to the driver of the vehicle for directional guidance information.

Optionally, the telematics system or communication link or other system may be operable to download data, such as via ONSTAR® or other communication system, or via a global positioning system or the like, to the vehicle or to a control or system or accessory of the vehicle. The data may be used to adjust an accessory or system of the vehicle or to set the accessory or system of the vehicle to a desired or appropriate setting in response to the data and/or in response to other vehicle or driver characteristics or status.

For example, data pertaining to the location of the vehicle, the time of day, the date, weather conditions and/or driving conditions may be provided to the vehicle for use in adjustment of an accessory or system of the vehicle. For example, such data may be used by a seat adjustment system, such that adjustment of the driver or passenger seat of the vehicle may be made in response to changes in such data. This may be beneficial because, for example, during long journeys, the seat adjustment or position at the start of the journey may not be comfortable or appropriate later on in the long journey. The seat adjustment system of the present invention thus may be operable to adjust the seat position or lumbar support or the like (and the mirror position or positions may also be adjusted accordingly) in response to various conditions, such as the length of the journey, altitude of the vehicle, driving conditions and/or the like. The seat adjustment system thus may make dynamic adjustments of the seat or seats to keep the driver or occupants of the vehicle comfortable or alert.

Optionally, it is envisioned that the seats of the vehicle may have a massage capability. In such applications, the seat adjustment system or seat control system may detect that the vehicle is on a long journey, and may activate the massage function to enhance the comfort to the driver of the vehicle. Such an adjustment or control may also be enabled if rural highway conditions are detected or other driving conditions where such a feature may be desired. It is further envisioned that the seat adjustment or control system may be programmable, such that a particular driver or occupant may indicate what changes he or she may desire in certain conditions. The seat adjustment system may then automatically activate such features or changes when the specified conditions are detected.

Optionally, the adjustment may also or otherwise be made in response to biometric data about the driver or occupant that is presently occupying the seat. It is known to use body measurements to order clothing tailored to the body measurements. Many catalogue clothing companies are now taking body scan measurements to order clothing on line. These measurements ensure a substantially perfect fit of the ordered clothing. Such body scan measurements or data or other such biometric data may be entered into the vehicle seat adjustment system, or may be communicated to the vehicle seat adjustment system, such as via the telematics system or other communication system or data system or the like. The seat adjustment system may then adjust the seat (and the mirrors may be adjusted as well) in response to detection of a particular person and/or their biometric characteristics or data.

Figure 3:
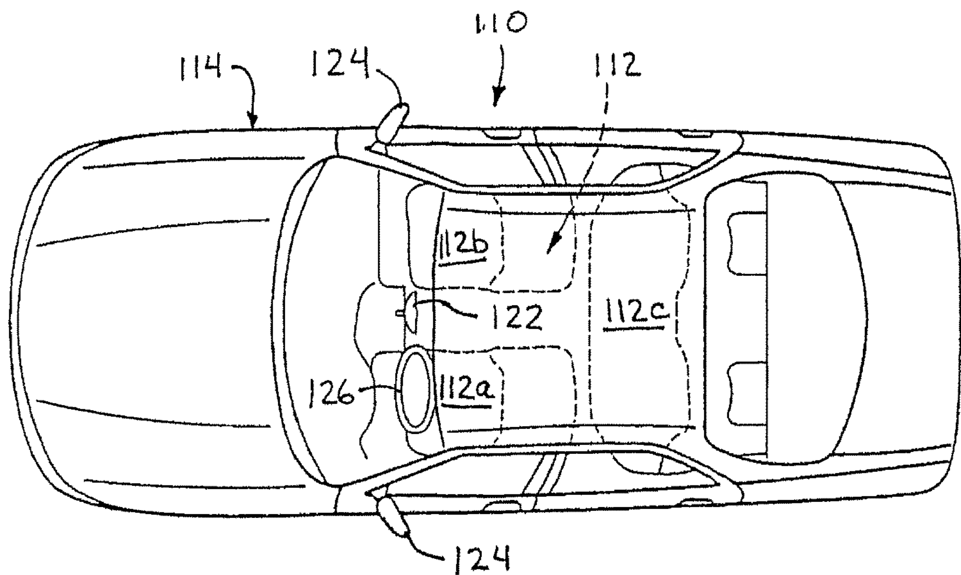
FIG. 3 is a top plan view of a vehicle incorporating a seat adjustment system in accordance with the present invention.
Figure 4:
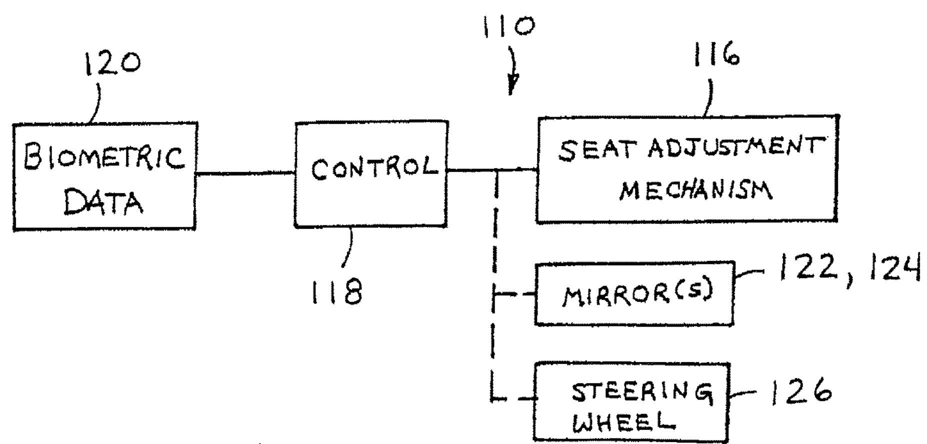
FIG. 4 is a block diagram of a seat adjustment system in accordance with the present invention.

Referring now FIGS. 3 and 4, a biometric seat adjustment system 110 is operable to adjust the seats 112 of a vehicle 114. The biometric seat adjustment system 110 may adjust a driver seat 112*a*, a front passenger seat 112*b*, and/or one or more rear passenger seats 112*c* via a powered seat adjustment mechanism 116 (FIG. 4) at the respective seats in response to biometric data or information pertaining to a person that may be sitting in or may be about to sit in one of the vehicle seats. As shown in FIG. 4, biometric seat adjustment system 110 includes a control 118, which may store biometric data 120 in a memory and/or may receive biometric data 120 from a remote source or an input device or communication (not shown). Control 118 is operable to control or adjust the seat adjustment mechanism 116 to adjust the seats 112 of the vehicle (such as lumbar support, seat travel, seat height, etc.) in response to the stored biometric data and/or input. For example, a person may have their biometric data or characteristics stored in a memory of control 118, and may select a particular code or setting corresponding to their data (such as "position 1" of the seat adjustment system), whereby control 118 adjusts the adjustment mechanism of the particular selected seat in response to the data. Alternately, a person may have their biometric data or characteristics stored in a portable device (such as a key fob, PDA, or the like) or at a remote location or device, and may have the biometric data or characteristic communicated to the control 118, whereby control 118 may adjust the adjustment mechanism of the particular selected seat in response to the communication. The control 118 may also be operable to control or adjust a setting of an interior rearview mirror 122, an exterior rearview mirror or mirrors 124, a steering wheel 126 and/or the like in response to the input or communication.

The present invention thus provides a vehicle seat adjustment in response to biometric data, such as various body dimensions, weight, sex, age and the like. Such body dimension measurements, such as those taken for ordering clothing, may be made on a person and may be contained in the person's computer or the like, along with other biometric data or characteristics of the person (and optionally may include preferences of the person). These data may be loaded into the vehicle computer and/or seat adjustment system. The seat adjustment system receives the data and may be operable to pre-adjust the driver seat (or passenger seat or other seat) of the vehicle in response to the data so that the seat that the person will sit in is set to the person's precise body measurements and other data. Additionally, the adjustment system may pre-adjust an interior rearview mirror, exterior rearview mirror or mirrors, steering wheel and/or the like in response to the measurements or inputs.

The body dimensions may be saved in a person's computer or PDA, such as done for ordering clothing. Such measurement and saving technology now exists and is used by some catalogues, such as Lands' End and/or Levi (which provides for measurements in their stores and these measurements are stored in the person's file for ordering perfect fit jeans). Alternately, a vehicle dealer may perform simple measurements on a person (like a tailor with a new suit). This information may then be used to adjust the seat in the person's vehicle to the person's body size, weight, age, sex, etc. For example, the vehicle dealer may download the information or data for a person or person's (such as a driver and their spouse) into memory positions 1 and 2 of a vehicle seat adjustment memory of the person's vehicle. Optionally, the data may be downloaded into a Bluetooth (or other communication protocol) enabled phone, PDA or key fob, which may then be used to communicate the data to the targeted vehicle. Such an approach would be particularly suitable for and advantageous to use with rental cars.

The biometric seat adjustment system preferably utilizes the normal memory seat adjustment system or mechanisms currently in some vehicles, such as high end vehicles. While the seats today can be adjusted to a person's particular preferences, it is likely that most people take awhile to get themselves comfortable. By using a few body dimensions and the person's weight (and maybe other information or characteristics as well), the present invention may set the seat or seats substantially perfectly before or when the person or persons first get into the vehicle.

It is envisioned that the biometric data measurement event may occur in the vehicle (such as by an in-vehicle laser or similar scanners and/or cameras that measure the driver's and/or passengers' biometric dimensions). Alternately, the biometric data may be measured external to the vehicle (such as at a dealership "booth" when the driver is ordering and/or receiving delivery of the vehicle or at a biometric measurement booth at a Mall or other store or facility or the like) and may be provided to the vehicle in a manner such as described above and/or via, for example, an ONSTAR® telematics service or via a similar telecommunication system or event or the like.

It is further envisioned that more than the seat or seats (lumbar support/seat travel/seat height etc.) may be adjusted in response to the individual biometric data stored in or communicated to the vehicle memory system. For example, exterior and/or interior mirror reflective elements may be moved or adjusted in response to such stored or input biometrics data, which may be called up or loaded when that particular individual sits in one of the seats of the vehicle. Additionally, other accessories or systems of the vehicle may be adjusted or customized, such as suspension characteristics; steering column tilt; size of display characters (for example, older drivers may desire larger alphanumerical display digits); and/or the like, in response to the biometric data of a particular individual.

Therefore, the present invention provides a navigation system which is operable to provide step-by-step instructions to a targeted destination to a driver of a vehicle while the driver is driving the vehicle toward the targeted destination. The instructions are downloaded from a remote database at a remote service center or the like via a telematics system or wireless communication system of the vehicle. The instructions may then be provided to the driver only as needed by the driver, since they are coded or associated with or linked to particular geographic locations or waypoints, thereby simplifying the instructions so that the driver will be able to understand each step and execute the step accordingly. The present invention may also provide a seat adjustment function that automatically adjusts the seat of the vehicle in response to data communicated to the vehicle via a telematics system or a global positioning system or the like. The seat adjustment system or function may be operable to adjust the seat of the vehicle in response to biometric data of the person occupying the seat. The interior and/or exterior rearview mirrors may also be adjusted in response to the data or seat adjustments.

Changes and modifications in the specifically described embodiments may be carried out without departing from the principles of the present invention, which is intended to be limited only by the scope of the appended claims as interpreted according to the principles of patent law.

The embodiments of the invention in which an exclusive property or privilege is claimed are defined as follows:

1. A driver assist system for a vehicle, said driver assist system comprising:

a forward-viewing color video camera disposed at a vehicle equipped with said driver assist system;

said forward-viewing color video camera having a field of view exterior of the equipped vehicle;

wherein said forward-viewing color video camera is disposed at a front portion of the equipped vehicle and has a field of view at least forward of the equipped vehicle;

said forward-viewing color video camera comprising a lens and a two-dimensional array of photosensing elements arranged in rows of photosensing elements and columns of photosensing elements;

wherein said forward-viewing color video camera is part of a multi-camera vision system of the equipped vehicle, said multi-camera vision system comprising at least three other color video cameras;

wherein each of said three other color video cameras has a field of view exterior of the equipped vehicle;

wherein a first one of said three other color video cameras is mounted at a driver-side of the equipped vehicle and a second one of said three other color video cameras is mounted at a passenger-side of the equipped vehicle and a third one of said three other color video cameras comprises a rear backup camera mounted at a rear portion of the equipped vehicle;

wherein the first one of said three other color video cameras mounted at the driver-side has a field of view at the driver-side of the equipped vehicle and the second one of said three other color video cameras mounted at the passenger-side has a field of view at the passenger-side of the equipped vehicle;

wherein the field of view of the first one of said three other color video cameras that is mounted at the driver-side overlaps the field of view of said rear backup camera, and wherein the field of view of the second one of said three other color video cameras that is mounted at the passenger-side overlaps the field of view of said rear backup camera;

at least one non-visual sensor;

a video display screen viewable by a driver of the equipped vehicle when the driver is normally operating the equipped vehicle;

wherein said video display screen comprises a multi-pixel display screen;

wherein, during a parking maneuver of the equipped vehicle, images derived, at least in part, from image data captured by at least some cameras of said multi-camera vision system of the equipped vehicle are displayed by said video display screen to assist the driver in operating the equipped vehicle;

wherein at least one indication is provided to the driver of the equipped vehicle during the parking maneuver;

wherein at least one of (a) said at least one indication comprises an indication provided, at least in part, responsive to detection by said non-visual sensor of at least one object external of the equipped vehicle and (b) said at least one indication comprises an indication provided, at least in part, responsive to image processing by an image processor of image data captured by at least one camera of said multi-camera vision system;

wherein a unitary image is synthesized from image data captured by said multi-camera vision system of the equipped vehicle;

wherein said synthesized image approximates a view as would be seen by a virtual camera at a single location exterior of the equipped vehicle;

wherein said synthesized image is displayed by said video display screen that is viewable by the driver of the equipped vehicle when normally operating the equipped vehicle;

wherein distortion of images derived, at least in part, from image data captured by at least some cameras of said multi-camera vision system of the equipped vehicle, and displayed by said video display screen, is electronically corrected;

wherein the field of view of said rear backup camera encompasses a ground area to the rear of the equipped vehicle having a width at least substantially an entire rear fender width of the equipped vehicle; and wherein the field of view of said forward-viewing color video camera encompasses a ground area to the front of the equipped vehicle having a width at least substantially an entire front fender width of the equipped vehicle.

2. The driver assist system of claim 1, wherein said rear backup camera mounted at the rear portion of the equipped vehicle is positioned generally at the longitudinal centerline of the equipped vehicle and has a horizontal field of view that is generally symmetrical about the longitudinal axis of the equipped vehicle.

3. The driver assist system of claim 2, wherein said at least one indication comprises a visual indication displayed by said video display screen.

4. The driver assist system of claim 3, wherein said visual indication indicates distance to an object exterior of the equipped vehicle.

5. The driver assist system of claim 3, wherein said visual indication indicates proximity to an object exterior of the equipped vehicle.

6. The driver assist system of claim 3, wherein said visual indication highlights an object exterior of the equipped vehicle.

7. The driver assist system of claim 3, wherein said at least one indication comprises an indication provided, at least in part, responsive to image processing by an image processor of image data captured by at least one camera of said multi-camera vision system and wherein said at least one camera of said multi-camera vision system comprises said rear backup camera.

8. The driver assist system of claim 7, wherein said video display screen is operable to display images with a display intensity greater than 200 candelas/sq. meter for viewing by the driver of the equipped vehicle.

9. The driver assist system of claim 3, wherein said at least one indication comprises an indication provided, at least in part, responsive to detection by said non-visual sensor of at least one object external of the equipped vehicle, and wherein said non-visual sensor comprises an ultrasonic sensor.

10. The driver assist system of claim 3, wherein said at least one indication comprises an indication provided, at least in part, responsive to detection by said non-visual sensor of at least one object external of the equipped vehicle, and wherein said non-visual sensor comprises a radar sensor.

11. The driver assist system of claim 3, wherein said at least one indication comprises an indication provided, at least in part, responsive to detection by said non-visual sensor of at least one object external of the equipped vehicle, and wherein said non-visual sensor comprises an infrared sensor.

12. The driver assist system of claim 1, comprising at least one of (a) a control operable to control at least one accessory of the equipped vehicle in accordance with a characteristic of an occupant of the equipped vehicle, and wherein said at least one accessory comprises a seat adjustment system operable to adjust a seat of the equipped vehicle in accordance with a biometric characteristic of an occupant of the equipped vehicle, and wherein said seat adjustment system is operable to adjust a seat of the equipped vehicle in response to biometric data, said biometric data pertaining to the occupant of the seat of the equipped vehicle, and (b) a control operable to communicate with an external service provider via a wireless communication link between the equipped vehicle and the external service provider, wherein said control receives an input from the driver of the equipped vehicle and responsive thereto establishes said wireless communication link between the equipped vehicle and the external service provider, and wherein said control controls at least one accessory of the equipped vehicle responsive to a geographic location of the equipped vehicle as determined by a global positioning system of the equipped vehicle, and wherein data from the external service provider is downloaded to said control via said wireless communication link, and wherein said control comprises memory for storing downloaded data at least after said wireless communication link established between said control and the external service provider is disconnected, and wherein said downloaded data comprises downloaded driving instruction data useful for instructing the driver of the equipped vehicle how to drive from an initial location to a destination location, and wherein driving instructions derived, at least in part, from said downloaded driving instruction data are displayed, when the equipped vehicle is not executing a reversing maneuver, by said video display screen for viewing by the driver of the equipped vehicle, and wherein said driving instructions are displayed by said video display screen in a step-by-step manner, with at least some driving instruction steps being displayed by said video display screen after said wireless communication link between said control and the external service provider is disconnected.

13. A driver assist system for a vehicle, said driver assist system comprising:

a forward-viewing color video camera disposed at a vehicle equipped with said driver assist system;

said forward-viewing color video camera having a field of view exterior of the equipped vehicle;

wherein said forward-viewing color video camera is disposed at a front portion of the equipped vehicle and has a field of view at least forward of the equipped vehicle;

said forward-viewing color video camera comprising a lens and a two-dimensional array of photosensing elements arranged in rows of photosensing elements and columns of photosensing elements;

wherein said forward-viewing color video camera is part of a multi-camera vision system of the equipped vehicle, said multi-camera vision system comprising at least three other color video cameras;

wherein each of said three other color video cameras has a field of view exterior of the equipped vehicle;

wherein a first one of said three other color video cameras is mounted at a driver-side of the equipped vehicle and a second one of said three other color video cameras is mounted at a passenger-side of the equipped vehicle and a third one of said three other color video cameras comprises a rear backup camera mounted at a rear portion of the equipped vehicle;

wherein the first one of said three other color video cameras mounted at the driver-side has a field of view at the driver-side of the equipped vehicle and the second one of said three other color video cameras mounted at the passenger-side has a field of view at the passenger-side of the equipped vehicle;

wherein the field of view of the first one of said three other color video cameras that is mounted at the driver-side overlaps the field of view of said rear backup camera, and wherein the field of view of the second one of said three other color video cameras that is mounted at the passenger-side overlaps the field of view of said rear backup camera;

at least one non-visual sensor;

a video display screen viewable by a driver of the equipped vehicle when the driver is normally operating the equipped vehicle;

wherein said video display screen comprises a multi-pixel display screen;

wherein, during a driving maneuver of the equipped vehicle, images derived, at least in part, from image data captured by at least some cameras of said multi-camera vision system of the equipped vehicle are displayed by said video display screen to assist the driver in operating the equipped vehicle;

wherein at least one indication is provided to the driver of the equipped vehicle during the driving maneuver;

wherein said at least one indication comprises an indication provided, at least in part, responsive to image processing by an image processor of image data captured by at least one camera of said multi-camera vision system;

wherein a unitary image is synthesized from image data captured by said multi-camera vision system of the equipped vehicle;

wherein said synthesized image approximates a view as would be seen by a virtual camera at a single location exterior of the equipped vehicle;

wherein said synthesized image is displayed by said video display screen that is viewable by the driver of the equipped vehicle when normally operating the equipped vehicle;

wherein the field of view of said rear backup camera encompasses a ground area to the rear of the equipped vehicle having a width at least substantially an entire rear fender width of the equipped vehicle;

wherein the field of view of said forward-viewing color video camera encompasses a ground area to the front of the equipped vehicle having a width at least substantially an entire front fender width of the equipped vehicle; and wherein said at least one indication comprises a visual indication displayed by said video display screen.

14. The driver assist system of claim 13, wherein distortion of images derived, at least in part, from image data captured by at least some cameras of said multi-camera vision system of the equipped vehicle, and displayed by said video display screen, is electronically corrected.

15. The driver assist system of claim 14, wherein said driving maneuver comprises a parking maneuver.

16. The driver assist system of claim 15, wherein said visual indication indicates distance to an object exterior of the equipped vehicle.

17. The driver assist system of claim 15, wherein said visual indication indicates proximity to an object exterior of the equipped vehicle.

18. The driver assist system of claim 15, wherein said visual indication highlights an object exterior of the equipped vehicle.

19. The driver assist system of claim 13, comprising at least one non-visual sensor, and wherein said at least one non-visual sensor is selected from the group consisting of an ultrasonic sensor, a radar sensor and an infrared sensor.

20. The driver assist system of claim 13, wherein said at least one indication comprises an indication provided, at least in part, responsive to image processing by an image processor of image data captured by said rear backup camera of said multi-camera vision system.

21. The driver assist system of claim 20, wherein said video display screen is operable to display images with a display intensity greater than 200 candelas/sq. meter for viewing by the driver of the equipped vehicle.

22. The driver assist system of claim 20, wherein said rear backup camera mounted at the rear portion of the equipped vehicle is positioned generally at the longitudinal centerline of the equipped vehicle and has a horizontal field of view that is generally symmetrical about the longitudinal axis of the equipped vehicle.

23. A driver assist system for a vehicle, said driver assist system comprising:

a forward-viewing color video camera disposed at a vehicle equipped with said driver assist system;

said forward-viewing color video camera having a field of view exterior of the equipped vehicle;

wherein said forward-viewing color video camera is disposed at a front portion of the equipped vehicle and has a field of view at least forward of the equipped vehicle;

said forward-viewing color video camera comprising a lens and a two-dimensional array of photosensing elements arranged in rows of photosensing elements and columns of photosensing elements;

wherein said forward-viewing color video camera is part of a multi-camera vision system of the equipped vehicle, said multi-camera vision system comprising at least three other color video cameras;

wherein each of said three other color video cameras has a field of view exterior of the equipped vehicle;

wherein a first one of said three other color video cameras is mounted at a driver-side of the equipped vehicle and a second one of said three other color video cameras is mounted at a passenger-side of the equipped vehicle and a third one of said three other color video cameras comprises a rear backup camera mounted at a rear portion of the equipped vehicle;

wherein the first one of said three other color video cameras mounted at the driver-side has a field of view at the driver-side of the equipped vehicle and the second one of said three other color video cameras mounted at the passenger-side has a field of view at the passenger-side of the equipped vehicle;

wherein the field of view of the first one of said three other color video cameras that is mounted at the driver-side overlaps the field of view of said rear backup camera, and wherein the field of view of the second one of said three other color video cameras that is mounted at the passenger-side overlaps the field of view of said rear backup camera;

at least one non-visual sensor;

wherein said at least one non-visual sensor is selected from the group consisting of an ultrasonic sensor, a radar sensor and an infrared sensor;

a video display screen viewable by a driver of the equipped vehicle when the driver is normally operating the equipped vehicle;

wherein said video display screen comprises a multi-pixel display screen;

wherein, during a driving maneuver of the equipped vehicle, images derived, at least in part, from image data captured by at least some cameras of said multi-camera vision system of the equipped vehicle are displayed by said video display screen to assist the driver in operating the equipped vehicle;

wherein at least one indication is provided to the driver of the equipped vehicle during the driving maneuver;

wherein said at least one indication comprises an indication provided, at least in part, responsive to detection by said non-visual sensor of at least one object external of the equipped vehicle;

wherein a unitary image is synthesized from image data captured by said multi-camera vision system of the equipped vehicle;

wherein said synthesized image approximates a view as would be seen by a virtual camera at a single location exterior of the equipped vehicle;

wherein said synthesized image is displayed by said video display screen that is viewable by the driver of the equipped vehicle when normally operating the equipped vehicle;

wherein distortion of images derived, at least in part, from image data captured by at least some cameras of said multi-camera vision system of the equipped vehicle, and displayed by said video display screen, is electronically corrected;

wherein the field of view of said rear backup camera encompasses a ground area to the rear of the equipped vehicle having a width at least substantially an entire rear fender width of the equipped vehicle;

wherein the field of view of said forward-viewing color video camera encompasses a ground area to the front of the equipped vehicle having a width at least substantially an entire front fender width of the equipped vehicle;

wherein said rear backup camera mounted at the rear portion of the equipped vehicle is positioned generally at the longitudinal centerline of the equipped vehicle and has a horizontal field of view that is generally symmetrical about the longitudinal axis of the equipped vehicle; and wherein said at least one indication comprises a visual indication displayed by said video display screen.

24. The driver assist system of claim 23, wherein said visual indication indicates distance to an object exterior of the equipped vehicle.

25. The driver assist system of claim 23, wherein said visual indication indicates proximity to an object exterior of the equipped vehicle.

26. The driver assist system of claim 23, wherein said visual indication highlights an object exterior of the equipped vehicle.

27. The driver assist system of claim 23, wherein said non-visual sensor comprises an ultrasonic sensor.

28. The driver assist system of claim 23, wherein said non-visual sensor comprises a radar sensor.

29. The driver assist system of claim 23, wherein said non-visual sensor comprises an infrared sensor.

30. The driver assist system of claim 23, wherein said at least one indication comprises an indication provided, at least in part, responsive to image processing by an image processor of image data captured by at least one camera of said multi-camera vision system and wherein said at least one camera of said multi-camera vision system comprises said rear backup camera.

31. The driver assist system of claim 30, wherein said driving maneuver comprises a parking maneuver.

32. The driver assist system of claim 31, wherein said video display screen is operable to display images with a display intensity greater than 200 candelas/sq. meter for viewing by the driver of the equipped vehicle.

* * * * *

UNITED STATES PATENT AND TRADEMARK OFFICE

CERTIFICATE OF CORRECTION

PATENT NO. : 9,809,168 B2
APPLICATION NO. : 15/131592
DATED : November 7, 2017
INVENTOR(S) : David W. Taylor et al.

It is certified that error appears in the above-identified patent and that said Letters Patent is hereby corrected as shown below:

In the Specification

Column 7
Line 58, "RESCUE)" should be -- RESCU® --

Signed and Sealed this
Twenty-third Day of October, 2018

Andrei Iancu
*Director of the United States Patent and Trademark Office*